US012750066B2

(12) United States Patent
Cooper et al.

(10) Patent No.: US 12,750,066 B2
(45) Date of Patent: Sep. 29, 2026

(54) SYSTEM AND METHOD FOR NETWORK WEIGHT COMPRESSION AND INTRUSION DETECTION

(71) Applicant: AtomBeam Technologies Inc., Moraga, CA (US)

(72) Inventors: Joshua Cooper, Columbia, SC (US); Charles Yeomans, Orinda, CA (US)

(73) Assignee: ATOMBEAM TECHNOLOGIES INC., Moraga, CA (US)

( * ) Notice: Subject to any disclaimer, the term of this patent is extended or adjusted under 35 U.S.C. 154(b) by 0 days.

(21) Appl. No.: 19/204,514

(22) Filed: May 10, 2025

(65) Prior Publication Data

US 2025/0266846 A1 Aug. 21, 2025

Related U.S. Application Data

(63) Continuation-in-part of application No. 18/423,291, filed on Jan. 25, 2024, now Pat. No. 12,308,861, (Continued)

(51) Int. Cl.
*H03M 7/30* (2006.01)
*G06F 21/35* (2013.01)
(Continued)

(52) U.S. Cl.
CPC ........ *H03M 7/3059* (2013.01); *G06F 21/554* (2013.01); *G06N 20/00* (2019.01); *H03M 7/6005* (2013.01)

(58) Field of Classification Search
CPC .. H03M 7/3059; H03M 7/6005; G06N 20/00; G06F 21/554
See application file for complete search history.

(56) References Cited

U.S. PATENT DOCUMENTS 9,294,589 B2 3/2016 Crosta et al.
9,954,920 B1 * 4/2018 Paris ....................... G06F 21/10
(Continued)

FOREIGN PATENT DOCUMENTS

CN 112989334 A * 6/2021 ........... G06F 21/562

*Primary Examiner* — Darshan I Dhruv
(74) *Attorney, Agent, or Firm* — GALVIN PATENT LAW LLC; Brian R. Galvin

(57) ABSTRACT

A system and method for neural network weight compression with intrusion detection capabilities that optimizes model storage and transmission while providing security. The system analyzes weight characteristics to identify statistical properties within different neural network layers, generates optimized encoding schemes based on the analysis, and creates reference distributions for security verification. The compression process employs a multi-resolution approach that produces a progressive representation with base and enhancement layers, enabling flexible deployment across diverse computing environments. Security markers and statistical fingerprints can be embedded throughout the encoded representation, allowing for detection of unauthorized modifications during transmission or deployment. The system monitors encoded weight streams, measures distribution divergence against reference baselines, and generates alerts when statistical anomalies indicate potential tampering. This approach achieves superior compression ratios while maintaining model performance and providing robust protection against increasingly sophisticated attacks targeting neural network weights.

13 Claims, 64 Drawing Sheets

Related U.S. Application Data which is a continuation of application No. 18/460,553, filed on Sep. 3, 2023, now Pat. No. 12,003,256.

(60) Provisional application No. 63/485,514, filed on Feb. 16, 2023.

(51) Int. Cl.
*G06F 21/55* (2013.01)
*G06N 20/00* (2019.01)

(56) References Cited

U.S. PATENT DOCUMENTS

| | | | | |
|---|---|---|---|---|
| 10,897,479 | B1 * | 1/2021 | Chen | H04L 63/1425 |
| 10,984,423 | B2 * | 4/2021 | Adjaoute | G06N 20/00 |
| 11,470,182 | B1 * | 10/2022 | Virtser | H04L 67/56 |
| 2014/0041032 | A1 * | 2/2014 | Scheper | H04L 63/14 726/23 |
| 2014/0270404 | A1 * | 9/2014 | Hanna | G06V 40/45 382/116 |
| 2016/0155069 | A1 * | 6/2016 | Hoover | G06Q 30/06 706/12 |
| 2017/0272100 | A1 * | 9/2017 | Yanovsky | G06F 12/1408 |
| 2018/0053114 | A1 * | 2/2018 | Adjaoute | G06N 3/02 |
| 2018/0176578 | A1 * | 6/2018 | Rippel | G06N 3/084 |
| 2019/0129640 | A1 * | 5/2019 | Riahi | G06F 16/122 |
| 2019/0356330 | A1 * | 11/2019 | Minnen | G06N 3/0455 |
| 2020/0293653 | A1 * | 9/2020 | Huang | G06N 3/09 |
| 2020/0382281 | A1 * | 12/2020 | Fletcher | G06N 7/01 |
| 2021/0004677 | A1 * | 1/2021 | Menick | G06N 3/0475 |
| 2022/0051103 | A1 * | 2/2022 | Rhodes | G06N 3/045 |
| 2022/0171857 | A1 * | 6/2022 | McHugh | G06F 21/52 |
| 2022/0210167 | A1 * | 6/2022 | Rajagopalan | G06F 9/45558 |
| 2023/0138035 | A1 * | 5/2023 | Lott | G06Q 20/4014 705/44 |
| 2023/0140918 | A1 * | 5/2023 | Saxena | G06Q 10/0635 705/7.27 |
| 2023/0246814 | A1 * | 8/2023 | Fromm | H04L 63/0281 713/171 |
| 2023/0336581 | A1 * | 10/2023 | Dunn | G06F 21/577 |

* cited by examiner

3401

| | | | | | | | | |
|---|---|---|---|---|---|---|---|---|
| 3402 → Bit | 7 | 6 | 5 | 4 | 3 | 2 | 1 | 0 |
| 3403 → | N | R | R | R | I | C | C | C |

Control Byte

N= Next nibble (If 1, the next 4 bits (I C C C) are control bits)

RRR = Residual count (bits not used in the last byte of the code packet)

I for Codebook ID. (1 if UUID follows in the next four bytes; if the I flag is off, then use the CCC bits to index the Codebook in the cache.)

CCC = Codebook cache index

Fig. 34

SYSTEM AND METHOD FOR NETWORK WEIGHT COMPRESSION AND INTRUSION DETECTION

CROSS-REFERENCE TO RELATED APPLICATIONS

Priority is claimed in the application data sheet to the following patents or patent applications, each of which is expressly incorporated herein by reference in its entirety:

Ser. No. 18/423,291
Ser. No. 18/460,553
63/485,514

BACKGROUND OF THE INVENTION

Field of the Invention

The present invention is in the field of neural network model compression and security, and in particular the use of specialized weight compression techniques with integrated intrusion detection capabilities.

Discussion of the State of the Art

As artificial intelligence becomes increasingly integrated into critical systems, the deployment of large neural network models faces significant challenges related to storage capacity, transmission bandwidth, and security. Modern neural networks such as large language models (LLMs), vision transformers, and multimodal architectures often contain billions of parameters, requiring substantial storage and bandwidth resources for deployment. For example, a state-of-the-art large language model may require 100+ GB of storage in its uncompressed form, making deployment on resource-constrained devices practically impossible without significant compression.

Traditional approaches to neural network compression include techniques such as pruning, quantization, and knowledge distillation. Pruning involves removing weights deemed less important to model performance, but typically achieves limited compression ratios of 2-5× without significant accuracy degradation. Quantization reduces the precision of weights from 32-bit floating point to lower bit representations such as 8-bit or 4-bit integers, typically achieving compression ratios of 4-8×. Knowledge distillation trains smaller “student” models to mimic larger “teacher” models, but often results in significant performance degradation.

These conventional approaches face several critical limitations. First, they apply uniform compression strategies across different layer types despite the varying statistical properties and functional importance of weights in different neural network components. For example, attention matrices in transformer models have distinctly different characteristics from feed-forward layers, yet traditional approaches typically apply the same compression technique to both. Second, existing methods provide limited flexibility for deployment across diverse computing environments with varying resource constraints. A model compressed for one specific target platform may not be usable on platforms with different capabilities. Third, conventional compression techniques focus exclusively on size reduction without addressing the increasing security concerns associated with model deployment.

The security of neural network models during transmission and deployment represents an increasingly critical concern as AI systems become integrated into sensitive applications. Existing approaches to model security primarily rely on traditional encryption methods that protect the entire model as a single unit but fail to provide granular protection or detection capabilities for targeted attacks. Adversaries can perform subtle weight modifications that introduce backdoors or vulnerabilities while maintaining overall model performance on standard evaluation metrics. Such modifications might cause the model to produce harmful outputs only under specific circumstances or leak sensitive information when prompted in particular ways.

Current intrusion detection systems (IDS) for neural networks are primarily focused on detecting adversarial inputs to deployed models rather than identifying unauthorized modifications to the model weights themselves. These systems typically monitor model inputs and outputs for anomalous patterns but cannot detect if the model itself has been compromised. Additionally, existing model verification techniques often rely solely on cryptographic signatures at the file level, which cannot identify subtle but malicious weight modifications that preserve overall file integrity while compromising model behavior.

What is needed is a system and method for neural network weight compression with integrated intrusion detection capabilities that addresses the limitations of existing approaches. Such a system should provide layer-specific compression strategies optimized for different neural network components, enable flexible deployment across diverse computing environments, and incorporate granular security monitoring to detect unauthorized weight modifications that can compromise model integrity or behavior.

SUMMARY OF THE INVENTION

The inventor has developed a system and method for neural network weight compression with intrusion detection capabilities that optimizes model storage and transmission while providing security. The system analyzes weight characteristics to identify statistical properties within different neural network layers, generates optimized encoding schemes based on the analysis, and creates reference distributions for security verification. The compression process employs a multi-resolution approach that produces a progressive representation with base and enhancement layers, enabling flexible deployment across diverse computing environments. Security markers and statistical fingerprints can be embedded throughout the encoded representation, allowing for detection of unauthorized modifications during transmission or deployment. The system monitors encoded weight streams, measures distribution divergence against reference baselines, and generates alerts when statistical anomalies indicate potential tampering. This approach achieves superior compression ratios while maintaining model performance and providing robust protection against increasingly sophisticated attacks targeting neural network weights.

According to a preferred embodiment, a system for neural network weight processing is disclosed, the system comprising: one or more hardware processors configured for: receiving a neural network model comprising a plurality of weight tensors; analyzing weight characteristics to identify statistical properties within the neural network model; generating one or more encoding schemes based on the analyzed weight characteristics; creating reference distributions for security verification; encoding the weight tensors using the one or more encoding schemes to produce a compressed representation of the neural network model; incorporating security information within the compressed representation; and outputting the compressed neural network model.

According to another preferred embodiment, a method for neural network weight processing is disclosed, comprising the steps of: receiving a neural network model comprising a plurality of weight tensors; analyzing weight characteristics within the neural network model; generating one or more encoding schemes based on the analyzed weight characteristics; creating reference distributions for security verification; encoding the weight tensors using the one or more encoding schemes to produce a compressed representation of the neural network model; incorporating security information within the compressed representation; and outputting the compressed neural network model.

According to an aspect of an embodiment, wherein the one or more hardware processors are further configured for: dividing the neural network model into weight segments that receive different encoding treatments based on their functional importance; clustering similar weight values within each layer type to identify opportunities for shared representations; determining optimal bit allocation for different weight regions within each layer based on precision sensitivity analysis; and organizing the encoded weights into a progressive structure that facilitates efficient storage and transmission.

According to an aspect of an embodiment, wherein analyzing layer-specific weight patterns comprises: identifying layer types including convolutional, fully-connected, embedding, attention, and normalization layers; computing statistical profiles for each layer including distribution moments, entropy measures, and correlation patterns; analyzing sparsity patterns within weight tensors to identify both degree and structure of sparsity across different layers; and determining precision sensitivity for different weight regions to identify which weights require high precision representation and which can tolerate aggressive quantization.

According to an aspect of an embodiment, wherein generating layer-specific codebooks comprises: implementing product quantization techniques for embedding layers with semantic clustering; creating head-aware structured encoding for attention mechanisms in transformer models; applying filter-wise pattern matching for convolutional layers; utilizing run-length encoding or magnitude-based pruning for sparse feed-forward networks; and optimizing scale-shift parameter encoding for normalization layers.

According to an aspect of an embodiment, wherein the system further comprises a weight-specific intrusion detection module configured for: receiving an encoded weight stream containing compressed neural network weights; verifying cryptographic integrity of the encoded weight stream using embedded security markers; computing statistical distributions of the received encoded weights; measuring distribution divergence between computed distributions and reference probability distributions; determining whether the measured divergence exceeds defined thresholds indicating potential tampering; and generating a security alert when potential tampering is detected.

According to an aspect of an embodiment, wherein measuring distribution divergence comprises applying algorithms selected from the group consisting of Kullback-Leibler divergence, Jensen-Shannon divergence, and Wasserstein distance.

According to an aspect of an embodiment, wherein the multi-resolution encoding creates a progressive representation comprising: a base resolution layer containing the minimal weight representation necessary for basic model functionality; a critical refinement layer that significantly improves model quality with modest size increase; a detail enhancement layer that adds precision to moderately important weights; and a full precision layer that restores the model to its original accuracy.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

FIG. 34 is a diagram showing an exemplary control byte used to combine sourcepackets encoded with multiple codebooks.

DETAILED DESCRIPTION OF THE INVENTION

Figure 1:
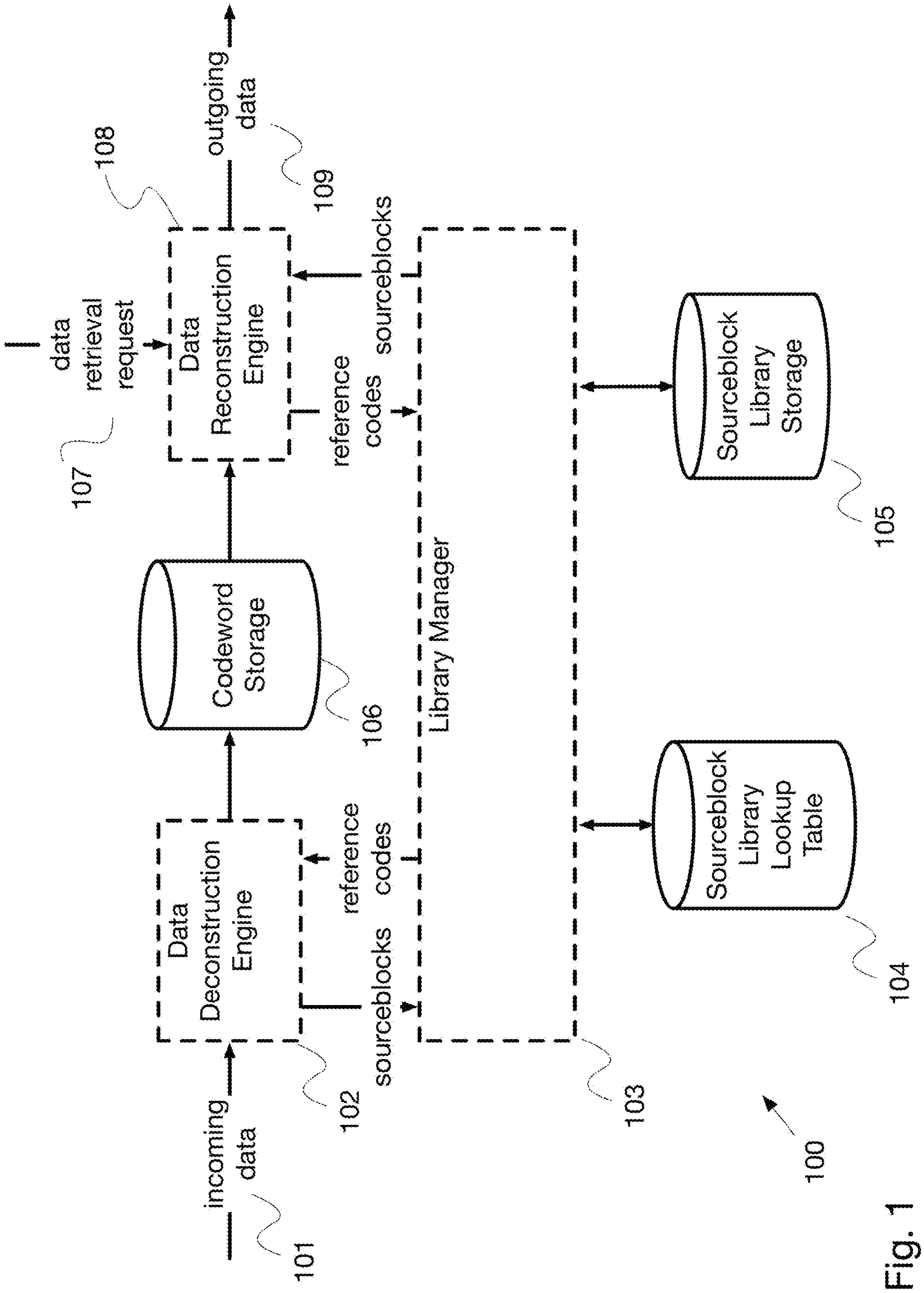
FIG. 1 is a diagram showing an embodiment of the system in which all components of the system are operated locally.

The inventor has conceived and reduced to practice, a system and method for neural network weight compression with intrusion detection capabilities that optimizes model storage and transmission while providing security. The system analyzes weight characteristics to identify statistical properties within different neural network layers, generates optimized encoding schemes based on the analysis, and creates reference distributions for security verification. The compression process employs a multi-resolution approach that produces a progressive representation with base and enhancement layers, enabling flexible deployment across diverse computing environments. Security markers and statistical fingerprints can be embedded throughout the encoded representation, allowing for detection of unauthorized modifications during transmission or deployment. The system monitors encoded weight streams, measures distribution divergence against reference baselines, and generates alerts when statistical anomalies indicate potential tampering. This approach achieves superior compression ratios while maintaining model performance and providing robust protection against increasingly sophisticated attacks targeting neural network weights.

Perhaps the strongest argument for the disclosed system and methods as a superior solution over the existing art may be its advantage with respect to signature libraries, which is an artifact of its fundamental difference in approach compared to traditional IDS. The scientific basis of compression-as-IDS does not rely on signatures, but on a statistical analysis of traffic payloads to detect divergence form an expected probability distribution; signatures are an irrelevant consideration. Threats are detected on the basis of deviation from a normal behavior dynamically, rather than seeking to match an observed behavior against a library of threat vectors as in the case of traditional IDS. In addition, employment of the dynamic codebook generator will ensure that compression ratios remain stable and measurable for purposes of intrusion detection in changing circumstances and in situations in which a codebook has been compromised. The system and methods benefits by having no dependence on any source of information other than the flow of data from the system in which it is installed.

In some embodiments, the data compression system may be configured to encode and decode genomic data. There are many applications in biology and genomics in which large amounts of DNA or RNA sequencing data must be searched to identify the presence of a pattern of nucleic acid sequences, or oligonucleotides. These applications include, but are not limited to, searching for genetic disorders or abnormalities, drug design, vaccine design, and primer design for Polymerase Chain Reaction (PCR) tests or sequencing reactions.

These applications are relevant across all species, humans, animals, bacteria, and viruses. All of these applications operate within large datasets; the human genome for example, is very large (3.2 billion base pairs). These studies are typically done across many samples, such that proper confidence can be achieved on the results of these studies. So, the problem is both wide and deep, and requires modern technologies beyond the capabilities of traditional or standard compression techniques. Current methods of compressing data are useful for storage, but the compressed data cannot be searched until it is decompressed, which poses a big challenge for any research with respect to time and resources.

The compression algorithms described herein not only compress data as well as, or better than, standard compression technologies, but more importantly, have major advantages that are key to much more efficient applications in genomics. First, some configurations of the systems and method described herein allow random access to compressed data without unpacking them first. The ability to access and search within compressed datasets is a major benefit and allows for utilization of data for searching and identifying sequence patterns without the time, expense, and computing resources required to unpack the data. Additionally, for some applications certain regions of the genomic data must be searched, and certain configurations of the systems and methods allow the search to be narrowed down even within compressed data. This provides an enormous opportunity for genomic researchers and makes mining genomics datasets much more practical and efficient.

In some embodiments, data compression may be combined with data serialization to maximize compression and data transfer with extremely low latency and no loss. For example, a wrapper or connector may be constructed using certain serialization protocols (e.g., BeBop, Google Protocol Buffers, MessagePack). The idea is to use known, deterministic file structure (schemes, grammars, etc.) to reduce data size first via token abbreviation and serialization, and then to use the data compression methods described herein to take advantage of stochastic/statistical structure by training it on the output of serialization. The encoding process can be summarized as: serialization-encode→compress-encode, and the decoding process would be the reverse: compress-decode→serialization-decode. The deterministic file structure could be automatically discovered or encoded by the user manually as a scheme/grammar. Another benefit of serialization in addition to those listed above is deeper obfuscation of data, further hardening the cryptographic benefits of encoding using codebooks.

In some embodiments, the data compression systems and methods described herein may be used as a form of encryption. As a codebook created on a particular data set is unique (or effectively unique) to that data set, compression of data using a particular codebook acts as a form of encryption as that particular codebook is required to unpack the data into the original data. As described previously, the compressed data contains none of the original data, just codeword references to the codebook with which it was compressed. This inherent encryption avoids entirely the multiple stages of encryption and decryption that occur in current computing systems, for example, data is encrypted using a first encryption algorithm (say, AES-256) when stored to disk at a source, decrypted using AES-256 when read from disk at the source, encrypted using TLS prior to transmission over a network, decrypted using TLS upon receipt at the destination, and re-encrypted using a possibly different algorithm (say, TwoFish) when stored to disk at the destination.

In some embodiments, an encoding/decoding system as described herein may be incorporated into computer monitors, televisions, and other displays, such that the information appearing on the display is encoded right up until the moment it is displayed on the screen. One application of this configuration is encoding/decoding of video data for computer gaming and other applications where low-latency video is required. This configuration would take advantage of the typically limited information used to describe scenery/imagery in low-latency video software applications, such an in gaming, AR/VR, avatar-based chat, etc. The encoding would benefit from there being a particularly small number of textures, emojis, AR/VR objects, orientations, etc., which can occur in the user interface (UI)—at any point along the rendering pipeline where this could be helpful.

In some embodiments, the data compression systems and methods described herein may be used to manage high volumes of data produced in robotics and industrial automation. Many AI based industrial automation and robotics applications collect a large amount of data from each machine, particularly from cameras or other sensors. Based upon the data collected, decisions are made as to whether the process is under control or the parts that have been manufactured are in spec. The process is very high speed, so the decisions are usually made locally at the machine based on an AI inference engine that has been previously trained. The collected data is sent back to a data center to be archived and for the AI model to be refined.

In many of these applications, the amount of data that is being created is extremely large. The high production rate of these machines means that most factory networks cannot transmit this data back to the data center in anything approaching real time. In fact, if these machines are operating close to 24 hours a day, 7 days a week, then the factory networks can never catch up and the entirety of the data cannot be sent. Companies either do data selection or use some type of compression requiring expensive processing power at each machine to reduce the amount of data that needs to be sent. However, this either loads down the processors of the machine, or requires the loss of certain data in order to reduce the required throughput.

The data encoding/decoding systems and methods described herein can be used in some configurations to solve this problem, as they represent a lightweight, low-latency, and lossless solution that significantly reduces the amount of data to be transmitted. Certain configurations of the system could be placed on each machine and at the server/data center, taking up minimal memory and processing power and allowing for all data to be transmitted back to the data center. This would enable audits whenever deeper analysis needs to be performed as, for example, when there is a quality problem. It also ensures that the data centers, where the AI models are trained and retrained, have access to all of the up-to-date data from all the machines.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

The term "bit" refers to the smallest unit of information that can be stored or transmitted. It is in the form of a binary digit (either 0 or 1). In terms of hardware, the bit is represented as an electrical signal that is either off (representing 0) or on (representing 1).

The term "byte" refers to a series of bits exactly eight bits in length.

The term "codebook" refers to a database containing sourceblocks each with a pattern of bits and reference code unique within that library. The terms “library” and “encoding/decoding library” are synonymous with the term codebook.

The terms “compression” and “deflation” as used herein mean the representation of data in a more compact form than the original dataset. Compression and/or deflation may be either “lossless”, in which the data can be reconstructed in its original form without any loss of the original data, or “lossy” in which the data can be reconstructed in its original form, but with some loss of the original data.

The terms “compression factor” and “deflation factor” as used herein mean the net reduction in size of the compressed data relative to the original data (e.g., if the new data is 70% of the size of the original, then the deflation/compression factor is 30% or 0.3.)

The terms “compression ratio” and “deflation ratio”, and as used herein all mean the size of the original data relative to the size of the compressed data (e.g., if the new data is 70% of the size of the original, then the deflation/compression ratio is 70% or 0.7.)

The term “data” means information in any computer-readable form.

The term “data set” refers to a grouping of data for a particular purpose. One example of a data set might be a word processing file containing text and formatting information.

The term “effective compression” or “effective compression ratio” refers to the additional amount data that can be stored using the method herein described versus conventional data storage methods. Although the method herein described is not data compression, per se, expressing the additional capacity in terms of compression is a useful comparison.

The term “sourcepacket” as used herein means a packet of data received for encoding or decoding. A sourcepacket may be a portion of a data set.

The term “sourceblock” as used herein means a defined number of bits or bytes used as the block size for encoding or decoding. A sourcepacket may be divisible into a number of sourceblocks. As one non-limiting example, a 1 megabyte sourcepacket of data may be encoded using 512 byte sourceblocks. The number of bits in a sourceblock may be dynamically optimized by the system during operation. In one aspect, a sourceblock may be of the same length as the block size used by a particular file system, typically 512 bytes or 4,096 bytes.

The term “codeword” refers to the reference code form in which data is stored or transmitted in an aspect of the system. A codeword consists of a reference code to a sourceblock in the library plus an indication of that sourceblock’s location in a particular data set.

Conceptual Architecture

Figure 54:
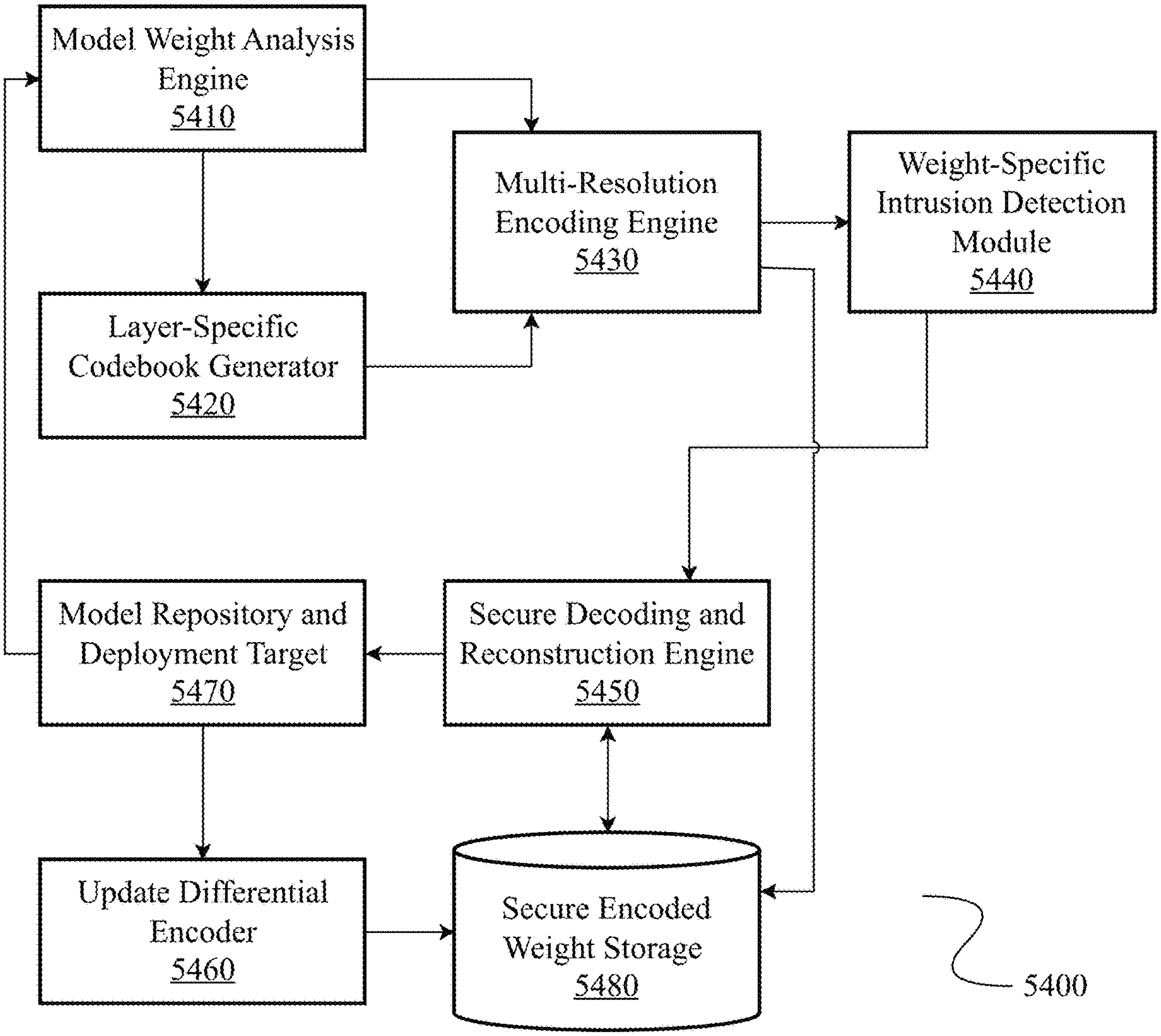
FIG. 54 is a diagram showing an exemplary system architecture for a model weight compression system with intrusion protection, according to an embodiment.

FIG. 54 is a diagram showing an exemplary system architecture 5400 for a model weight compression system with intrusion protection. According to this embodiment, the system comprises several specialized components working in harmony to provide efficient compression and security for neural network model weights. The system 5400 comprises a model weight analysis engine 5410 which performs analysis of neural network weight distributions. The analysis engine 5410 examines incoming model weights to identify various properties including, but not limited to, statistical patterns, layer types, and dimensional characteristics that enable optimized encoding. Unlike general-purpose compression, this component specifically recognizes the unique distributions common in different neural network architectures such as convolutional, attention, and fully-connected layers, allowing for compression strategies tailored to each specific pattern.

Connected to the analysis engine 5410 is a layer-specific codebook generator 5420 that utilizes the analysis results to create specialized codebooks optimized for different neural network layer types. The codebook generator 5420 implements advanced techniques for generating encoding schemes that match the statistical properties of each layer type, resulting in superior compression ratios compared to general-purpose encoding approaches. These layer-specific codebooks capture the unique distribution characteristics of weights in different layers, such as the sparse patterns often found in convolutional filters or the structured patterns in self-attention matrices.

The system further comprises a multi-resolution encoding engine 5430 that receives input from both the analysis engine 5410 and codebook generator 5420. According to an aspect of an embodiment, encoding engine 5430 compresses model weights using a hierarchical approach, creating representations at various precision levels that enable progressive transmission and decoding. Encoding engine 5430 can be specifically designed to handle quantized and pruned models, preserving critical weights while maximizing compression efficiency. By encoding at multiple resolutions, the system allows for partial model loading in resource-constrained environments, where less critical weights can be loaded at lower precision without significantly impacting model performance.

A weight-specific intrusion detection module 5440 monitors the encoded weight streams for anomalies that may indicate tampering or poisoning attacks. According to an aspect of an embodiment, detection module 5440 employs specialized statistical algorithms to compute real-time probability distributions of encoded weights and compares them against reference distributions generated during the encoding process. Detection module 5440 is particularly sensitive to subtle modifications that might represent targeted attacks against the neural network, such as backdoor insertions or adversarial perturbations designed to alter model behavior in specific circumstances while appearing normal in general operation.

System 5400 further includes a secure decoding and reconstruction engine 5450 that performs integrity verification during the model reconstruction process. This reconstruction engine 5450 ensures that decoded weights match the expected statistical properties and can operate in stages to allow partial model loading based on deployment requirements. The reconstruction engine 5450 can be configured to implement countermeasures against tampering attempts, such as verification of layer statistics against expected distributions and detection of inconsistencies that could indicate malicious modifications during transmission or storage.

For handling model updates efficiently, system 5400 can incorporate an update differential encoder 5460 specialized in encoding weight differences for model updates. Differential encoder 5460 takes advantage of the typically sparse nature of model updates, where only a small percentage of weights change significantly between versions. By encoding only the differences between model versions, the differential encoder 5460 drastically reduces the bandwidth requirements for model updates while maintaining the security benefits of the full encoding system. This component is particularly valuable in federated learning scenarios where model updates must be frequently exchanged between participants.

According to an embodiment, system 5400 interfaces with a model repository & deployment target 5470 that provides input/output functionality for original models and deployment of reconstructed models. This repository component 5470 manages the interfaces between the compression system and various model formats (e.g., PyTorch, TensorFlow, ONNX, etc.) as well as deployment environments ranging from cloud servers to edge devices with varying computational capabilities.

Encoded models can be securely stored in a secure encoded weight storage 5480 component that maintains the compressed representations with appropriate metadata for verification and reconstruction. According to various aspects, storage component 5480 implements access controls and integrity verification to ensure that stored models remain protected against unauthorized access or modification.

The system 5400 provides significant advantages over conventional compression approaches by specifically addressing the unique characteristics of neural network weights. The layer-specific encoding strategies result in compression ratios that outperform general-purpose methods, while the intrusion detection capabilities provide critical security for deployed models against increasingly sophisticated attacks targeting artificial intelligence systems.

The operation of system 5400 can be illustrated through an example of compressing and securing a large language model (LLM) for deployment on edge devices. In operation, a pretrained LLM with 7 billion parameters is submitted to the system 5400 through model repository & deployment target 5470. Upon receipt, model weight analysis engine 5410 begins processing the model layer by layer. For the embedding layer containing 250 million parameters, analysis engine 5410 identifies a clustered distribution with semantic grouping of related token embeddings. For the transformer layers, it recognizes the characteristic patterns in attention heads and feed-forward networks, including the sparse activation patterns in the latter. The analysis engine 5410 computes statistical profiles for each layer, determining that embedding weights follow an approximately normal distribution with specific variance, while attention weights exhibit more structured patterns with certain symmetries that can be exploited for compression.

These layer-specific analyses are passed to layer-specific codebook generator 5420, which creates customized encoding schemes for each layer type. For the embedding layer, codebook generator 5420 implements product quantization that groups semantically similar embeddings, reducing the effective vocabulary size while maintaining representational power. For attention layers, it creates a specialized codebook that captures the head-specific patterns and cross-attention structures. The feed-forward networks, being particularly sparse after training, receive a codebook optimized for run-length encoding of zero or near-zero values, with higher precision allocated to the relatively few significant weights.

The codebooks and layer analyses are then provided to multi-resolution encoding engine 5430, which applies the layer-specific encoding schemes to compress the model. The encoding engine 5430 implements a progressive encoding approach for the LLM, where the most critical weights (determined by activation magnitude and gradient sensitivity) are encoded at higher precision, while less critical weights receive more aggressive compression. For this example LLM, the encoding engine 5430 reduces the model size from 28 GB to 3.5 GB while maintaining 99.8% of the original model's performance on benchmark tasks.

During the encoding process, the engine 5430 generates metadata about the expected statistical properties of each encoded layer, which is passed to weight-specific intrusion detection module 5440. This module 5440 establishes baseline probability distributions for each layer's encoded representation, creating a security profile that will be used to detect unauthorized modifications. For example, module 5440 records that attention weight codewords should follow a specific distribution pattern with certain entropy characteristics, and that any significant deviation would indicate potential tampering.

The compressed model is then stored in secure encoded weight storage 5480, which maintains the encoded weights along with verification metadata. When the model is requested for deployment, the secure decoding and reconstruction engine 5450 retrieves the encoded model and begins the reconstruction process. For an edge device with limited resources, reconstruction engine 5450 might implement progressive loading, first decoding the critical weights at full precision to enable basic functionality, then gradually loading less critical components as resources permit.

Before transmission to the deployment target, weight-specific intrusion detection module 5440 performs a verification pass on the encoded weight stream. If the module 5440 detects anomalous statistical patterns—for instance, if certain attention weights show unexpected distribution shifts that could indicate a backdoor insertion attempt—it raises an alert and blocks transmission until the anomaly can be investigated.

Later, when the model requires an update to improve performance on specific tasks, only the changing weights need to be transmitted. The update differential encoder 5460 analyzes the differences between the original and updated models, finding that only 12% of the weights require significant updates. Instead of retransmitting the entire 3.5 GB compressed model, differential encoder 5460 creates a delta update package of only 420 MB that contains precisely the weights that need modification along with their positions in the model. This delta update is verified by intrusion detection module 5440 before being applied to the deployed model by reconstruction engine 5450.

Throughout this process, the system 5400 maintains both efficiency and security, ensuring that the deployed LLM remains faithful to its original design while requiring significantly less bandwidth and storage than conventional approaches. The layer-specific compression and intrusion detection capabilities work in concert to enable secure deployment of large models in resource-constrained environments that would otherwise be unable to utilize such advanced AI capabilities.

Figure 55:
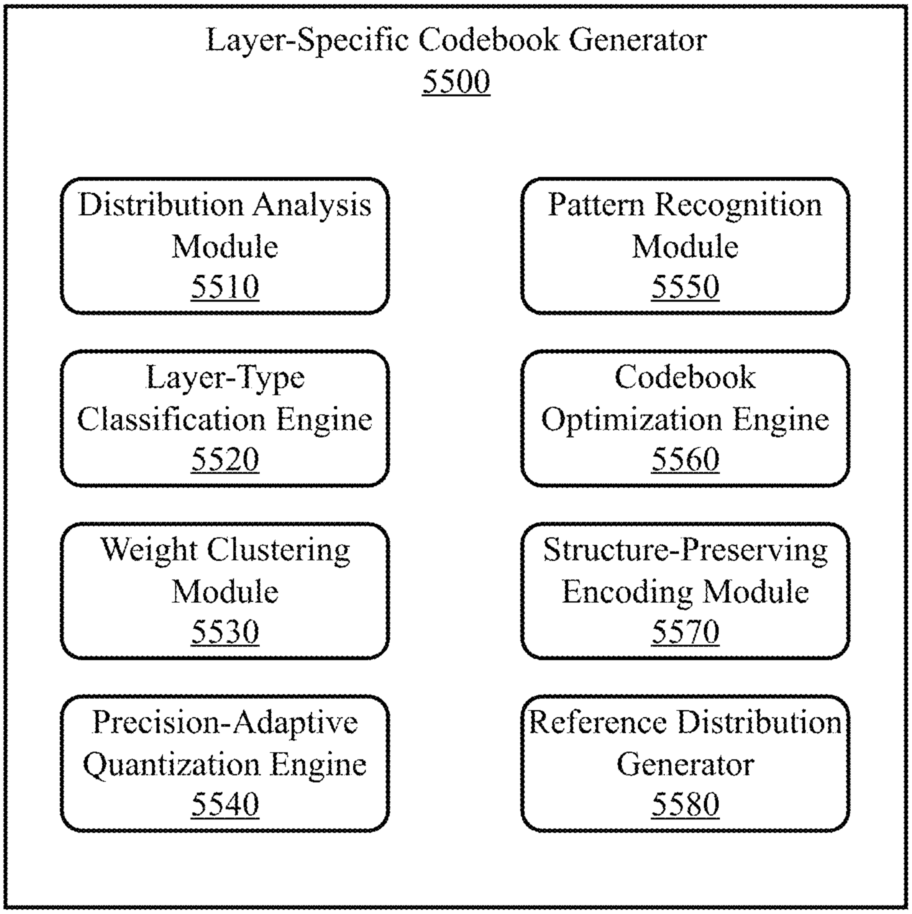
FIG. 55 is a diagram showing a more detailed view of the layer-specific codebook generator, according to an embodiment.

FIG. 55 is a diagram showing a more detailed view of the layer-specific codebook generator 5500, according to an embodiment. Codebook generator 5500 employs multiple specialized techniques to create optimized encoding schemes for different neural network layer types, dramatically improving compression efficiency compared to general-purpose compression methods.

According to a preferred embodiment, codebook generator 5500 comprises a distribution analysis module 5510 that receives layer statistics from the model weight analysis engine 5410. This module 5510 performs detailed statistical analysis on weight distributions for each layer type, identifying key characteristics such as variance, sparsity patterns, and value clustering. For convolutional layers, the module 5510 recognizes the spatial coherence and filter-specific patterns, while for transformer attention layers, it identifies the structured self-similarity and attention head patterns that can be leveraged for compression. The analysis module 5510 computes histograms, autocorrelation functions, and spectral decompositions to fully characterize the statistical properties unique to each layer type.

Connected to the analysis module 5510 is a layer-type classification engine 5520 that categorizes incoming neural network layers into specific types, each requiring different encoding strategies. The classification engine 5520 identifies layer types such as convolutional, fully-connected, embedding, attention, normalization, and recurrent layers based on their dimensional structure and statistical fingerprints. This classification allows the system to apply highly specialized encoding techniques optimized for each layer type rather than using a one-size-fits-all approach. For example, engine 5520 recognizes that embedding layers often contain semantic clusters that can be exploited for compression, while batch normalization layers contain scale and shift parameters with distinctly different statistical behaviors.

According to an aspect, codebook generator 5500 further comprises a weight clustering module 5530 that implements advanced clustering algorithms to identify groups of similar weights within each layer. For fully-connected layers, module 5530 can employ, for instance, k-means clustering to identify centroid values that can represent groups of similar weights, drastically reducing the unique values that need to be encoded. In convolutional layers, clustering module 5530 may identify filter-wise similarities and shared kernel patterns that emerge during training. For transformer models, it recognizes repeated attention patterns across different heads and positions. By representing clusters of similar weights with shared codewords, significant compression can be achieved with minimal impact on model accuracy.

A precision-adaptive quantization engine 5540 works in conjunction with the clustering module to determine optimal bit-width allocations for different weight regions based on their importance to model performance. According to an aspect, quantization engine 5540 employs Hessian-aware or sensitivity-based analysis to identify weights that require higher precision versus those that can be represented with fewer bits. Unlike standard uniform quantization, quantization engine 5540 creates non-uniform quantization schemes that allocate more bits to statistically critical regions of the weight distribution. For instance, weights with high activation gradients might receive 8-bit precision while less sensitive weights receive 4-bit or 2-bit precision, resulting in a model-aware compression scheme that minimizes accuracy loss.

Codebook generator 5500 may further comprise a pattern recognition module 5550 specifically designed to identify repeated structural patterns in weight matrices. This module 5550 employs various advanced pattern mining algorithms to discover recurring motifs in weight tensors, such as edge detectors in early convolutional layers or syntactic structures in language model embeddings. These identified patterns can then be encoded more efficiently as references to a pattern library rather than encoding each occurrence independently. In recurrent neural networks, pattern recognition module 5550 identifies temporal structures that repeat across different timesteps, while in graph neural networks it identifies node-relationship patterns that can be encoded more efficiently.

The system further incorporates a codebook optimization engine 5560 that performs iterative refinement of the codebooks to maximize compression while maintaining model accuracy. According to an aspect of an embodiment, optimization engine 5560 employs rate-distortion theory to balance compression ratio against model performance, using techniques such as vector quantization and entropy-constrained codebook design. The engine 5560 may generate multiple candidate codebooks with different compression-accuracy tradeoffs, allowing deployment flexibility based on bandwidth and performance requirements. For critical models, optimization engine 5560 can be configured to prioritize lossless encoding, while for applications with higher tolerance for variance, it can generate more aggressive lossy compression schemes.

A structure-preserving encoding module 5570 ensures that important structural relationships between weights are maintained even after compression. This module 5570 is particularly important for preserving architectural properties such as symmetry in certain matrix operations, orthogonality in embedding spaces, or hierarchical relationships in nested models. By preserving these structural properties, the encoded model maintains its mathematical characteristics after decompression, ensuring consistent behavior. For example, in a U-Net architecture, the structural relationships between encoder and decoder weights are preserved to maintain the model's ability to reconstruct detailed outputs.

Furthermore, the codebook generator 5500 may comprise a reference distribution generator 5580 that creates statistical profiles of each layer's expected weight distributions after encoding. These reference distributions serve as security baselines for the intrusion detection module 5440 to identify anomalous modifications during transmission or storage. The reference generator 5580 computes various statistical moments, entropy measures, and distribution parameters that characterize the encoded weights in their uncompromised state. By establishing these reference distributions during the secure encoding process, the system creates a tamper-evident packaging for model weights that can detect subtle adversarial modifications or poisoning attempts.

In operation, the layer-specific codebook generator 5500 processes each layer of a neural network separately, creating customized encoding schemes that capitalize on the unique statistical properties of that layer type. This layer-specific approach yields compression ratios significantly higher than general-purpose methods while maintaining model accuracy and providing strong security properties through the generated reference distributions.

Figure 56:
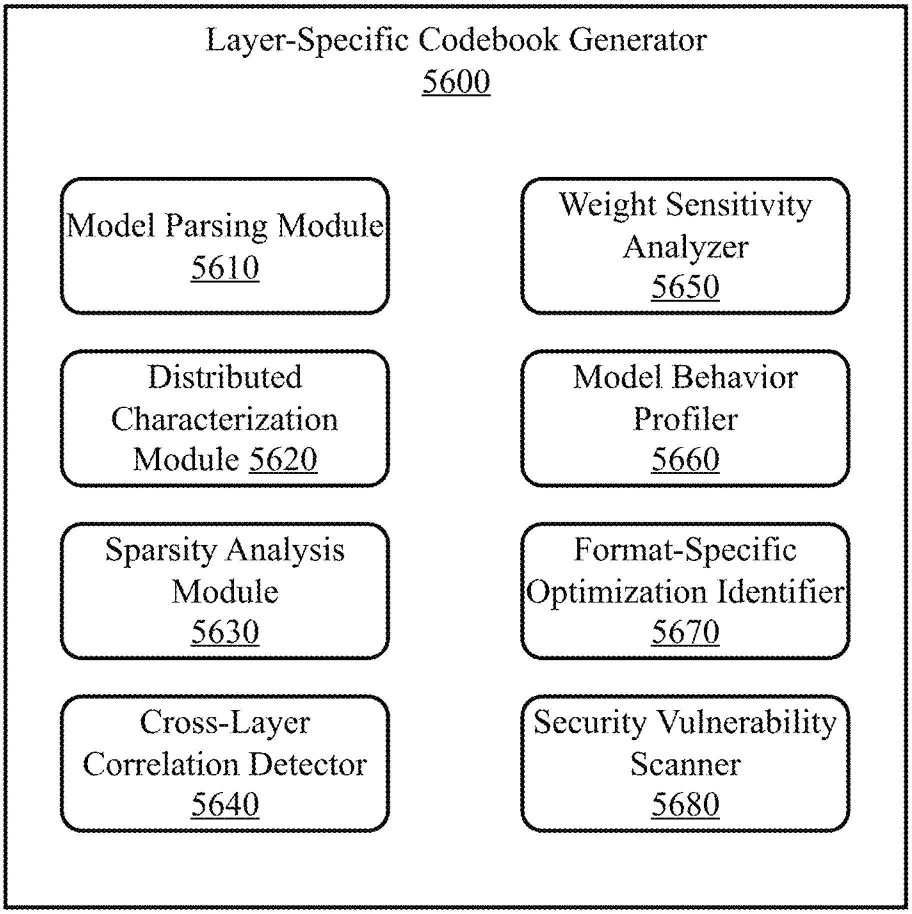
FIG. 56 is a diagram showing a more detailed view of the model weight analysis engine, according to an embodiment.

FIG. 56 is a diagram showing a more detailed view of the model weight analysis engine 5600, according to an embodiment. Model weight analysis engine 5600 serves as the foundational component of the model weight compression system, performing analysis of neural network weights to enable optimal compression and security strategies.

According to a preferred embodiment, the model weight analysis engine 5600 comprises a model parsing module 5610 that receives neural network models in various formats (e.g., PyTorch, TensorFlow, ONNX, etc.) and extracts their layer structures and weight tensors. This parsing module 5610 identifies the architectural organization of the model, including layer connectivity, activation functions, and parameter sharing schemes. For complex architectures like transformers with attention mechanisms or convolutional networks with residual connections, the parsing module 5610 constructs a comprehensive graph representation that captures both the sequential and parallel aspects of the model's computation flow. This structural understanding is critical for layer-specific compression strategies that must preserve the model's functional characteristics.

Connected to the parsing module 5610 is a distribution characterization module 5620 that performs in-depth statistical analysis of the weight distributions in each layer. This module 5620 computes comprehensive statistical profiles including moments (mean, variance, skewness, kurtosis), quantiles, and entropy measures for each weight tensor. For transformer models, the distribution characterization module 5620 may recognize the characteristic patterns in query, key, and value projection matrices that differ from output projection weights. In convolutional networks, it identifies the distinct statistical signatures of early feature-extraction filters versus later semantic filters. These detailed statistical profiles guide the subsequent compression strategies by revealing which distribution assumptions are appropriate for each layer type.

The analysis engine 5600 may further comprise a sparsity analysis module 5630 that identifies sparse regions and patterns within the weight tensors. This module 5630 examines not only the overall sparsity ratio but also the structural characteristics of the sparsity, such as block-sparsity in attention heads or channel-wise sparsity in convolutional filters. The sparsity analysis module 5630 may employ threshold-based methods as well as more sophisticated techniques to identify weights that contribute minimally to the model's output and could potentially be pruned or highly compressed. For models that have undergone sparsification during training, module 5630 recognizes and preserves the intentional sparsity patterns that are critical to the model's functionality.

A cross-layer correlation detector 5640 may be present and configured to examine relationships between weights across different layers to identify compression opportunities that span multiple components of the network. This correlation detector 5640 recognizes patterns such as the mirroring between encoder and decoder weights in autoencoder architectures, or the progressive refinement patterns in hierarchical feature extractors. By identifying these cross-layer dependencies, the system can implement compression strategies that maintain the relational integrity of the model rather than compressing each layer in isolation. This is particularly important for preserving model accuracy in architectures with significant skip connections or layer interdependencies.

The analysis engine 5600 may further comprise a weight sensitivity analyzer 5650 that estimates the impact of precision reduction on model performance. This sensitivity analyzer 5650 may employ techniques such as Hessian-based analysis or perturbation studies to identify which weights require high precision and which can tolerate aggressive quantization with minimal performance impact. Unlike uniform compression approaches, this differentiated sensitivity analysis enables precision-adaptive encoding where critical weights receive more bits than less important ones. For large language models, the sensitivity analyzer 5650 may determine that certain attention head weights are disproportionately important for maintaining coherent outputs, while others could be significantly compressed with minimal performance degradation.

According to an aspect, a model behavior profiler 5660 performs selective inference passes with the original model to establish baseline behavioral characteristics that must be preserved after compression. This profiler 5660 captures activation patterns, output distributions, and attention maps (for transformer models) that serve as functional signatures of the model. These behavioral profiles can be later used to verify that the compressed model maintains not just overall accuracy but also the qualitative characteristics of the original model, such as attention to similar input features or equivalent uncertainty distributions in outputs.

The system further comprises a format-specific optimization identifier 5670 that recognizes opportunities for specialized encoding based on the neural network framework and hardware targets. This optimization identifier 5670 identifies framework-specific patterns such as the memory layout of weights in PyTorch versus TensorFlow, or hardware-specific opportunities like alignment requirements for efficient inference on GPUs or tensor processing units. By accounting for these implementation details, the resulting compression can maintain compatibility with acceleration libraries and hardware-specific optimizations in the target deployment environment.

According to an embodiment, model weight analysis engine 5600 incorporates a security vulnerability scanner 5680 that examines the model for potential weaknesses that might be exploited in adversarial settings. This vulnerability scanner 5680 identifies weight patterns that might indicate backdoors or specific sensitivities to adversarial examples. By flagging these potential vulnerabilities during the analysis phase, the system can implement targeted security measures during encoding to mitigate risks. The security scanner 5680 also establishes baseline statistical signatures that will be used by the intrusion detection module 5440 to identify unauthorized modifications to the model during transmission or storage.

The outputs from all these specialized analysis components can be integrated and passed to the layer-specific codebook generator 5500, which uses these insights to create optimized encoding schemes for each layer type. This comprehensive analysis enables compression ratios substantially higher than general-purpose methods while ensuring that the compressed model maintains both the functional accuracy and security characteristics of the original.

Figure 57:
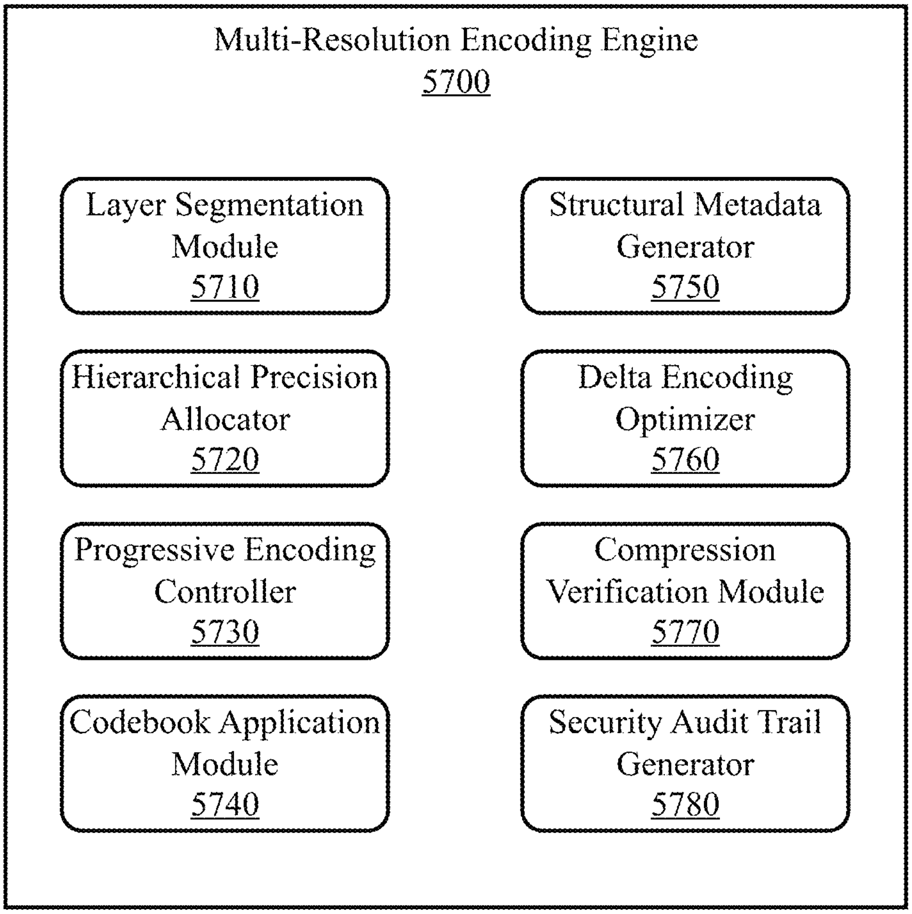
FIG. 57 is a diagram showing a more detailed view of the multi-resolution encoding engine, according to an embodiment.

FIG. 57 is a diagram showing a more detailed view of the multi-resolution encoding engine 5700, according to an embodiment. The multi-resolution encoding engine 5700 represents the core compression component of the model weight compression system, implementing advanced techniques to achieve efficient, secure, and functionally-preserving encoding of neural network weights.

According to an embodiment, the multi-resolution encoding engine 5700 comprises a layer segmentation module 5710 that processes incoming neural network layers to identify sub-regions within each layer that should receive different compression treatments. This segmentation module 5710 can be configured to divide weight tensors into regions based on both their structural significance (such as attention heads in transformers or filter groups in convolutional networks) and their statistical characteristics. For large language models, segmentation module 5710 may divide attention matrices into head-specific segments, while for computer vision models it may separate early feature detectors from later semantic classifiers. This granular segmentation enables precision-tailored encoding that maximizes compression while preserving model functionality.

Connected to the segmentation module 5710 is a hierarchical precision allocator 5720 that determines the appropriate bit-width for each segment based on its importance to model performance. In various aspects, precision allocator 5720 can implement a multi-resolution strategy where the most critical weights receive higher precision encoding, while less sensitive regions receive progressively lower precision. For example, in a transformer model, the query projection weights might receive 8-bit precision, while key and value projections that show higher tolerance to compression might receive 4-bit precision. The precision allocator 5720 can use the sensitivity analysis provided by model weight analysis engine 5600 to make these determinations, creating a bit allocation map for each layer that can guide the subsequent encoding process.

According to some embodiments, encoding engine 5700 further comprises a progressive encoding controller 5730 that organizes the compressed representation into a layered structure enabling partial decoding based on available resources or application requirements. This controller 5730 may be configured to implement a coarse-to-fine encoding scheme where a base layer captures the essential structure of the weights at lower precision, while enhancement layers progressively refine the representation. This progressive structure allows deployment scenarios where a simplified version of the model can be quickly loaded with minimal bandwidth, and additional detail can be streamed as needed. For edge device deployment, the progressive controller 5730 may prioritize weights critical for primary functionality, allowing basic inference even before the complete model is transferred.

According to some aspects, a codebook application module 5740 applies the layer-specific codebooks generated by codebook generator 5500 to each weight segment according to the precision allocation map. This application module 5740 implements one or more actual encoding processes, such as mapping original weight values to their corresponding codewords from the appropriate codebook. For vector quantization schemes, the module 5740 may implement nearest-neighbor searches to find optimal codeword matches, while for scalar quantization it may apply the quantization bins determined during codebook generation. Codebook application module 5740 handles the various encoding schemes optimized for different layer types, such as product quantization for embedding layers or run-length encoding for sparse layers.

The encoding engine 5700 may further comprise a structural metadata generator 5750 that creates compact encoding of the model's architectural information necessary for proper reconstruction. In some embodiments, metadata generator 5750 produces a minimal representation of the model's structure, including layer dimensions, connectivity, and activation functions, while omitting unnecessary implementation details. For models with complex architectures, the metadata generator 5750 can be configured to employ graph compression techniques to efficiently encode the relationships between components. This structural metadata is important for the decoder to properly interpret the compressed weight representations and reconstruct the functional model.

A delta encoding optimizer 5760 identifies opportunities for reference-based encoding where weights can be represented as modifications to a base value rather than encoded independently. This optimizer 5760 is particularly effective for models fine-tuned from a common base model, where many weights change minimally during specialization. Instead of encoding each weight directly, the delta encoding optimizer 5760 represents weights as offsets from reference values, dramatically reducing the bits required for representation, according to some embodiments. For domain-specific models derived from general foundations, this approach can reduce the encoded size significantly (e.g., up to 90%) compared to direct encoding of the full weights.

The system further incorporates a compression verification module 5770 that performs functional validation of the encoded representation to ensure accuracy preservation. This verification module 5770 may implement selective decoding and inference tests on representative inputs, comparing the outputs against the original model's behavior profiles captured during analysis. Unlike simple numerical error metrics, verification module 5770 focuses on preserving the functional characteristics that matter for model performance, such as classification decision boundaries or generation coherence in language models. If accuracy degradation exceeds configured thresholds, verification module 5770 can signal the precision allocator 5720 to adjust bit allocations for problematic regions.

According to some embodiments, multi-resolution encoding engine 5700 further comprises a security audit trail generator 5780 that embeds cryptographic signatures and statistical fingerprints throughout the compressed representation to enable tamper detection. In some aspects, this audit trail generator 5780 computes layer-wise checksums and distributional signatures that are interwoven with the encoded weights, creating a tamper-evident packaging that allows the intrusion detection module 5440 to identify unauthorized modifications at a granular level. By distributing these security markers throughout the encoding rather than applying them only at the file level, the system can pinpoint specific tampering attempts and distinguish them from transmission errors or corruption.

Multi-resolution encoding engine 5700 produces a compressed weight representation that achieves multiple objectives simultaneously: high compression ratio through layer-specific optimal encoding, preserved model functionality through sensitivity-guided precision allocation, deployment flexibility through progressive encoding structures, and enhanced security through embedded verification markers. This sophisticated encoding approach enables the efficient and secure distribution of neural networks across bandwidth-constrained environments while maintaining their performance characteristics.

Figure 58:
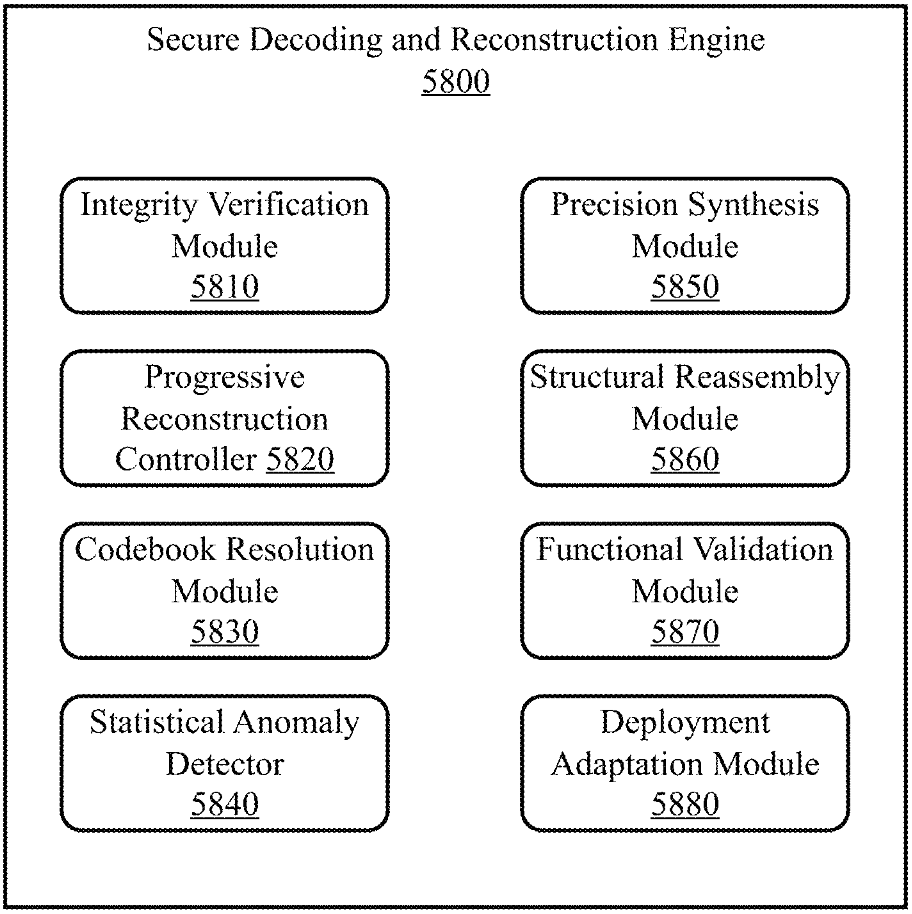
FIG. 58 is a diagram showing a more detailed view of the secure decoding and reconstruction engine, according to an embodiment.

FIG. 58 is a diagram showing a more detailed view of the secure decoding and reconstruction engine 5800, according to an embodiment. The secure decoding and reconstruction engine 5800 represents the counterpart to the encoding system, responsible for securely reconstructing neural network models from their compressed representations while verifying integrity and detecting potential tampering. In some embodiments, reconstruction engine 5800 may be configured to support functionality provided by data reconstruction engine 108 and variants thereof described herein.

According to an embodiment, secure decoding and reconstruction engine 5800 comprises an integrity verification module 5810 that serves as the first line of defense against compromised model weights. This verification module 5810 examines incoming compressed weight streams to validate their cryptographic signatures and statistical fingerprints before decoding begins. For each layer of the model, integrity verification module 5810 computes checksums and distribution metrics that are compared against the security audit trails embedded during encoding. Any discrepancies trigger security alerts and can halt the reconstruction process to prevent the deployment of potentially compromised models. This verification occurs at multiple granularity levels, from overall file integrity to layer-specific and segment-specific checks, allowing precise identification of tampering attempts.

Connected to the verification module 5810 is a progressive reconstruction controller 5820 that manages the multi-phase decoding process for models encoded with hierarchical resolution layers. This reconstruction controller 5820 implements an adaptive loading strategy where critical model components are decoded first to enable basic functionality, followed by progressive enhancement as additional compressed data becomes available. For edge devices with limited bandwidth, the controller 5820 may prioritize decoding weights essential for core inference tasks while deferring less critical enhancement layers. This approach allows deployment scenarios where models become functional before the complete compressed representation has been transferred, particularly valuable for large models deployed in constrained environments.

The reconstruction engine 5800 further includes a codebook resolution module 5830 that locates and applies the appropriate decoding codebooks for each layer and segment of the compressed model. According to some embodiments, resolution module 5830 manages the mapping between encoded codewords and their corresponding weight values, implementing the inverse of the encoding process performed by the multi-resolution encoding engine 5700. For vector-quantized layers, the module 5830 performs lookups in the appropriate codebooks to reconstruct the original weight values, while for delta-encoded regions it applies the offset values to reference weights to produce the final values. Codebook resolution module 5830 handles the variety of encoding schemes used across different layer types, ensuring accurate reconstruction regardless of the specific compression technique applied.

A statistical anomaly detector 5840 monitors the decoded weight distributions to identify potential signs of tampering that might not be caught by cryptographic verification alone. According to an aspect, anomaly detector 5840 compares the statistical properties of reconstructed weights against the reference distributions generated during encoding. Subtle modifications that maintain cryptographic integrity but alter model behavior, such as targeted backdoor insertions, often create detectable statistical anomalies in weight distributions. By implementing this additional layer of security during reconstruction, the system can identify sophisticated attacks designed to bypass traditional integrity checks. The anomaly detector 5840 is particularly sensitive to localized changes that might affect specific classification outcomes while leaving overall model statistics largely unchanged.

The reconstruction engine 5800 may further comprise a precision synthesis module 5850 that combines multi-resolution encoded weights to produce the final reconstructed values at appropriate precision levels. This synthesis module 5850 implements the inverse of the hierarchical precision allocation performed during encoding, reconstructing weights by combining base representation with enhancement layer information. For deployments with different precision requirements, the synthesis module 5850 can selectively reconstruct weights at reduced precision to improve performance while maintaining acceptable accuracy. In quantized models, the synthesis module 5850 may implement dequantization with calibrated scaling factors to maximize accuracy after reconstruction.

A structural reassembly module 5860 reconstructs the complete neural network architecture using the compact metadata encoded with the weights. This reassembly module 5860 interprets the encoded structural information to recreate layer connectivity, tensor shapes, and activation functions necessary for a functioning model. For complex architectures with branching computation paths or skip connections, the reassembly module 5860 ensures that all components are properly interconnected according to the original design. This module 5860 supports various neural network frameworks, generating reconstructed models in the appropriate format for the target deployment environment, whether PyTorch, TensorFlow, or framework-specific optimized formats.

The system further incorporates a functional validation module 5870 that performs inference tests on the reconstructed model to verify behavioral consistency with the original. According to various embodiments, validation module 5870 executes the model on calibration inputs and compares the outputs against expected reference values or statistical profiles captured during encoding. Beyond simple accuracy metrics, the functional validation examines behavioral characteristics such as attention patterns, uncertainty calibration, or robustness to input variations. This end-to-end verification ensures that the reconstructed model maintains not just numerical similarity to the original weights but also the functional properties critical for its intended application.

According to an embodiment, secure decoding and reconstruction engine 5800 comprises a deployment adaptation module 5880 that optimizes the reconstructed model for specific target hardware or software environments. This adaptation module 5880 performs post-reconstruction optimizations such as memory layout adjustments, operator fusion, or hardware-specific quantization to maximize performance on the deployment target. For edge devices with specialized neural processing units, the adaptation module 5880 may convert the reconstructed model into hardware-specific instructions optimized for that architecture. These final optimizations ensure that the reconstructed model achieves maximum performance in its operational environment while maintaining the accuracy and security properties established during the encoding-decoding process.

The secure decoding and reconstruction engine 5800 thus provides comprehensive capabilities for safely reconstructing neural network models from their compressed representations. Its multi-layered security approach combines cryptographic verification with statistical anomaly detection to identify potential tampering, while its progressive reconstruction capabilities enable flexible deployment across diverse computing environments.

Figure 59:
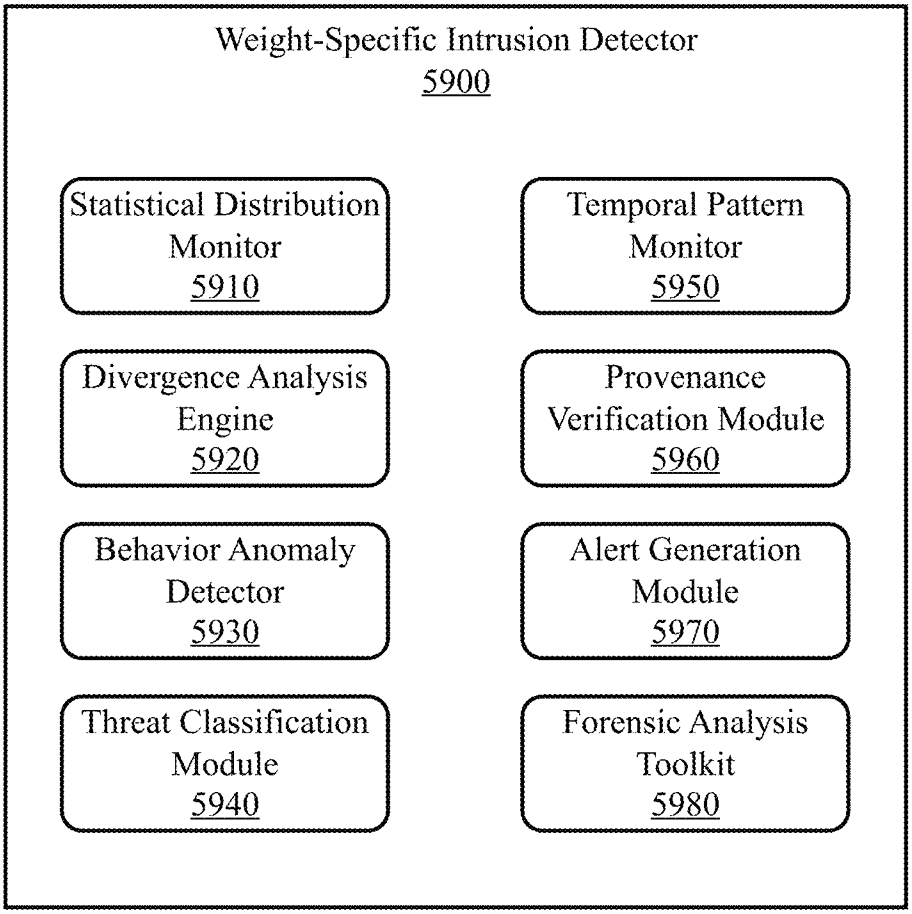
FIG. 59 is a diagram showing a more detailed view of the weight-specific intrusion detection module, according to an embodiment

FIG. 59 is a diagram showing a more detailed view of the weight-specific intrusion detection module 5900, according to an embodiment. The weight-specific intrusion detection module 5900 represents the specialized security component of the model weight compression system, designed to detect unauthorized modifications, poisoning attempts, and other security threats targeting neural network models.

According to a preferred embodiment, the weight-specific intrusion detection module 5900 comprises a statistical distribution monitor 5910 that continuously analyzes the probability distributions of encoded weight streams during transmission or storage. Distribution monitor 5910 can be configured to compute real-time statistical profiles of the encoded weights and compares them against reference distributions generated during the encoding process. Unlike generic data integrity checks, this component is specifically calibrated to the expected statistical properties of neural network weights organized by layer types. For transformer models, the monitor 5910 can track the characteristic distributions of attention projection matrices, while for convolutional networks it examines filter pattern statistics. Any significant divergence from the expected distributions triggers further investigation as a potential security threat.

Connected to the distribution monitor 5910 is a divergence analysis engine 5920 that applies specialized statistical algorithms to quantify the degree of deviation between observed and reference probability distributions. This analysis engine 5920 implements methods such as Kullback-Leibler divergence, Jensen-Shannon divergence, and Wasserstein distance to measure distributional shifts in the encoded weight streams. The divergence analysis engine 5920 maintains layer-specific and architecture-specific thresholds for acceptable variation, recognizing that different model components naturally exhibit different levels of statistical variability. When computed divergence exceeds these calibrated thresholds, the engine 5920 signals a potential intrusion requiring investigation.

The intrusion detection module 5900 may further comprise a behavioral anomaly detector 5930 that examines subtle changes in model behavior that might indicate poisoning attacks. This anomaly detector 5930 can implement selective decoding and inference tests on suspicious weight regions, comparing the resulting behavior against baseline functional profiles. For classification models, the detector 5930 may examine decision boundary shifts on probe inputs, while for generative models it might analyze changes in output distributions. This behavioral analysis complements the statistical monitoring by identifying functionally significant modifications that might be statistically subtle. The anomaly detector 5930 is particularly effective at identifying targeted backdoors designed to affect model behavior only on specific inputs while maintaining normal performance otherwise.

A threat classification module 5940 analyzes detected anomalies to categorize potential security threats based on their characteristics. This classification module 5940 distinguishes between different types of attacks, such as general model corruption, targeted backdoor insertion, data poisoning, or adversarial vulnerability injection. Each threat category exhibits distinct patterns in how it affects weight distributions and model behavior. By classifying the nature of detected anomalies, the system can implement appropriate mitigation strategies and provide specific security alerts. The threat classification module 5940 may employ a library of known attack signatures and machine learning methods to identify both established and novel attack patterns.

The intrusion detection module 5900 may further comprise a temporal pattern monitor 5950 that examines weight changes over time to identify suspicious modification patterns across model updates. Temporal monitor 5950 is particularly valuable for detecting gradual poisoning attacks that might introduce malicious modifications incrementally across multiple model versions to avoid detection. By tracking the evolution of weight distributions and model behavior across updates, the temporal monitor 5950 can identify concerning trends even when individual updates remain below immediate detection thresholds. This longitudinal security analysis is essential for models that undergo regular updates or participate in federated learning environments.

A provenance verification module 5960 validates the claimed source and lineage of received model weights against trusted records. According to an aspect of an embodiment, verification module 5960 examines cryptographic signatures, organizational certificates, and model lineage metadata to confirm that weights originate from authorized sources. For models distributed across multiple organizations or through model marketplaces, the provenance verification ensures that received models have not been substituted or tampered with during distribution. This module 5960 can be configured to implement chain-of-custody verification that traces model provenance from original training through any fine-tuning or adaptation steps to the point of deployment.

According to an embodiment, the system further incorporates an alert generation and escalation module 5970 that produces appropriate security notifications based on detected anomalies. Alert module 5970 implements a graduated response system where the severity and confidence of detected threats determine the nature of the generated alerts. Minor statistical anomalies might trigger logging and monitoring escalation, while clear evidence of malicious tampering would generate immediate blocking alerts and security lockdowns. The alert module 5970 provides detailed contextual information with each notification, including, but not limited to, the affected model regions, the nature of the detected anomaly, and recommended mitigation actions. This contextual information enables security teams to quickly assess and respond to potential threats.

According to some embodiments, weight-specific intrusion detection module 5900 includes a forensic analysis toolkit 5980 that provides detailed investigative capabilities for examining suspicious weight modifications. Forensic toolkit 5980 implements specialized visualization and analysis tools for neural network weights, allowing security analysts to examine affected regions in detail. For identified tampering attempts, the toolkit can isolate modified weights, compare them against reference values, and simulate the functional impact of the modifications. These forensic capabilities support both post-incident analysis and active threat hunting, allowing organizations to understand attempted attacks and improve defenses against similar future threats.

The weight-specific intrusion detection module 5900 provides comprehensive security monitoring tailored specifically to neural network weights. By combining statistical distribution analysis, behavioral verification, temporal monitoring, and forensic capabilities, it enables the detection of complex attacks that might bypass traditional security measures. This specialized protection is increasingly critical as neural networks become integrated into sensitive and high-value systems across various industries.

Figure 60:
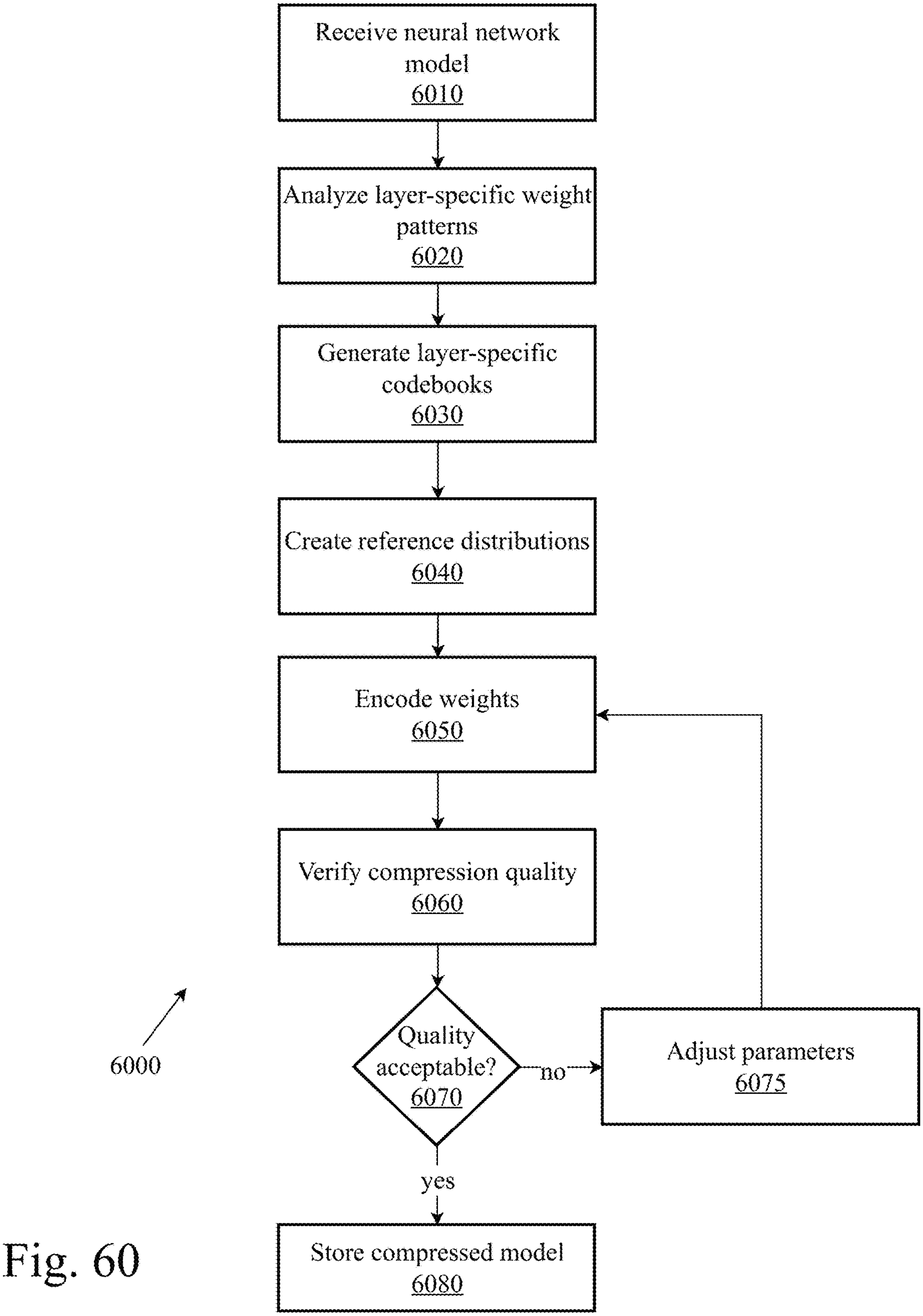
FIG. 60 is a flow diagram illustrating an exemplary method for model weight compression with intrusion protection, according to an embodiment.

FIG. 60 is a flow diagram illustrating an exemplary method 6000 for model weight compression with intrusion protection, according to an embodiment. This method provides an approach to efficiently compress neural network weights while maintaining both functional accuracy and security guarantees against tampering or poisoning attacks.

According to an embodiment, the process begins at step 6010 with receiving a neural network model in any common format such as (but not limited to) PyTorch, TensorFlow, or ONNX. The model may be a complete neural network architecture including pre-trained weights, ranging from smaller computer vision models to large language models with billions of parameters. The receiving step may further comprise validating the source of the model through cryptographic signatures and extracting its architectural information for subsequent processing.

Following receipt of the model, the method proceeds to analyze layer-specific weight patterns at step 6020 to identify optimal compression strategies for each component. This analysis step may examine one or more of the statistical distributions, sparsity patterns, and sensitivity characteristics of weights in different layer types. For transformer models, this analysis identifies the distinct patterns in attention projection matrices versus feed-forward networks, while for convolutional networks it characterizes early feature extraction filters differently from later semantic layers. The analysis identifies cross-layer dependencies, architectural symmetries, and computational sensitivity to precision reduction, creating a comprehensive profile that guides subsequent compression decisions.

Based on the layer-specific analysis, the method generates specialized codebooks at step 6030 optimized for each layer type. These codebooks implement encoding schemes tailored to the statistical properties identified in the previous step. For embedding layers with semantic clustering, the codebooks might implement product quantization techniques, while for sparse layers they might employ run-length encoding or magnitude-based pruning representations. The codebooks may be generated through iterative optimization that balances compression ratio against model performance, creating encoding schemes that maximize efficiency while preserving critical weight values. This step may include clustering similar weights, identifying structural patterns, and determining optimal bit allocation across different weight regions.

The method then creates reference distributions at step 6040 for each encoded layer that will serve as security baselines for intrusion detection. These reference distributions capture the statistical signatures of properly encoded weights, including distributional moments, entropy measures, and correlation patterns. The reference distributions are computed at multiple granularity levels, from overall layer statistics to local region patterns, creating a comprehensive security profile for the model. These reference distributions enable the detection of unauthorized modifications during transmission or storage, as tampering attempts typically alter the statistical properties of the encoded weights in detectable ways.

With codebooks and reference distributions established, the method proceeds to encode weights using the layer-specific codebooks at step 6050. This encoding step implements the actual compression, mapping original weight values to their corresponding codewords according to the optimized schemes. For models with hierarchical importance, this step may implement progressive encoding where critical weights receive higher precision representation while less sensitive regions receive more aggressive compression. The encoding process includes embedding security markers throughout the compressed representation, creating a tamper-evident packaging that enables granular intrusion detection. Metadata about the model's structure and encoding parameters is also included to enable proper reconstruction.

After encoding, the method verifies the compression quality at step 6060 through selective decoding and functional testing. This verification ensures that the compressed representation maintains the model's performance characteristics within acceptable tolerances. The verification may include inference tests on calibration inputs, comparing outputs against the original model's behavior to confirm functional preservation. Beyond simple accuracy metrics, this step examines behavioral characteristics such as decision boundaries, uncertainty calibration, or generative properties to ensure comprehensive quality preservation. This verification is critical for confirming that the compression preserves not just numerical similarity to original weights but also the functional properties essential for the model's intended application.

The method then evaluates whether the compression quality is acceptable 6070 based on predefined thresholds for accuracy, performance, and security guarantees. If the quality does not meet these thresholds, the method adjusts compression parameters at step 6075 and returns to the encoding step for another iteration. These adjustments may include modifying bit allocations, refining codebook entries, or adjusting the balance between compression ratio and accuracy preservation. The method iteratively refines the compression until the quality requirements are satisfied, ensuring that the final compressed representation meets all functional and security specifications.

Upon achieving acceptable quality, the method stores the compressed model at step 6080 along with its codebooks, reference distributions, and metadata necessary for secure reconstruction. The stored representation includes the encoded weights, security verification markers, and architectural information needed for deployment. This packaged model is significantly smaller than the original while maintaining its functional characteristics and incorporating security features that enable tamper detection during distribution or deployment.

The method 6000 thus provides a comprehensive approach to neural network weight compression that addresses both efficiency and security concerns. By implementing layer-specific encoding strategies based on detailed weight analysis, the method achieves compression ratios substantially higher than general-purpose techniques while maintaining model accuracy. The integrated security features enable the detection of unauthorized modifications, protecting deployed models against increasingly sophisticated attacks targeting artificial intelligence systems.

Figure 61:
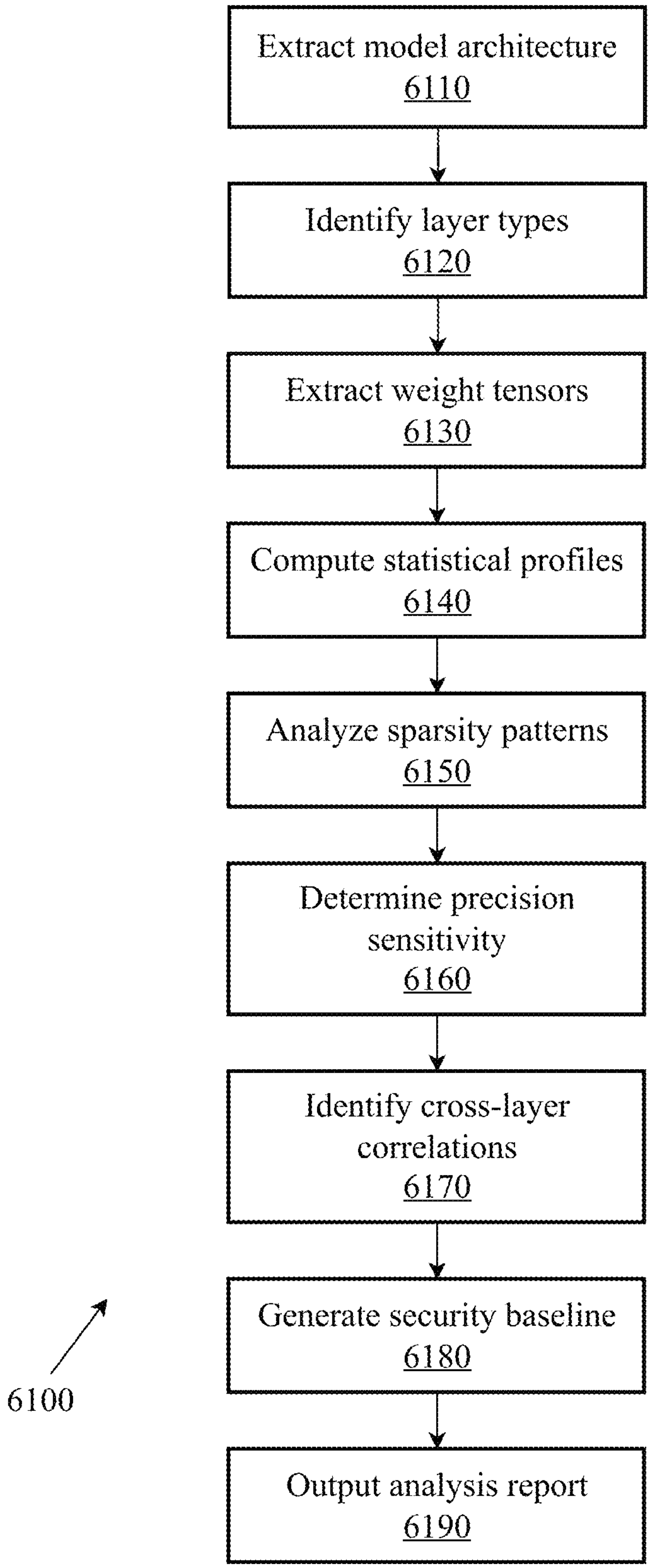
FIG. 61 is a flow diagram illustrating an exemplary method for model weight analysis, according to an embodiment.

FIG. 61 is a flow diagram illustrating an exemplary method 6100 for model weight analysis, according to an embodiment. This method provides a systematic approach to characterizing neural network weights and identifying optimal compression strategies for each layer type.

According to an embodiment, the process begins at step 6110 with extracting the model architecture from the received, retrieved, or otherwise obtained neural network. This extraction step parses the model's structural information, identifying all layers, their connectivity patterns, and computational pathways. For complex architectures such as transformers with multi-headed attention mechanisms or convolutional networks with residual connections, this step may create a comprehensive graph representation capturing both sequential and parallel computation flows. The extraction process handles various model formats including PyTorch, TensorFlow, ONNX, or proprietary formats, translating the architecture into a standardized internal representation for subsequent analysis.

Following architecture extraction, the method proceeds to identify layer types present in the model at step 6120. This identification step categorizes each layer according to its computational function, recognizing standard types such as convolutional, fully-connected, embedding, attention, and normalization layers, as well as specialized variants particular to certain architectures. The identification process examines not only the declared layer types but also their operational characteristics and parameter patterns, as the same functional layer may be implemented differently across frameworks. This layer-type classification is critical for applying appropriate compression strategies, as different layer types exhibit distinct statistical properties and sensitivity characteristics.

The method extracts weight tensors at step 6130 from each identified layer for detailed analysis. This extraction separates the actual weight values from other model components such as activation functions, computational graphs, and runtime-specific metadata. For each layer, the extraction preserves the dimensional structure and relationship between weight tensors, including distinctions between kernel weights, bias terms, and other layer-specific parameters. The extraction process may reorganize weight tensors into standardized formats optimized for statistical analysis, while maintaining mappings back to the original model structure for subsequent reintegration.

The method computes comprehensive statistical profiles at step 6140 for each layer and weight tensor. These profiles may comprise distribution metrics such as, but not limited to, moments (mean, variance, skewness, kurtosis), histograms, quantiles, and entropy measures that characterize the statistical nature of each weight tensor. For transformer models, separate profiles are computed for query, key, value, and output projection matrices, while for convolutional networks, profiles distinguish between early feature extraction filters and later semantic layers. These statistical profiles reveal patterns such as Gaussian-like distributions in certain layers, sparse distributions in others, or structured patterns specific to particular architectures. The profiles guide subsequent compression decisions by identifying distribution assumptions appropriate for each layer type.

The method proceeds to analyze sparsity patterns within the weight tensors at step 6150, identifying both the degree and structure of sparsity across different layers. This analysis examines weight magnitudes to identify near-zero values that contribute minimally to model performance, as well as structured sparsity such as block-sparse attention patterns or channel-wise sparsity in convolutional layers. For models that have undergone pruning during training, this step recognizes intentional sparsity patterns that must be preserved for functional integrity. The sparsity analysis produces detailed maps showing not just overall sparsity ratios but the specific distribution of significant weights within each tensor, enabling targeted encoding strategies that capitalize on this sparsity.

Building on the statistical and sparsity analyses, the method determines precision sensitivity for different weight regions at step 6060, identifying which weights require high precision representation and which can tolerate aggressive quantization. This determination employs techniques such as Hessian-based analysis, perturbation studies, or activation gradient examination to estimate the impact of precision reduction on model performance. For classification models, precision sensitivity might be evaluated based on decision boundary stability, while for generative models it might consider output distribution fidelity. This precision sensitivity analysis produces detailed maps that guide bit allocation during encoding, enabling non-uniform quantization schemes that allocate more bits to critical weights while aggressively compressing less sensitive regions.

The method identifies cross-layer correlations at step 6170 by examining relationships between weights in different parts of the network. This correlation analysis can recognize architectural patterns such as symmetry between encoder and decoder weights in autoencoders, progressive refinement patterns in hierarchical networks, or parameter sharing across similar functional units. By identifying these dependencies, the method enables compression strategies that maintain relational integrity across the model rather than compressing each layer in isolation. This cross-layer understanding is particularly important for preserving model accuracy in architectures with significant skip connections or other forms of deep layer interdependence.

Based on all previous analyses, the method generates a security baseline at step 6180 that characterizes the expected statistical properties and weight patterns when the model is uncompromised. This baseline may comprise detailed distributional signatures at multiple granularity levels, from overall layer statistics to local region patterns that would be affected by targeted modifications. The security baseline establishes reference points against which encoded weights can be compared during transmission or deployment to detect unauthorized modifications. By developing a comprehensive characterization of the original weight properties, this step enables the subsequent intrusion detection system to identify anomalies that might indicate tampering or poisoning attempts.

At step 6190, the method outputs a comprehensive analysis report that integrates all findings and provides guidance for optimal compression. This report may comprise, but is not limited to, layer-by-layer recommendations for encoding strategies, precision allocations, and security considerations based on the detailed weight analysis. The report identifies high-leverage compression opportunities where significant size reduction can be achieved with minimal impact on model performance, as well as sensitive regions requiring more conservative approaches. The analysis report serves as the blueprint for subsequent compression steps, ensuring that encoding decisions are informed by detailed understanding of the model's weight characteristics and functional sensitivities.

The exemplary method 6100 provides a systematic approach to neural network weight analysis that enables optimized compression and security protection. By examining the statistical, structural, and functional properties of weights across different layer types, the method identifies tailored compression strategies that maximize efficiency while preserving model performance. The comprehensive analysis also establishes security baselines that enable detection of unauthorized modifications, ensuring that compressed models remain protected against tampering or poisoning attacks.

As an example, consider an application of the model weight analysis method 6100 to an exemplary large language model with 7 billion parameters. The process begins with extracting the model architecture, identifying a transformer-based structure with 32 layers, each containing multi-headed attention mechanisms and feed-forward networks. The layer type identification step classifies each component, recognizing the token embedding layer (250 million parameters), 32 transformer blocks with self-attention mechanisms (each containing query, key, value, and output projection matrices), feed-forward networks with two projection layers, and a final output embedding layer. When extracting weight tensors, the method separates these components for individual analysis, preserving their dimensional structures such as the [vocabulary_size, embedding_dimension] shape of embedding matrices and the [hidden_size, hidden_size] format of attention projections. The statistical profile computation reveals distinctive patterns: embedding weights follow an approximately normal distribution with specific variance characteristics, attention weights exhibit structured patterns with certain symmetries across heads, and feed-forward networks show high sparsity with many near-zero values following fine-tuning. The sparsity analysis quantifies that approximately 60% of weights in feed-forward networks have magnitudes below a threshold of 1e-4, while attention projection matrices exhibit moderate sparsity around 30-40%, with specific attention heads showing distinctive sparsity patterns. Precision sensitivity determination identifies that query and key projection matrices in attention mechanisms can tolerate significant quantization (down to 4-bits) with minimal performance impact, while value projections and certain portions of feed-forward networks require higher precision (8-bits) to maintain generation quality. Cross-layer correlation analysis reveals consistent patterns across similar components in different transformer layers, with early and late layers showing distinctive weight distributions compared to middle layers, suggesting potential for shared codebooks across similar layer groups. Finally, the method generates a security baseline capturing the statistical signatures of each component and outputs a comprehensive analysis report recommending different encoding strategies for each layer type: product quantization for embedding layers, attention-specific encoding that preserves head structure while enabling 4-bit representation for most components, and aggressive sparse encoding for feed-forward networks that capitalizes on their natural sparsity patterns. This layer-specific analysis enables a compression strategy that reduces the model size from 28 GB to 3.5 GB while maintaining 99.8% of the original performance on benchmark tasks.

Figure 62:
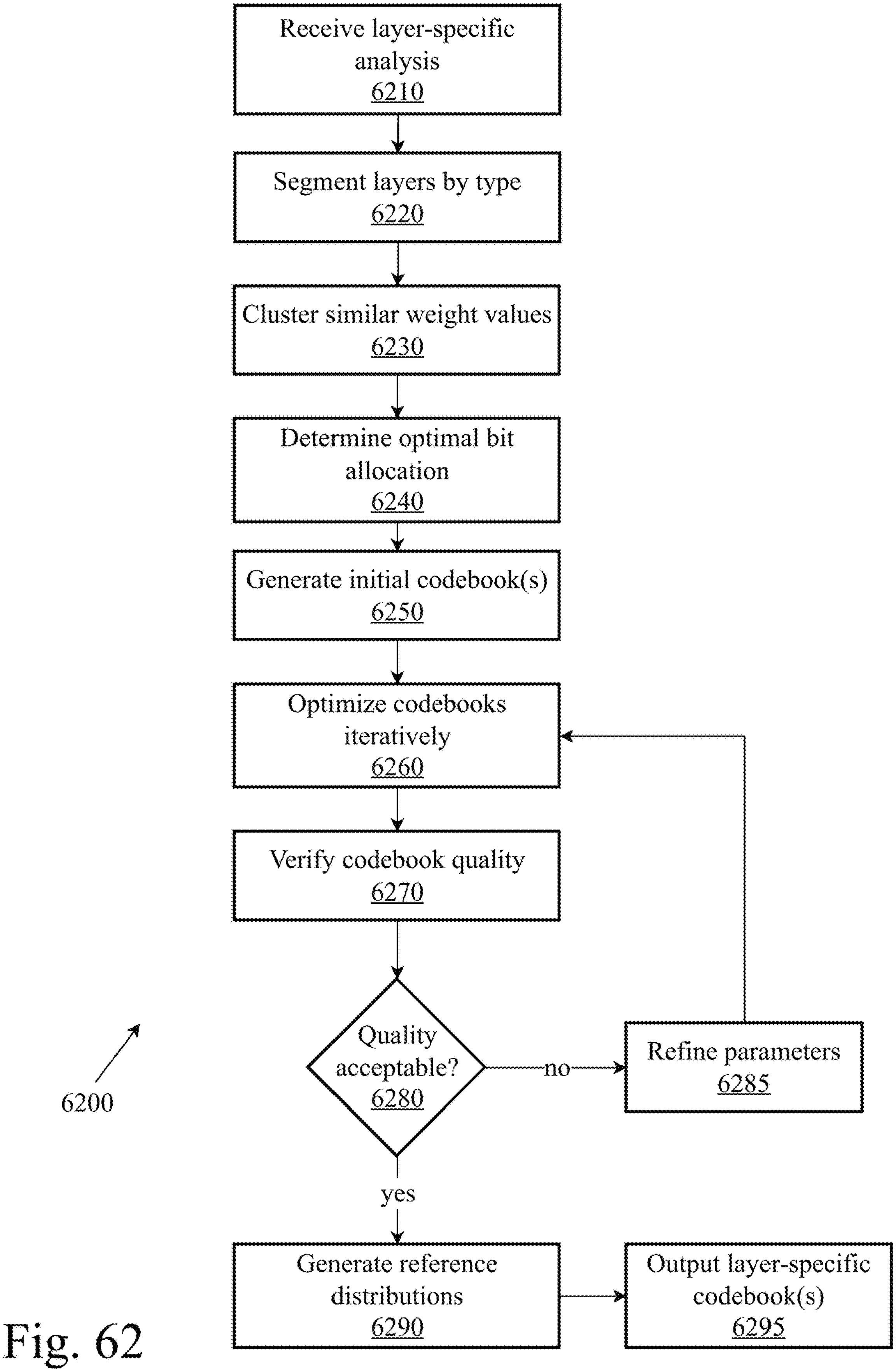
FIG. 62 is a flow diagram illustrating an exemplary method for layer-specific codebook generation, according to an embodiment.

FIG. 62 is a flow diagram illustrating an exemplary method 6200 for layer-specific codebook generation, according to an embodiment. This method leverages detailed weight analysis to produce customized compression approaches that maximize efficiency while preserving model functionality.

According to an embodiment, the process begins at step 6210 with receiving layer-specific analysis produced by the weight analysis process. This input may comprise comprehensive statistical profiles, sparsity patterns, precision sensitivity maps, and cross-layer correlations for each layer in the neural network. The received analysis provides detailed characterization of weight distributions and their functional importance, serving as the foundation for developing optimized encoding schemes. For complex models such as large language models or deep convolutional networks, this analysis distinguishes the unique characteristics of different layer types and their specific compression requirements.

At step 6220, the method proceeds to segment layers by type, organizing them into categories that will receive specialized encoding treatments. This segmentation groups layers with similar statistical properties and functional roles, such as embedding layers, attention mechanisms, convolutional filters, feed-forward networks, or normalization layers. Within these broad categories, further subdivision may occur based on position in the network, specific architectural variants, or statistical fingerprints. For example, early convolutional layers capturing low-level features might be grouped separately from later layers representing semantic concepts, or query projection matrices in attention layers might be separated from value projections due to their different sensitivity characteristics.

With layers properly segmented, the method clusters similar weight values within each layer type to identify opportunities for shared representations at step 6230. This clustering process can apply algorithms such as k-means, vector quantization, or density-based clustering to identify groups of weights that can be represented by common centroids or representative values. For embedding layers, clustering may identify semantic neighborhoods where similar token embeddings can share encoded representations, while for convolutional layers it might identify recurring filter patterns across channels or spatial locations. The clustering process balances granularity against compression ratio, determining the optimal number of unique values needed to represent each weight tensor with minimal loss of information.

Based on the clustering results and sensitivity analysis, the method determines optimal bit allocation at step 6240 for different weight regions within each layer. This bit allocation implements precision-adaptive quantization where more important weights receive higher bit-width representation while less critical weights receive more aggressive compression. For transformer models, this may allocate 8-bits to value projection matrices that directly influence output quality, while using only 4-bits for query and key projections that show higher tolerance to quantization. The bit allocation process accounts for both the statistical properties of weights and their functional importance to model performance, creating a non-uniform quantization scheme that maximizes compression efficiency while preserving critical model capabilities.

Using the clustering and bit allocation results, the method generates initial codebooks for each layer type at step 6250. These codebooks implement the encoding schemes that will map original weight values to their compressed representations. For vector quantization approaches, the codebooks contain centroid values and mapping tables, while for scalar quantization they include quantization levels and boundaries. The codebooks implement various encoding strategies optimized for different layer types, such as product quantization for embedding layers, head-aware structured encoding for attention mechanisms, filter-wise pattern matching for convolutional layers, or run-length encoding for sparse feed-forward networks. Each codebook is specifically designed to exploit the statistical characteristics and structural patterns identified in the corresponding layer type.

The method then optimizes codebooks iteratively at step 6260 to improve their compression efficiency and representation accuracy. This optimization process refines codebook entries through techniques such as rate-distortion optimization, entropy minimization, or error-weighted refinement. The optimization may adjust centroid values to minimize quantization error, reallocate bits based on observed sensitivity, or restructure codebook organization to improve lookup efficiency. For codebooks using vector quantization, the optimization might refine subspace decompositions and product dimensions to better capture weight patterns, while for scalar approaches it might adjust quantization boundaries to minimize important weight distortions. This iterative refinement continues until convergence or until reaching a predetermined computational budget.

Following optimization, the method verifies codebook quality at step 6270 through simulation of the encoding-decoding process and evaluation of the resulting weight reconstruction. This verification examines both numerical metrics such as mean squared error or signal-to-noise ratio, and functional metrics that assess the impact on model performance. For critical model components, the verification might include simulated inference tests on calibration inputs to ensure that encoding with the generated codebooks preserves functional characteristics. The verification process examines not only average case performance but also worst-case scenarios and outlier conditions that might disproportionately impact model behavior.

Based on the verification results, the method determines whether the codebook quality is acceptable 6280 according to predefined thresholds for accuracy, compression ratio, and functional preservation. If the quality is insufficient, the method refines parameters at step 6285 such as clustering granularity, bit allocation, or optimization constraints, and returns to the optimization step for another iteration. This refinement might adjust the number of centroids in clusters, modify the precision allocation across weight regions, or tune optimization hyperparameters to better balance compression and accuracy. The iterative refinement continues until the codebooks meet all quality requirements, ensuring that the final encoding schemes achieve both efficiency and functional preservation goals.

Once acceptable quality is achieved, the method generates reference distributions at step 6290 for each encoded layer that will serve as security baselines for intrusion detection. These reference distributions capture the statistical signatures of properly encoded weights, including distribution moments, entropy measures, and correlation patterns that characterize the uncompromised state. By establishing these reference distributions during the secure encoding process, the system enables tamper detection during transmission or deployment. The reference distributions are computed at multiple granularity levels, from overall layer statistics to local region patterns, creating a comprehensive security profile for detecting unauthorized modifications.

At step 6295, the method outputs layer-specific codebooks along with their associated reference distributions and metadata necessary for encoding and decoding. These outputs may comprise the optimized codebooks for each layer type, mapping tables between original and encoded values, bit allocation maps for precision-adaptive reconstruction, and security reference distributions for integrity verification. The layer-specific codebooks enable significantly higher compression ratios than general-purpose approaches while maintaining model functionality, as they are specifically designed to exploit the unique statistical and structural patterns of each neural network layer type.

The exemplary method 6200 provides a comprehensive approach to generating layer-specific codebooks that enable efficient and secure neural network compression. By tailoring encoding schemes to the specific characteristics of different layer types, the method achieves compression ratios substantially higher than general-purpose techniques while maintaining model accuracy and incorporating security features that enable tamper detection during distribution or deployment.

Figure 63:
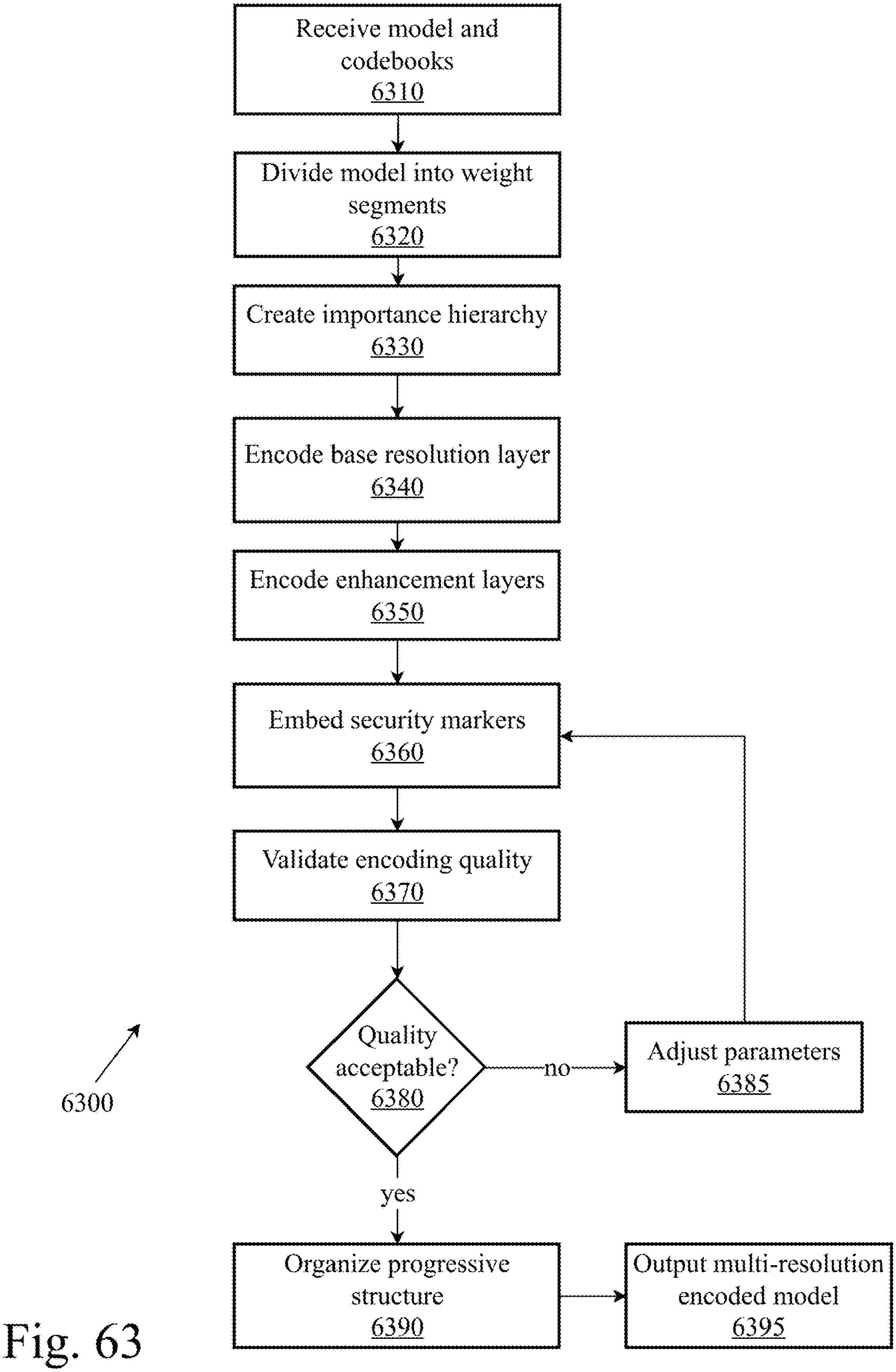
FIG. 63 is a flow diagram illustrating an exemplary method for multi-resolution encoding of neural network weights, according to an embodiment.

FIG. 63 is a flow diagram illustrating an exemplary method 6300 for multi-resolution encoding of neural network weights, according to an embodiment. This method implements a progressive compression approach that enables flexible deployment across diverse computing environments with varying resource constraints.

According to an embodiment, the process begins at step 6310 with receiving the neural network model and layer-specific codebooks generated by previous steps in the compression pipeline. The received model may comprise the complete weight tensors and architectural information, while the codebooks contain the optimized encoding schemes for different layer types based on their statistical characteristics and functional importance. For large models such as transformer-based language models or deep convolutional networks, the received information includes detailed specifications about which compression strategies should be applied to different components based on their sensitivity and statistical properties.

Following receipt of the model and codebooks, the method divides the model into weight segments at step 6320 that will receive different encoding treatments. This segmentation goes beyond simple layer-type division to identify specific regions within layers that require distinct precision levels or encoding approaches. The segmentation may be based on functional importance, statistical properties, or architectural considerations. For attention mechanisms in transformer models, segmentation may separate individual attention heads or distinguish query, key, and value projections based on their different roles. For convolutional networks, the segmentation might isolate early feature extraction filters, middle-layer pattern detectors, and final classification kernels for specialized treatment.

With the model properly segmented, the method creates an importance hierarchy at step 6330 that ranks different weight regions according to their contribution to model performance. This hierarchy determines which weights deserve higher precision representation and which can tolerate more aggressive compression. The importance ranking may be derived from sensitivity analysis, activation magnitudes, gradient information, or direct empirical performance impact measurements. Critically important weights that directly influence model outputs or maintain key functionality receive highest priority, while supporting weights with redundancy or lower contribution receive lower priority. This hierarchical organization enables the subsequent progressive encoding strategy where the most important weights are included in base resolution layers accessible even with minimal resources.

Based on the importance hierarchy, the method encodes the base resolution layer containing the minimal weight representation necessary for basic model functionality at step 6340. This base layer uses the most aggressive compression to create a compact representation that captures the essential model behavior with minimal size. Depending on the model type, the base resolution might include critical attention heads in transformer models, primary classification filters in convolutional networks, or essential token embeddings in language models. The base layer encoding applies the appropriate codebooks to these critical weights, using quantization levels and precision allocations that maintain basic functionality while maximizing compression. This base resolution enables deployment scenarios where only minimal bandwidth or storage is available but basic model capabilities are still required. The method then encodes enhancement layers at step 6350 that progressively refine the weight representation with additional precision and detail. Each enhancement layer builds upon the previous layers, adding information for weights of decreasing importance according to the established hierarchy. The first enhancement layer might add critical refinements that significantly improve model quality with modest size increase, while subsequent layers add increasingly subtle details with diminishing performance returns. The enhancement layers may employ different encoding strategies or precision levels for different weight regions, optimizing the trade-off between size and quality improvement at each resolution level. This progressive refinement enables flexible deployment where additional weight detail can be loaded as resources permit.

To ensure security and integrity, the method embeds security markers 6360 throughout the encoded representation at various granularity levels. These security markers include cryptographic signatures, checksums, and statistical fingerprints that enable tamper detection during transmission or deployment. Rather than applying security only at the file level, the markers are interwoven with the encoded weights, creating a tamper-evident packaging that allows for precise identification of unauthorized modifications. The security markers are designed to be efficient, adding minimal overhead to the compressed representation while providing robust protection against tampering or poisoning attacks targeting specific model behaviors.

Following the encoding and security embedding, the method validates encoding quality 6370 through simulation of the decoding process and evaluation of the resulting model performance. This validation examines both the complete model with all enhancement layers and various partial reconstructions using only the base resolution or intermediate enhancement layers. The validation assesses not only standard accuracy metrics but also behavioral characteristics such as decision boundaries, calibration, or generative properties. For language models, this might include evaluating text generation coherence or question-answering accuracy, while for vision models it might examine object detection precision or classification consistency.

Based on the validation results, the method determines whether the encoding quality is acceptable 6380 at all resolution levels according to predefined performance thresholds. If the quality is insufficient at any level, the method adjusts encoding parameters at step 6385 such as bit allocations, quantization boundaries, or importance rankings, and returns to the encoding steps for another iteration. These adjustments might refine which weights are included in the base resolution, modify the precision allocation across different enhancement layers, or tune the encoding schemes for specific weight regions. The iterative refinement continues until the encoded representation meets quality requirements at all resolution levels, ensuring that both minimal and complete reconstructions maintain appropriate performance characteristics.

Once acceptable quality is achieved, the method organizes the encoded weights into a progressive structure at step 6390 that facilitates efficient storage and transmission. This organization arranges the different resolution layers to enable sequential loading and incremental reconstruction, with clear demarcation between the base resolution and various enhancement layers. The structure may comprise metadata describing the contents and dependencies of each resolution level, compression parameters necessary for decoding, and integrity verification information. For deployment scenarios with limited bandwidth, this organization enables streaming of the model, where the base resolution can be loaded first to enable immediate basic functionality, followed by progressive enhancement as additional bandwidth becomes available.

At step 6395, the method outputs the multi-resolution encoded model with its progressive structure, embedded security markers, and associated metadata. The output includes the complete encoded representation with all resolution levels, along with information about how to perform partial decoding for resource-constrained environments. The layered organization allows deployment flexibility across diverse computing platforms, from edge devices with severe bandwidth and storage limitations to high-performance servers with ample resources. By providing multiple resolution options within a single encoded representation, the method enables optimal deployment based on the specific requirements and constraints of each target environment.

The method 6300 provides a comprehensive approach to multi-resolution encoding of neural network weights that addresses both efficiency and deployment flexibility challenges. By implementing a progressive compression strategy with importance-based hierarchical organization, the method enables variable-fidelity model deployment across diverse computing environments while maintaining security and integrity guarantees against unauthorized modifications.

Figure 64:
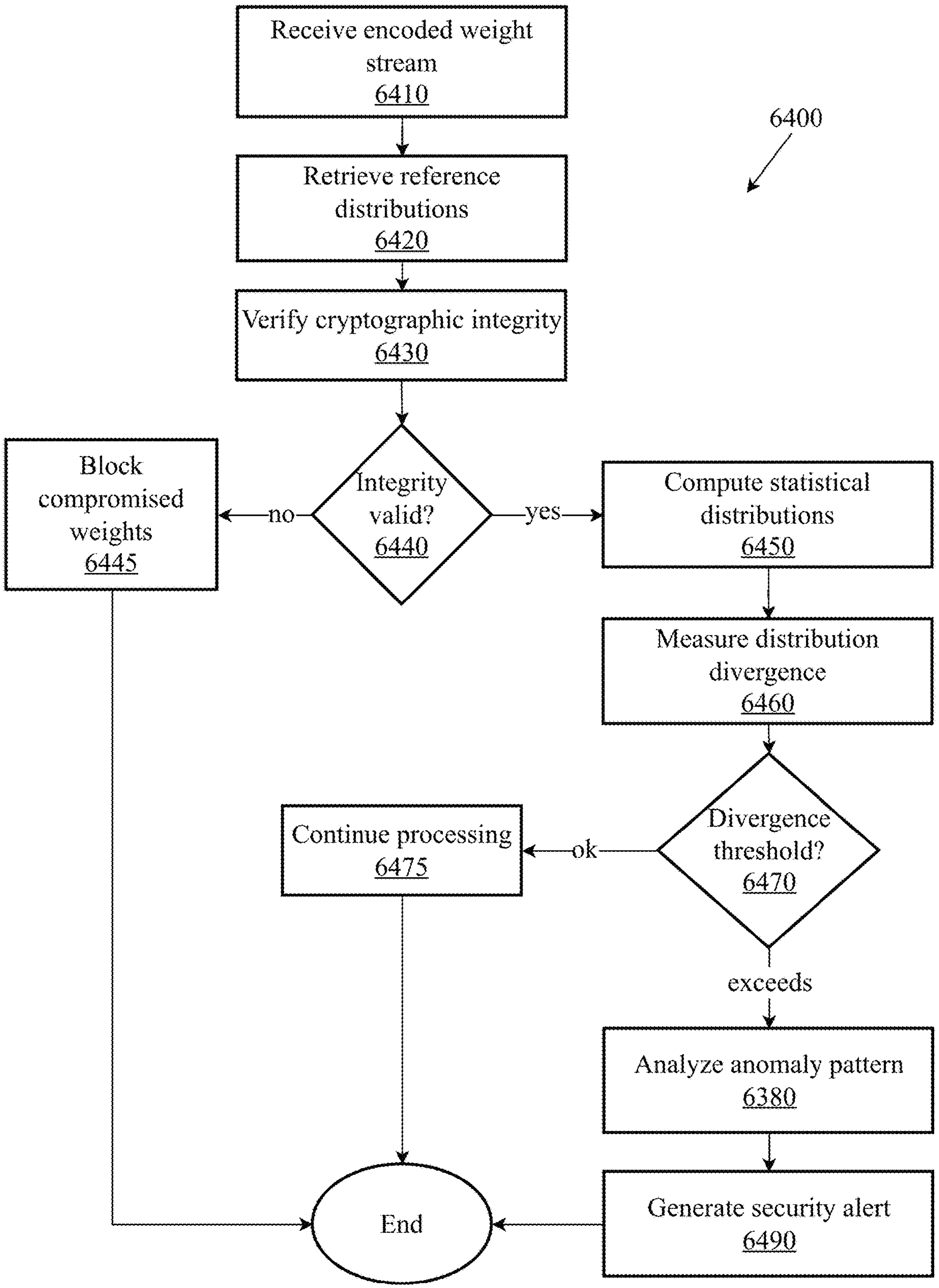
FIG. 64 is a flow diagram illustrating an exemplary method for weight-specific model intrusion detection that provides specialized security monitoring for neural network weights, according to an embodiment.

FIG. 64 is a flow diagram illustrating an exemplary method 6400 for weight-specific model intrusion detection that provides specialized security monitoring for neural network weights, according to an embodiment. This method enables the detection of unauthorized modifications, poisoning attempts, and other security threats that might compromise model integrity or behavior.

According to an embodiment, the process begins at step 6410 with receiving, retrieving, or otherwise obtaining an encoded weight stream that contains compressed neural network weights intended for deployment or storage. This encoded stream may be received during transmission from a source to a destination, retrieved from storage for verification before use, or intercepted during the model loading process. The encoded weight stream comprises not only the compressed weight values but also metadata, security markers, and structural information necessary for proper reconstruction. The received stream may represent a complete model or a partial update to an existing model, such as in federated learning scenarios where weight updates are frequently exchanged between participants.

Following receipt of the encoded weights, the method retrieves reference distributions at step 6420 that serve as security baselines for integrity verification. These reference distributions were generated during the encoding process and capture the expected statistical properties of properly encoded weights for each layer and segment of the neural network. The reference distributions include metrics such as moments (mean, variance, skewness, kurtosis), entropy measures, and correlation patterns that characterize the uncompromised state of the encoded weights. For different layer types, specific reference characteristics are retrieved, such as the expected distribution patterns of attention projection matrices in transformer models or filter statistics in convolutional networks.

The method verifies cryptographic integrity 6430 of the encoded weight stream using embedded security markers and signatures. This verification examines cryptographic checksums, digital signatures, and other integrity markers distributed throughout the encoded representation to confirm that no unauthorized modifications have occurred during transmission or storage. Unlike traditional file-level integrity checks, this verification operates at multiple granularity levels, from overall file integrity to layer-specific and segment-specific verification. This multi-level approach enables the detection of targeted modifications that might affect only specific portions of the model while leaving overall integrity measures intact.

Based on the cryptographic verification, the method determines whether the integrity is valid 6440 according to the embedded security markers. If integrity verification fails, indicating potential tampering or corruption, the method blocks the compromised weights 6445 from further processing or deployment. This blocking action prevents potentially malicious or corrupted weights from affecting system behavior and triggers appropriate security protocols such as alerting security personnel, logging the incident, or initiating recovery procedures. The specific response actions may vary based on the security policy of the deployment environment and the criticality of the affected model.

If cryptographic integrity is verified, the method proceeds to compute statistical distributions of the received encoded weights for comparison against the reference baselines at step 6450. This computation applies the same statistical analysis techniques used during encoding to characterize the current state of the received weights. For each layer and segment of the model, distribution metrics are calculated, including histogram analysis, moments computation, entropy measurement, and pattern identification. These computed distributions provide a comprehensive statistical profile of the current weight state that can be compared against the reference distributions to identify potential anomalies that might not be detectable through cryptographic verification alone.

Using the computed and reference distributions, the method measures distribution divergence at step 6460 to quantify the degree of deviation from expected statistical properties. This measurement applies specialized algorithms such as Kullback-Leibler divergence, Jensen-Shannon divergence, or Wasserstein distance to compare the observed distributions against their reference counterparts. The divergence measurement is performed at multiple granularity levels, from overall layer statistics to localized region analysis, enabling the detection of both broad changes affecting entire layers and targeted modifications to specific weight regions. This statistical approach is particularly effective at identifying subtle modifications designed to affect model behavior in specific ways while maintaining overall statistical similarity.

Based on the measured divergence, the method determines whether the divergence exceeds defined thresholds 6470 that would indicate potential tampering or poisoning. These thresholds may be calibrated/set based on the expected natural variation in weight distributions and the sensitivity requirements of the specific deployment environment. If the divergence remains within acceptable limits, indicating normal statistical variation rather than malicious modification, the method allows continued processing 6475 of the weights. This path represents the normal flow where no security threats are detected, and the encoded weights can proceed to decoding and deployment without security concerns.

If the divergence exceeds established thresholds, indicating potential tampering or poisoning, the method analyzes the anomaly pattern at step 6480 to characterize the nature of the detected deviation. This analysis may examine the specific distribution shifts, affected weight regions, and pattern of modifications to identify potential attack signatures or tampering techniques. For instance, the analysis might recognize patterns consistent with backdoor insertions targeting specific classification outcomes, targeted modifications to attention mechanisms to alter language model outputs, or adversarial perturbations designed to create security vulnerabilities. This detailed characterization helps determine the appropriate response and provides valuable information for security personnel investigating the incident.

Based on the anomaly analysis, the method generates a security alert at step 6490 containing detailed information about the detected threat. This alert may comprise the type and severity of the detected anomaly, the affected model components, the measured divergence metrics, and potential impact on model behavior. The alert may also include recommended mitigation actions based on the specific threat characteristics identified during analysis. The security alert is transmitted to appropriate monitoring systems or security personnel according to the deployment environment's security protocols, ensuring that potential threats receive prompt attention and investigation.

The method 6400 provides a comprehensive approach to weight-specific intrusion detection that combines cryptographic verification with statistical anomaly detection. By applying specialized analysis techniques tailored to neural network weight characteristics, the method enables the identification of attacks that might bypass traditional security measures. This protection is increasingly critical as neural networks become integrated into sensitive and high-value systems across various industries, where compromised models could lead to significant security, privacy, or safety implications.

FIG. 1 is a diagram showing an embodiment 100 of the system in which all components of the system are operated locally. As incoming data 101 is received by data deconstruction engine 102. Data deconstruction engine 102 breaks the incoming data into sourceblocks, which are then sent to library manager 103. Using the information contained in sourceblock library lookup table 104 and sourceblock library storage 105, library manager 103 returns reference codes to data deconstruction engine 102 for processing into codewords, which are stored in codeword storage 106. When a data retrieval request 107 is received, data reconstruction engine 108 obtains the codewords associated with the data from codeword storage 106, and sends them to library manager 103. Library manager 103 returns the appropriate sourceblocks to data reconstruction engine 108, which assembles them into the proper order and sends out the data in its original form 109.

Figure 2:
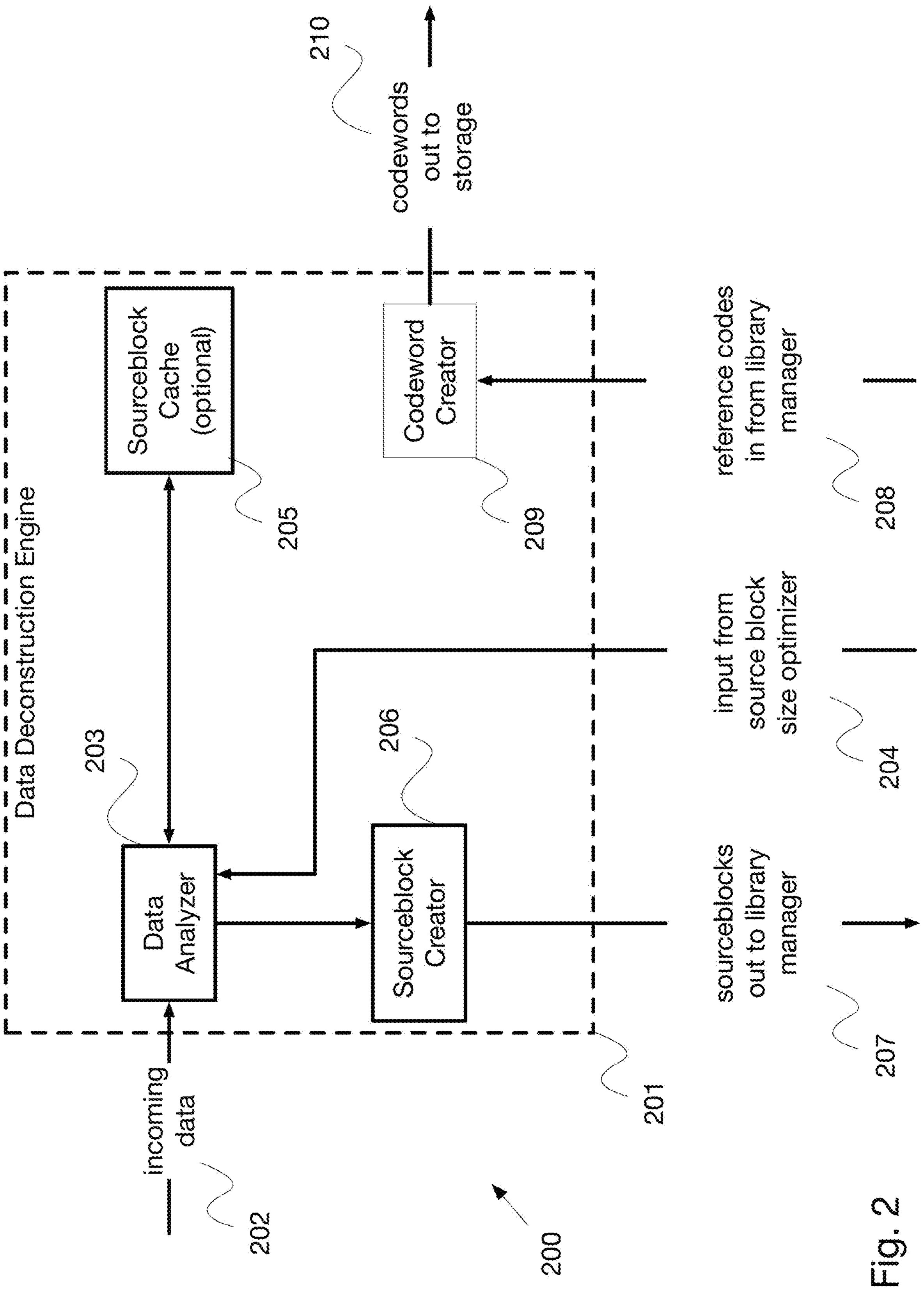
FIG. 2 is a diagram showing an embodiment of one aspect of the system, the data deconstruction engine.

FIG. 2 is a diagram showing an embodiment of one aspect 200 of the system, specifically data deconstruction engine 201. Incoming data 202 is received by data analyzer 203, which optimally analyzes the data based on machine learning algorithms and input 204 from a sourceblock size optimizer, which is disclosed below. Data analyzer may optionally have access to a sourceblock cache 205 of recently-processed sourceblocks, which can increase the speed of the system by avoiding processing in library manager 103. Based on information from data analyzer 203, the data is broken into sourceblocks by sourceblock creator 206, which sends sourceblocks 207 to library manager 203 for additional processing. Data deconstruction engine 201 receives reference codes 208 from library manager 103, corresponding to the sourceblocks in the library that match the sourceblocks sent by sourceblock creator 206, and codeword creator 209 processes the reference codes into codewords comprising a reference code to a sourceblock and a location of that sourceblock within the data set. The original data may be discarded, and the codewords representing the data are sent out to storage 210.

Figure 3:
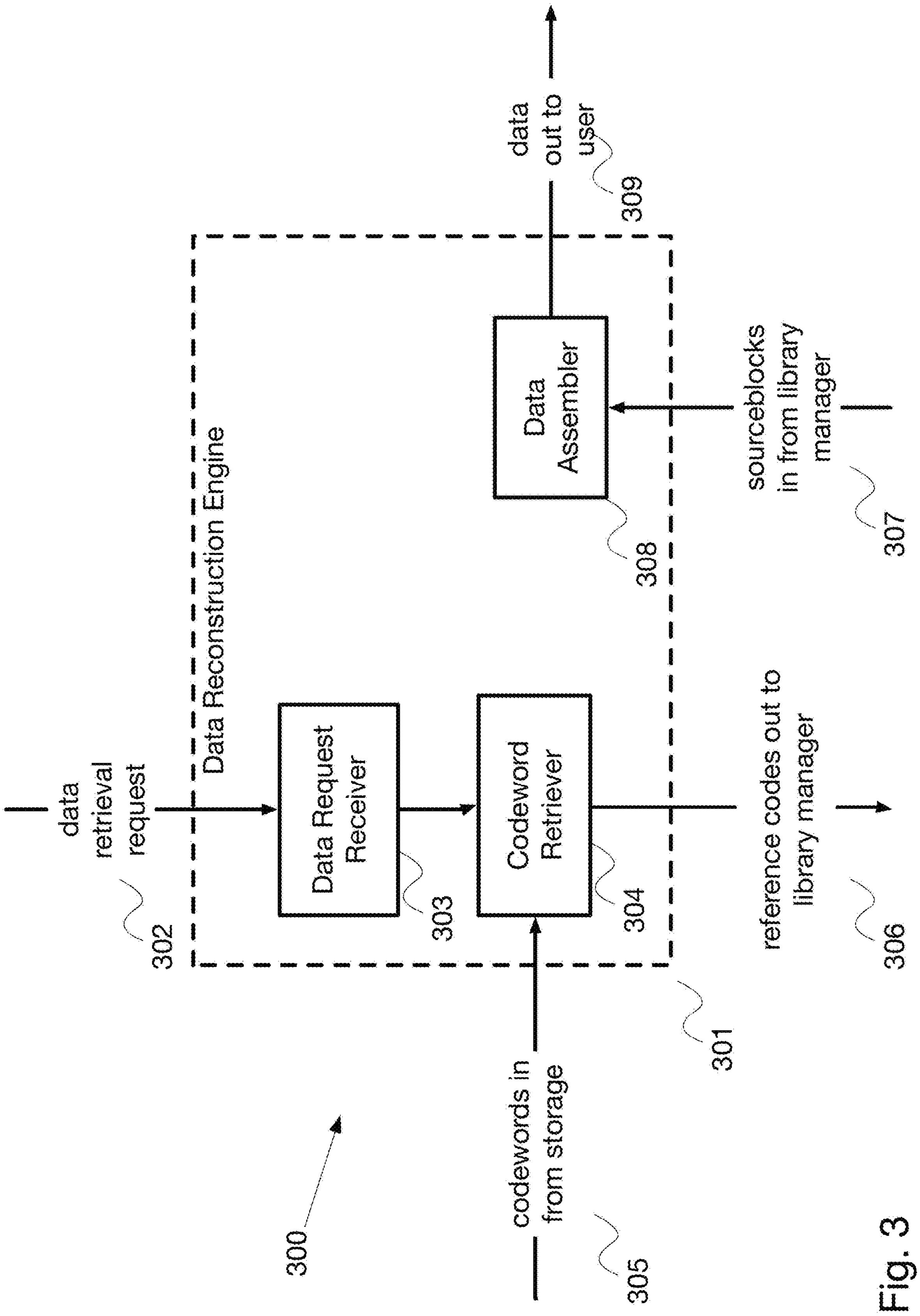
FIG. 3 is a diagram showing an embodiment of one aspect of the system, the data reconstruction engine.

FIG. 3 is a diagram showing an embodiment of another aspect of system 300, specifically data reconstruction engine 301. When a data retrieval request 302 is received by data request receiver 303 (in the form of a plurality of codewords corresponding to a desired final data set), it passes the information to data retriever 304, which obtains the requested data 305 from storage. Data retriever 304 sends, for each codeword received, a reference codes from the codeword 306 to library manager 103 for retrieval of the specific sourceblock associated with the reference code. Data assembler 308 receives the sourceblock 307 from library manager 103 and, after receiving a plurality of sourceblocks corresponding to a plurality of codewords, assembles them into the proper order based on the location information contained in each codeword (recall each codeword comprises a sourceblock reference code and a location identifier that specifies where in the resulting data set the specific sourceblock should be restored to. The requested data is then sent to user 309 in its original form.

Figure 4:
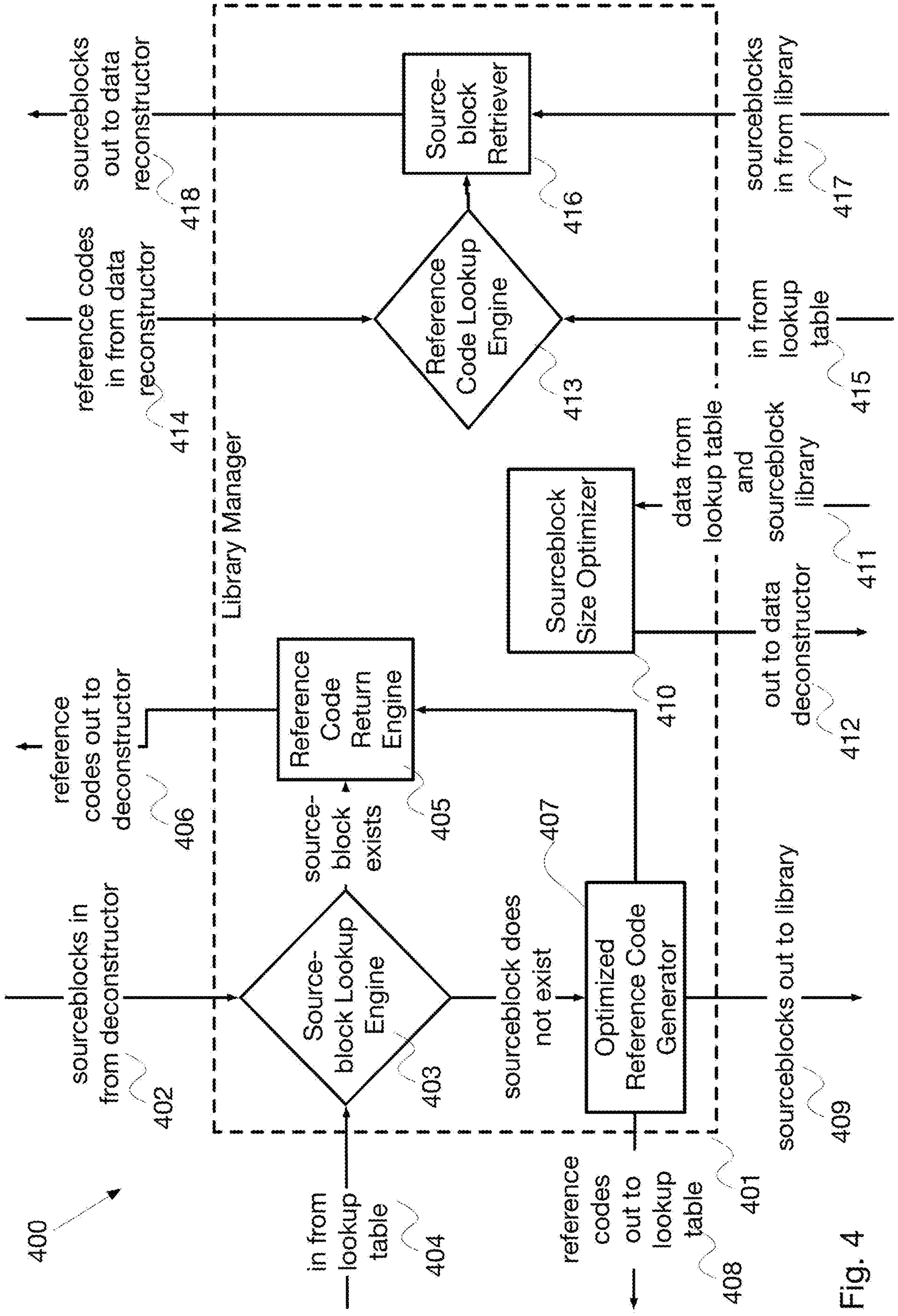
FIG. 4 is a diagram showing an embodiment of one aspect of the system, the library management module.

FIG. 4 is a diagram showing an embodiment of another aspect of the system 400, specifically library manager 401. One function of library manager 401 is to generate reference codes from sourceblocks received from data deconstruction engine 301. As sourceblocks are received 402 from data deconstruction engine 301, sourceblock lookup engine 403 checks sourceblock library lookup table 404 to determine whether those sourceblocks already exist in sourceblock library storage 105. If a particular sourceblock exists in sourceblock library storage 105, reference code return engine 405 sends the appropriate reference code 406 to data deconstruction engine 301. If the sourceblock does not exist in sourceblock library storage 105, optimized reference code generator 407 generates a new, optimized reference code based on machine learning algorithms. Optimized reference code generator 407 then saves the reference code 408 to sourceblock library lookup table 104; saves the associated sourceblock 409 to sourceblock library storage 105; and passes the reference code to reference code return engine 405 for sending 406 to data deconstruction engine 301. Another function of library manager 401 is to optimize the size of sourceblocks in the system. Based on information 411 contained in sourceblock library lookup table 104, sourceblock size optimizer 410 dynamically adjusts the size of sourceblocks in the system based on machine learning algorithms and outputs that information 412 to data analyzer 203. Another function of library manager 401 is to return sourceblocks associated with reference codes received from data reconstruction engine 301. As reference codes are received 414 from data reconstruction engine 301, reference code lookup engine 413 checks sourceblock library lookup table 415 to identify the associated sourceblocks; passes that information to sourceblock retriever 416, which obtains the sourceblocks 417 from sourceblock library storage 105; and passes them 418 to data reconstruction engine 301.

Figure 5:
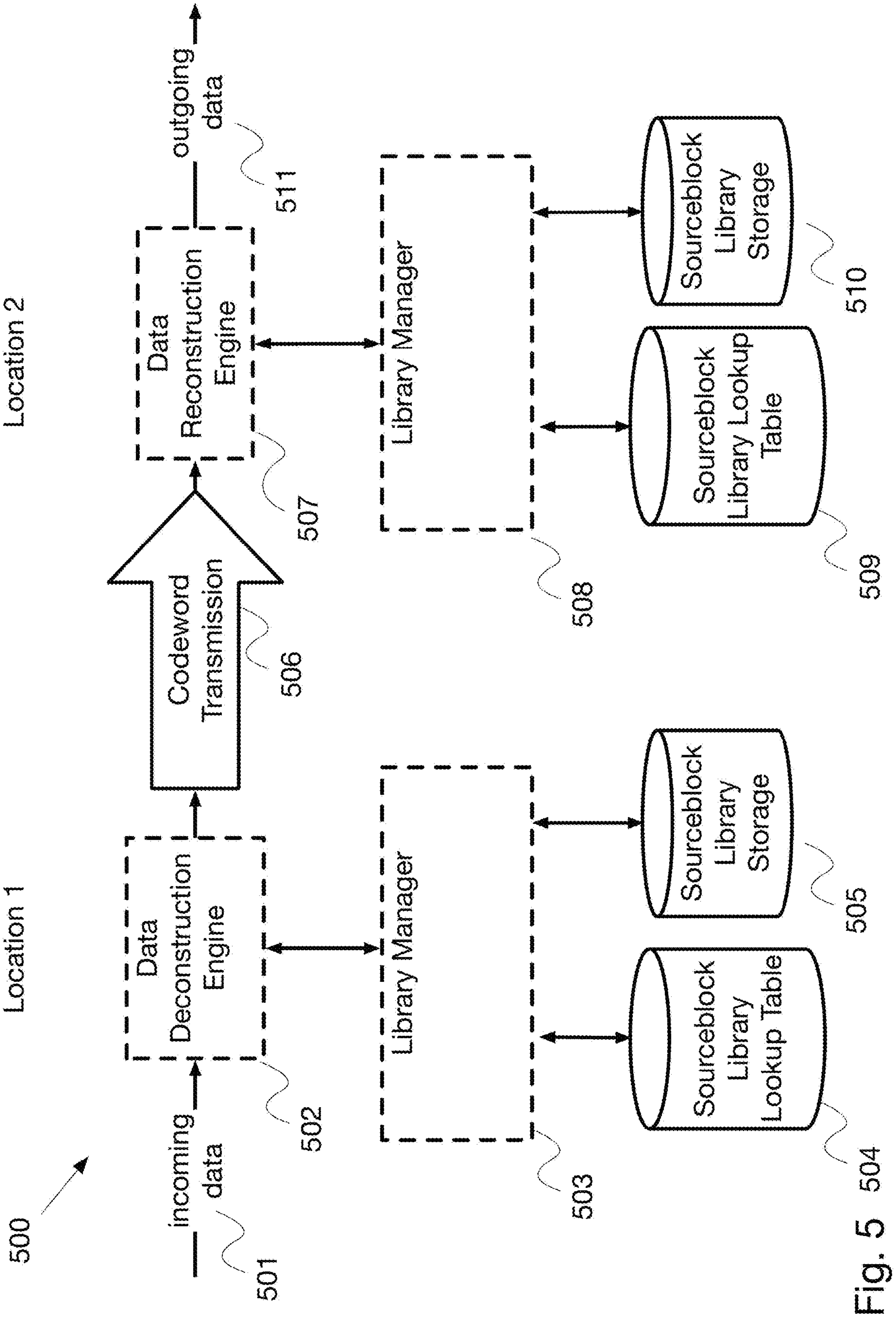
FIG. 5 is a diagram showing another embodiment of the system in which data is transferred between remote locations.

FIG. 5 is a diagram showing another embodiment of system 500, in which data is transferred between remote locations. As incoming data 501 is received by data deconstruction engine 502 at Location 1, data deconstruction engine 301 breaks the incoming data into sourceblocks, which are then sent to library manager 503 at Location 1. Using the information contained in sourceblock library lookup table 504 at Location 1 and sourceblock library storage 505 at Location 1, library manager 503 returns reference codes to data deconstruction engine 301 for processing into codewords, which are transmitted 506 to data reconstruction engine 507 at Location 2. In the case where the reference codes contained in a particular codeword have been newly generated by library manager 503 at Location 1, the codeword is transmitted along with a copy of the associated sourceblock. As data reconstruction engine 507 at Location 2 receives the codewords, it passes them to library manager module 508 at Location 2, which looks up the sourceblock in sourceblock library lookup table 509 at Location 2, and retrieves the associated from sourceblock library storage 510. Where a sourceblock has been transmitted along with a codeword, the sourceblock is stored in sourceblock library storage 510 and sourceblock library lookup table 504 is updated. Library manager 503 returns the appropriate sourceblocks to data reconstruction engine 507, which assembles them into the proper order and sends the data in its original form 511.

Figure 6:
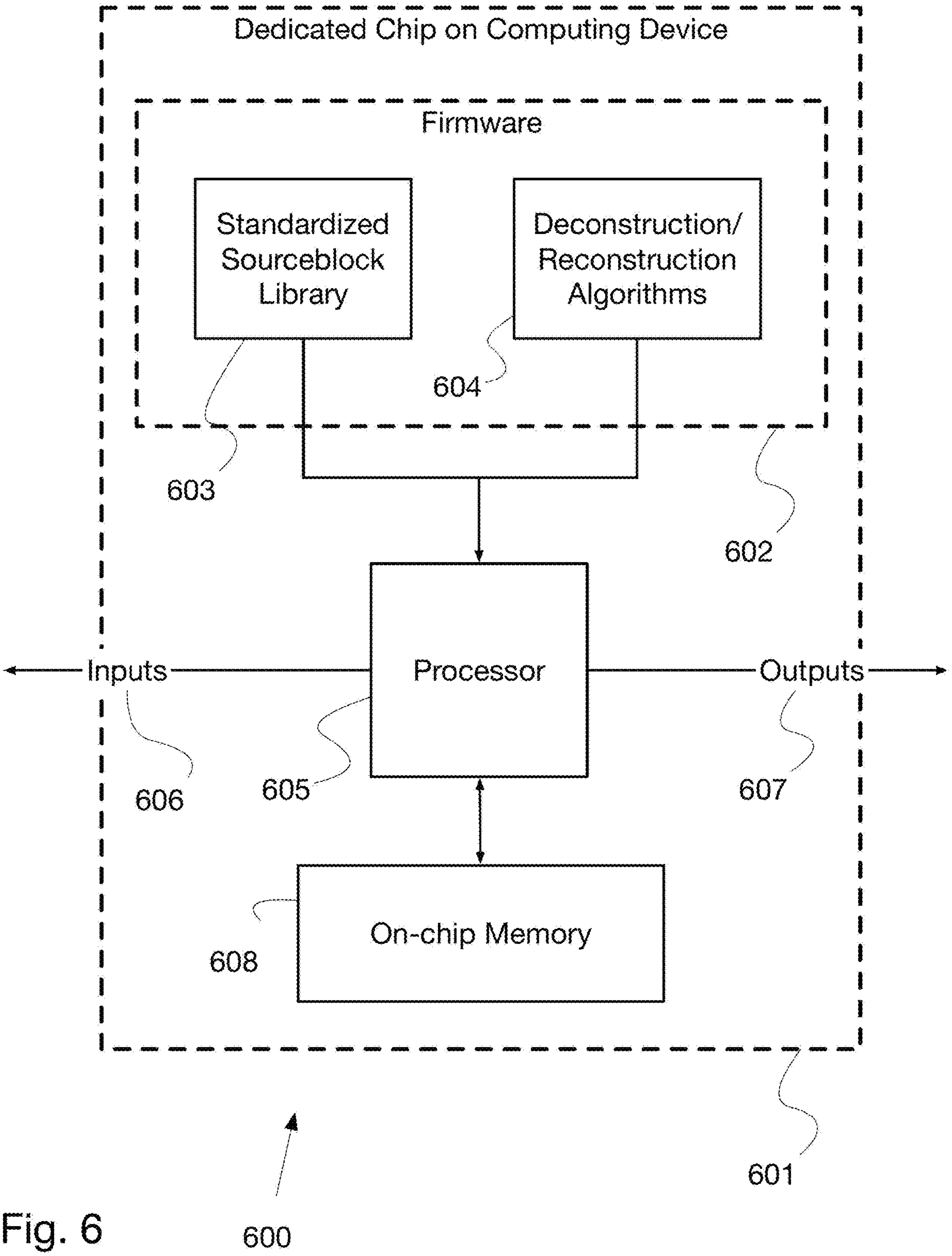
FIG. 6 is a diagram showing an embodiment in which a standardized version of the sourceblock library and associated algorithms would be encoded as firmware on a dedicated processing chip included as part of the hardware of a plurality of devices.

FIG. 6 is a diagram showing an embodiment 600 in which a standardized version of a sourceblock library 603 and associated algorithms 604 would be encoded as firmware 602 on a dedicated processing chip 601 included as part of the hardware of a plurality of devices 600. Contained on dedicated chip 601 would be a firmware area 602, on which would be stored a copy of a standardized sourceblock library 603 and deconstruction/reconstruction algorithms 604 for processing the data. Processor 605 would have both inputs 606 and outputs 607 to other hardware on the device 600. Processor 605 would store incoming data for processing on on-chip memory 608, process the data using standardized sourceblock library 603 and deconstruction/reconstruction algorithms 604, and send the processed data to other hardware on device 600. Using this embodiment, the encoding and decoding of data would be handled by dedicated chip 601, keeping the burden of data processing off device's 600 primary processors. Any device equipped with this embodiment would be able to store and transmit data in a highly optimized, bandwidth-efficient format with any other device equipped with this embodiment.

Figure 12:
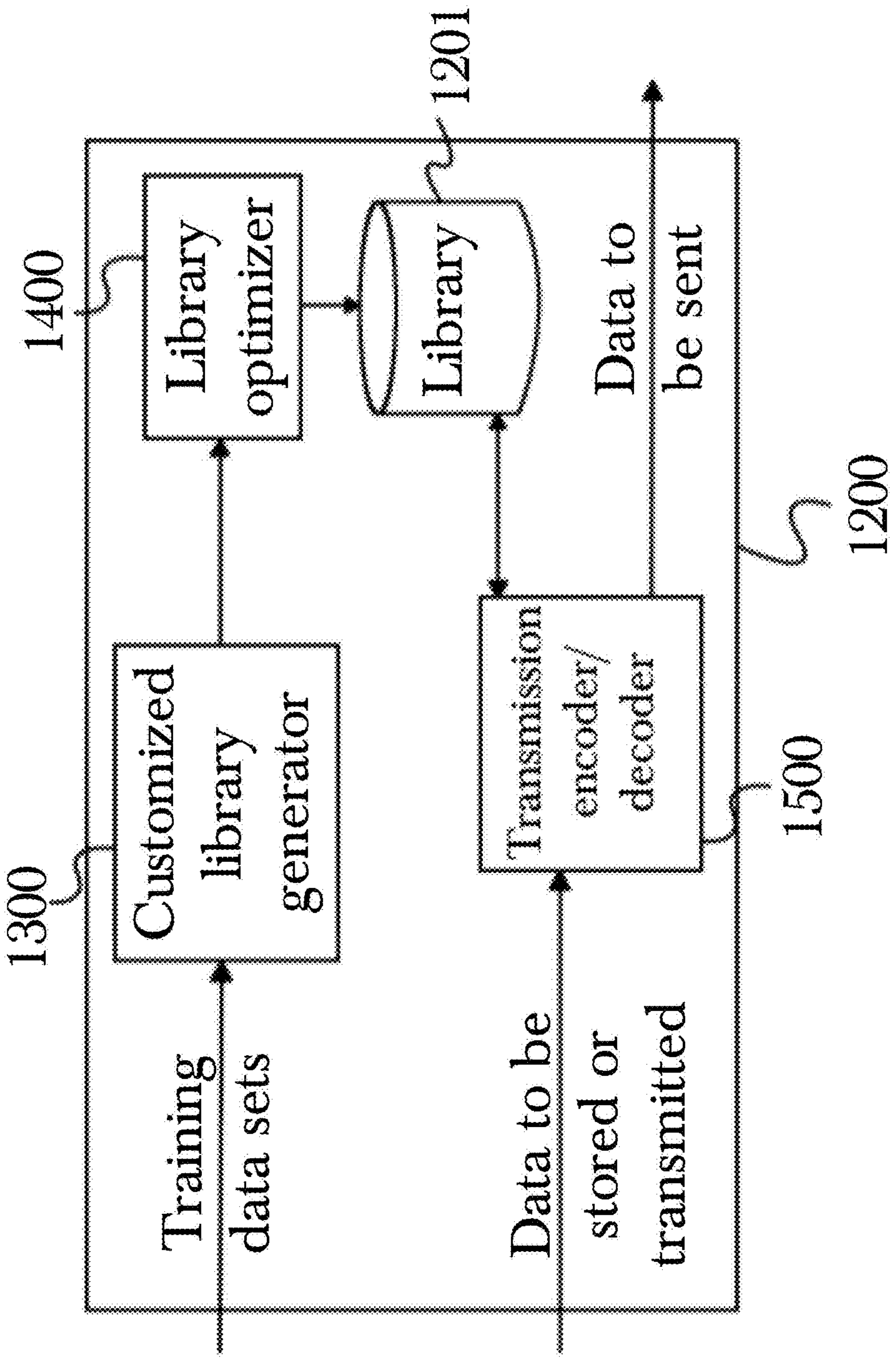
FIG. 12 is a diagram showing an exemplary system architecture, according to a preferred embodiment of the invention.

FIG. 12 is a diagram showing an exemplary system architecture 1200, according to a preferred embodiment of the invention. Incoming training data sets may be received at a customized library generator 1300 that processes training data to produce a customized word library 1201 comprising key-value pairs of data words (each comprising a string of bits) and their corresponding calculated binary Huffman codewords. The resultant word library 1201 may then be processed by a library optimizer 1400 to reduce size and improve efficiency, for example by pruning low-occurrence data entries or calculating approximate codewords that may be used to match more than one data word. A transmission encoder/decoder 1500 may be used to receive incoming data intended for storage or transmission, process the data using a word library 1201 to retrieve codewords for the words in the incoming data, and then append the codewords (rather than the original data) to an outbound data stream. Each of these components is described in greater detail below, illustrating the particulars of their respective processing and other functions, referring to FIGS. 2-4.

System 1200 provides near-instantaneous source coding that is dictionary-based and learned in advance from sample training data, so that encoding and decoding may happen concurrently with data transmission. This results in computational latency that is near zero but the data size reduction is comparable to classical compression. For example, if N bits are to be transmitted from sender to receiver, the compression ratio of classical compression is C, the ratio between the deflation factor of system 1200 and that of multi-pass source coding is p, the classical compression encoding rate is $R_C$ bit/s and the decoding rate is $R_D$ bit/s, and the transmission speed is S bit/s, the compress-send-decompress time will be $$T_{old} = \frac{N}{R_C} + \frac{N}{CS} + \frac{N}{CR_D}$$

while the transmit-while-coding time for system 1200 will be (assuming that encoding and decoding happen at least as quickly as network latency):

$$T_{new} = \frac{N_p}{CS}$$

so that the total data transit time improvement factor is $$\frac{T_{old}}{T_{new}} = \frac{\frac{CS}{R_C} + 1 + \frac{S}{R_D}}{p}$$

which presents a savings whenever $$\frac{CS}{R_C} + \frac{S}{R_D} > p - 1.$$

This is a reasonable scenario given that typical values in real-world practice are C=0.32, $R_C=1.1\cdot10^{12}$, $R_D=4.2\cdot10^{12}$, $S=10^{11}$, giving $$\frac{CS}{R_C} + \frac{S}{R_D} = 0.053 \ldots ,$$

such that system 1200 will outperform the total transit time of the best compression technology available as long as its deflation factor is no more than 5% worse than compression. Such customized dictionary-based encoding will also sometimes exceed the deflation ratio of classical compression, particularly when network speeds increase beyond 100 Gb/s.

The delay between data creation and its readiness for use at a receiving end will be equal to only the source word length t (typically 5-15 bytes), divided by the deflation factor C/p and the network speed S, i.e.

$$\text{delay}_{invention} = \frac{tp}{CS}$$

since encoding and decoding occur concurrently with data transmission. On the other hand, the latency associated with classical compression is $$\text{delay}_{priorart} = \frac{N}{R_C} + \frac{N}{CS} + \frac{N}{CR_D}$$

where N is the packet/file size. Even with the generous values chosen above as well as N=512K, t=10, and p=1.05, this results in $\text{delay}_{invention} \approx 3.3 \cdot 10^{-10}$ while $\text{delay}_{priorart} \approx 1.3 \cdot 10^{-7}$, a more than 400-fold reduction in latency.

A key factor in the efficiency of Huffman coding used by system 1200 is that key-value pairs be chosen carefully to minimize expected coding length, so that the average deflation/compression ratio is minimized. It is possible to achieve the best possible expected code length among all instantaneous codes using Huffman codes if one has access to the exact probability distribution of source words of a given desired length from the random variable generating them. In practice this is impossible, as data is received in a wide variety of formats and the random processes underlying the source data are a mixture of human input, unpredictable (though in principle, deterministic) physical events, and noise. System 1200 addresses this by restriction of data types and density estimation; training data is provided that is representative of the type of data anticipated in "real-world" use of system 1200, which is then used to model the distribution of binary strings in the data in order to build a Huffman code word library 1200.

Figure 13:
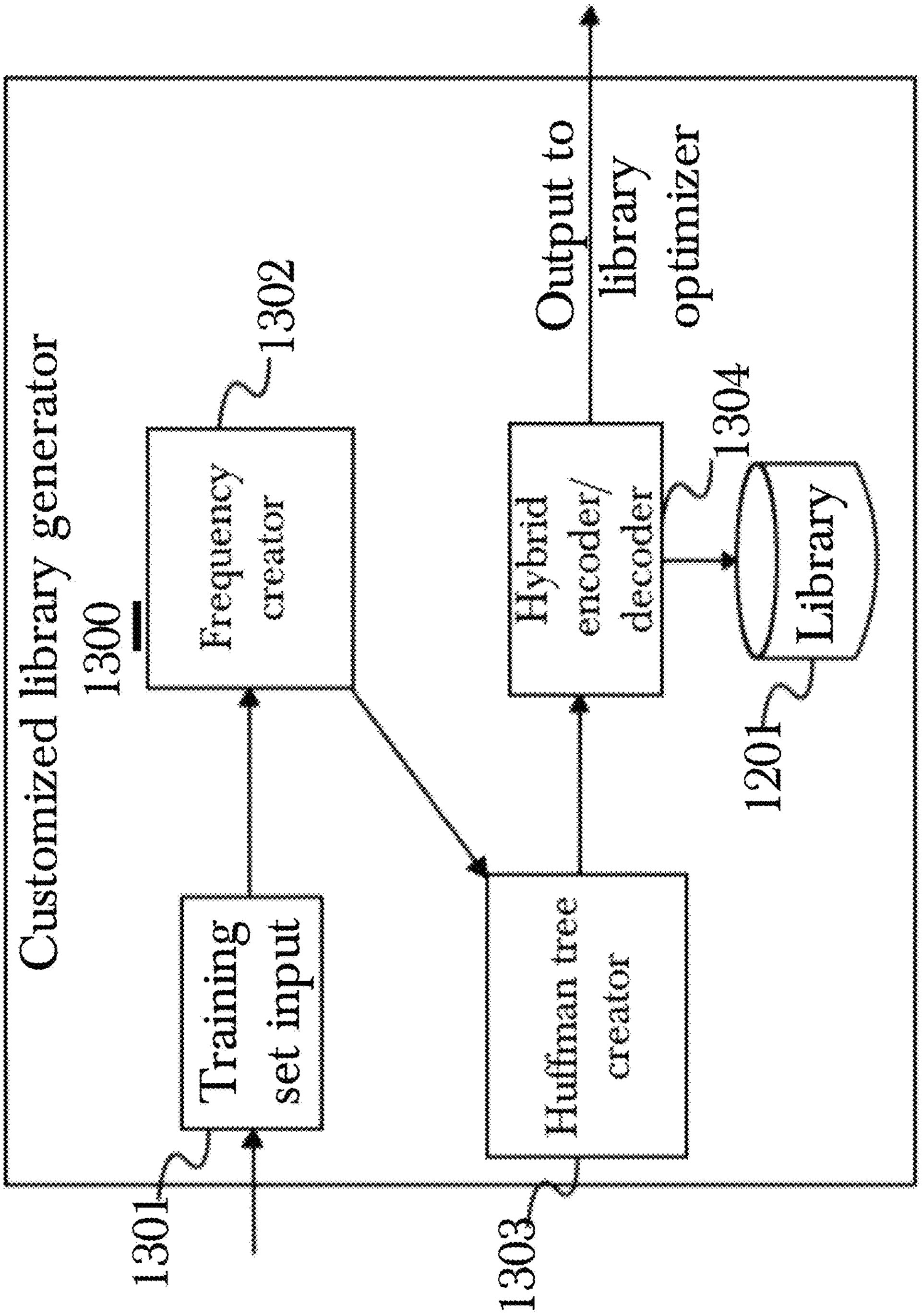
FIG. 13 is a diagram showing a more detailed architecture for a customized library generator.

FIG. 13 is a diagram showing a more detailed architecture for a customized library generator 1300. When an incoming training data set 1301 is received, it may be analyzed using a frequency creator 1302 to analyze for word frequency (that is, the frequency with which a given word occurs in the training data set). Word frequency may be analyzed by scanning all substrings of bits and directly calculating the frequency of each substring by iterating over the data set to produce an occurrence frequency, which may then be used to estimate the rate of word occurrence in non-training data. A first Huffman binary tree is created based on the frequency of occurrences of each word in the first dataset, and a Huffman codeword is assigned to each observed word in the first dataset according to the first Huffman binary tree. Machine learning may be utilized to improve results by processing a number of training data sets and using the results of each training set to refine the frequency estimations for non-training data, so that the estimation yield better results when used with real-world data (rather than, for example, being only based on a single training data set that may not be very similar to a received non-training data set). A second Huffman tree creator 1303 may be utilized to identify words that do not match any existing entries in a word library 1201 and pass them to a hybrid encoder/decoder 1304, that then calculates a binary Huffman codeword for the mismatched word and adds the codeword and original data to the word library 1201 as a new key-value pair. In this manner, customized library generator 1300 may be used both to establish an initial word library 1201 from a first training set, as well as expand the word library 1201 using additional training data to improve operation.

Figure 14:
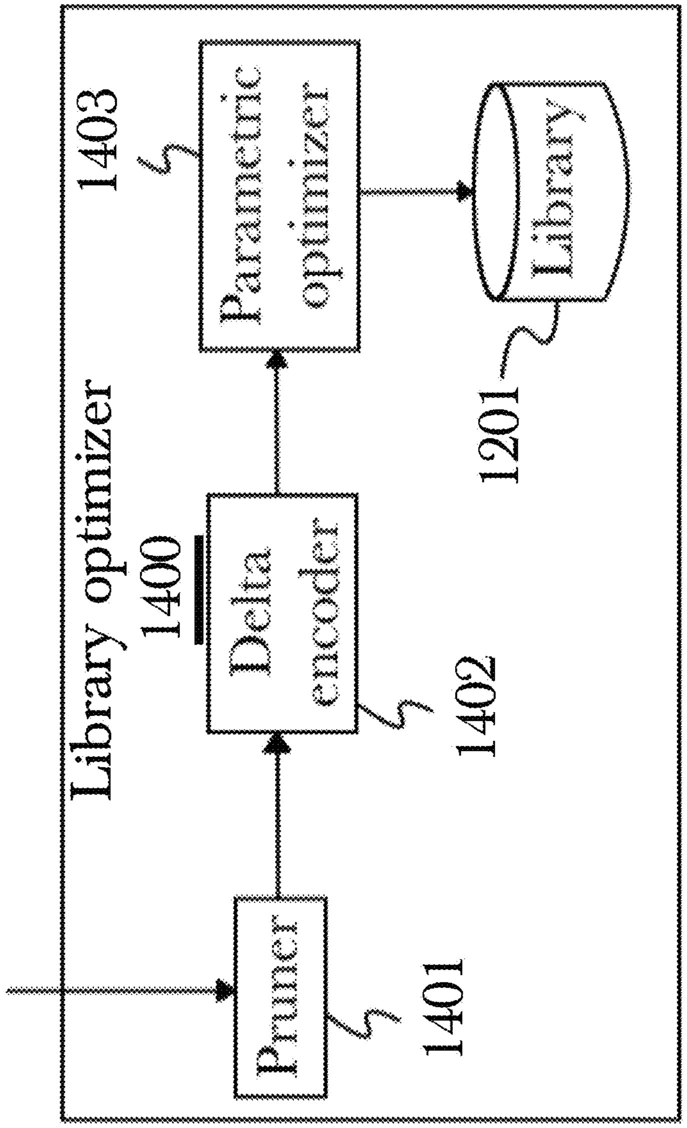
FIG. 14 is a diagram showing a more detailed architecture for a library optimizer.

FIG. 14 is a diagram showing a more detailed architecture for a library optimizer 1400. A pruner 1401 may be used to load a word library 1201 and reduce its size for efficient operation, for example by sorting the word library 1201 based on the known occurrence probability of each key-value pair and removing low-probability key-value pairs based on a loaded threshold parameter. This prunes low-value data from the word library to trim the size, eliminating large quantities of very-low-frequency key-value pairs such as single-occurrence words that are unlikely to be encountered again in a data set. Pruning eliminates the least-probable entries from word library 1201 up to a given threshold, which will have a negligible impact on the deflation factor since the removed entries are only the least-common ones, while the impact on word library size will be larger because samples drawn from asymptotically normal distributions (such as the log-probabilities of words generated by a probabilistic finite state machine, a model well-suited to a wide variety of real-world data) which occur in tails of the distribution are disproportionately large in counting measure. A delta encoder 1402 may be utilized to apply delta encoding to a plurality of words to store an approximate codeword as a value in the word library, for which each of the plurality of source words is a valid corresponding key. This may be used to reduce library size by replacing numerous key-value pairs with a single entry for the approximate codeword and then represent actual codewords using the approximate codeword plus a delta value representing the difference between the approximate codeword and the actual codeword. Approximate coding is optimized for low-weight sources such as Golomb coding, run-length coding, and similar techniques. The approximate source words may be chosen by locality-sensitive hashing, so as to approximate Hamming distance without incurring the intractability of nearest-neighbor-search in Hamming space. A parametric optimizer 1403 may load configuration parameters for operation to optimize the use of the word library 1201 during operation. Best-practice parameter/hyperparameter optimization strategies such as stochastic gradient descent, quasi-random grid search, and evolutionary search may be used to make optimal choices for all interdependent settings playing a role in the functionality of system 1200. In cases where lossless compression is not required, the delta value may be discarded at the expense of introducing some limited errors into any decoded (reconstructed) data.

Figure 15:
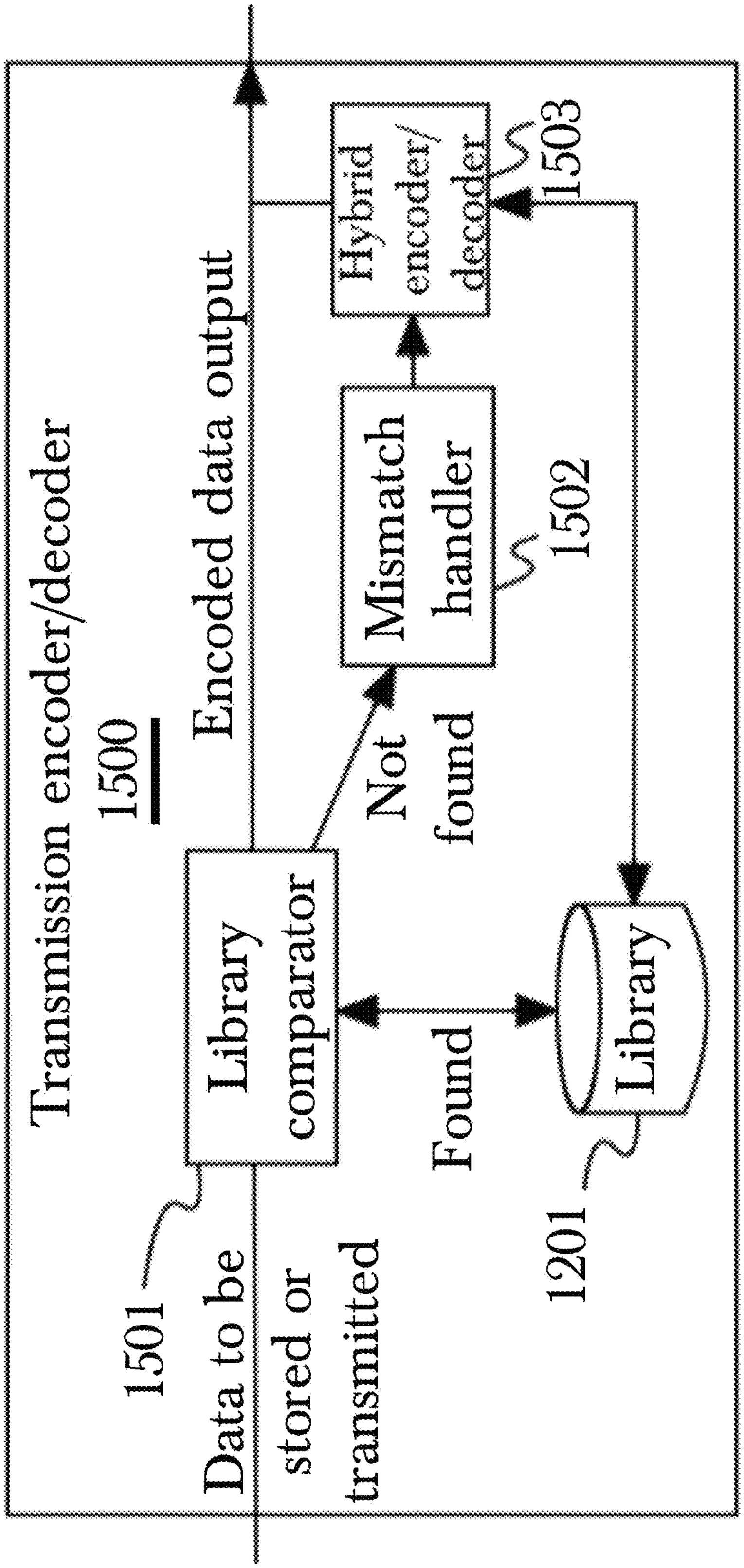
FIG. 15 is a diagram showing a more detailed architecture for a transmission and storage engine.

FIG. 15 is a diagram showing a more detailed architecture for a transmission encoder/decoder 1500. According to various arrangements, transmission encoder/decoder 1500 may be used to deconstruct data for storage or transmission, or to reconstruct data that has been received, using a word library 1201. A library comparator 1501 may be used to receive data comprising words or codewords, and compare against a word library 1201 by dividing the incoming stream into substrings of length t and using a fast hash to check word library 1201 for each substring. If a substring is found in word library 1201, the corresponding key/value (that is, the corresponding source word or codeword, according to whether the substring used in comparison was itself a word or codeword) is returned and appended to an output stream. If a given substring is not found in word library 1201, a mismatch handler 1502 and hybrid encoder/decoder 1503 may be used to handle the mismatch similarly to operation during the construction or expansion of word library 1201. A mismatch handler 1502 may be utilized to identify words that do not match any existing entries in a word library 1201 and pass them to a hybrid encoder/decoder 1503, that then calculates a binary Huffman codeword for the mismatched word and adds the codeword and original data to the word library 1201 as a new key-value pair. The newly-produced codeword may then be appended to the output stream. In arrangements where a mismatch indicator is included in a received data stream, this may be used to preemptively identify a substring that is not in word library 1201 (for example, if it was identified as a mismatch on the transmission end), and handled accordingly without the need for a library lookup.

Figure 19:
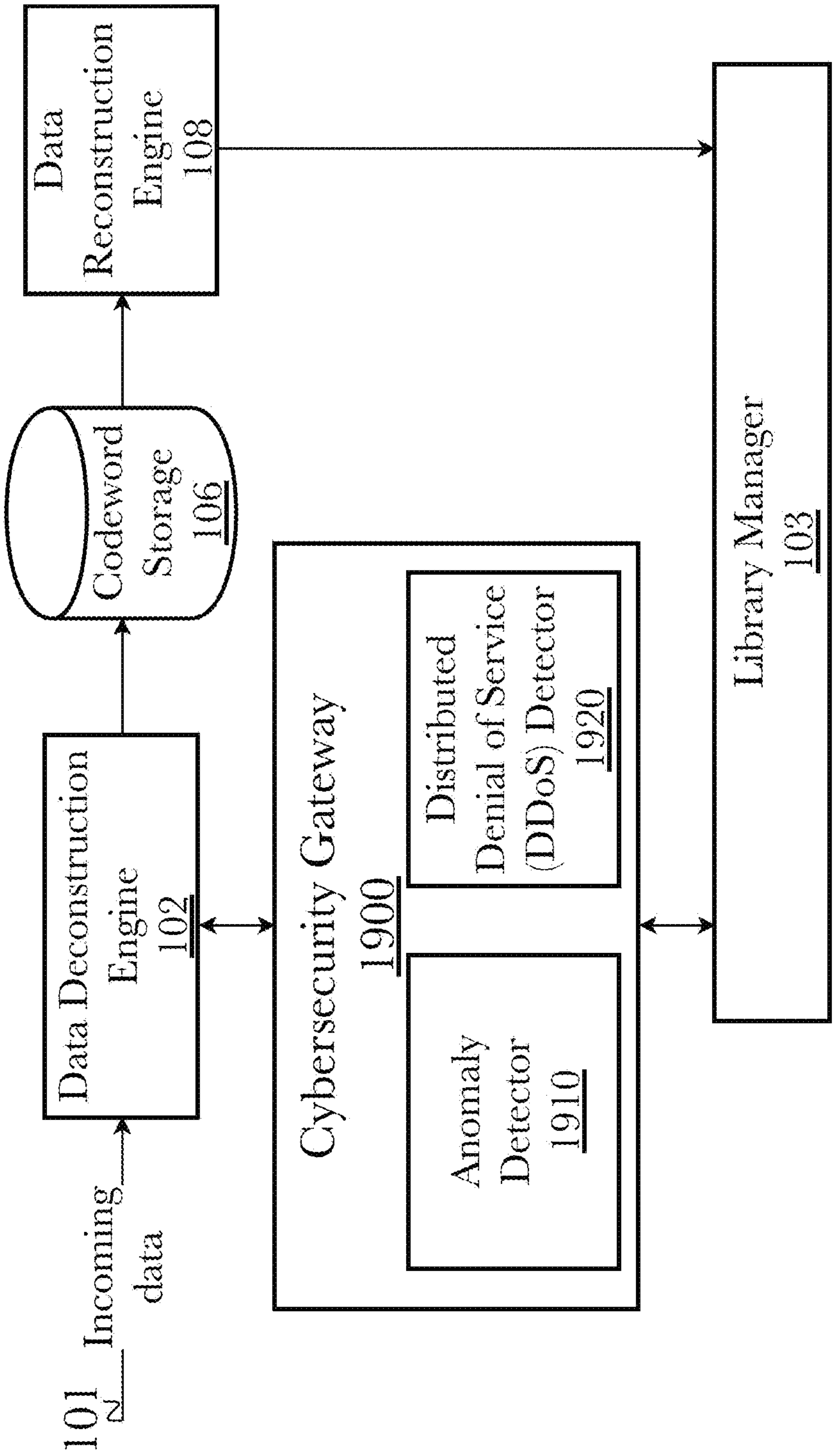
FIG. 19 is an exemplary system architecture of a data encoding system used for cyber security purposes.

FIG. 19 is an exemplary system architecture of a data encoding system used for cyber security purposes. Much like in FIG. 1, incoming data 101 to be deconstructed is sent to a data deconstruction engine 102, which may attempt to deconstruct the data and turn it into a collection of codewords using a library manager 103. Codeword storage 106 serves to store unique codewords from this process, and may be queried by a data reconstruction engine 108 which may reconstruct the original data from the codewords, using a library manager 103. However, a cybersecurity gateway 1900 is present, communicating in-between a library manager 103 and a deconstruction engine 102, and containing an anomaly detector 1910 and distributed denial of service (DDoS) detector 1920. The anomaly detector examines incoming data to determine whether there is a disproportionate number of incoming reference codes that do not match reference codes in the existing library. A disproportionate number of non-matching reference codes may indicate that data is being received from an unknown source, of an unknown type, or contains unexpected (possibly malicious) data. If the disproportionate number of non-matching reference codes exceeds an established threshold or persists for a certain length of time, the anomaly detector 1910 raises a warning to a system administrator. Likewise, the DDOS detector 1920 examines incoming data to determine whether there is a disproportionate amount of repetitive data. A disproportionate amount of repetitive data may indicate that a DDOS attack is in progress. If the disproportionate amount of repetitive data exceeds an established threshold or persists for a certain length of time, the DDOS detector 1910 raises a warning to a system administrator. In this way, a data encoding system may detect and warn users of, or help mitigate, common cyber-attacks that result from a flow of unexpected and potentially harmful data, or attacks that result from a flow of too much irrelevant data meant to slow down a network or system, as in the case of a DDOS attack.

Figure 22:
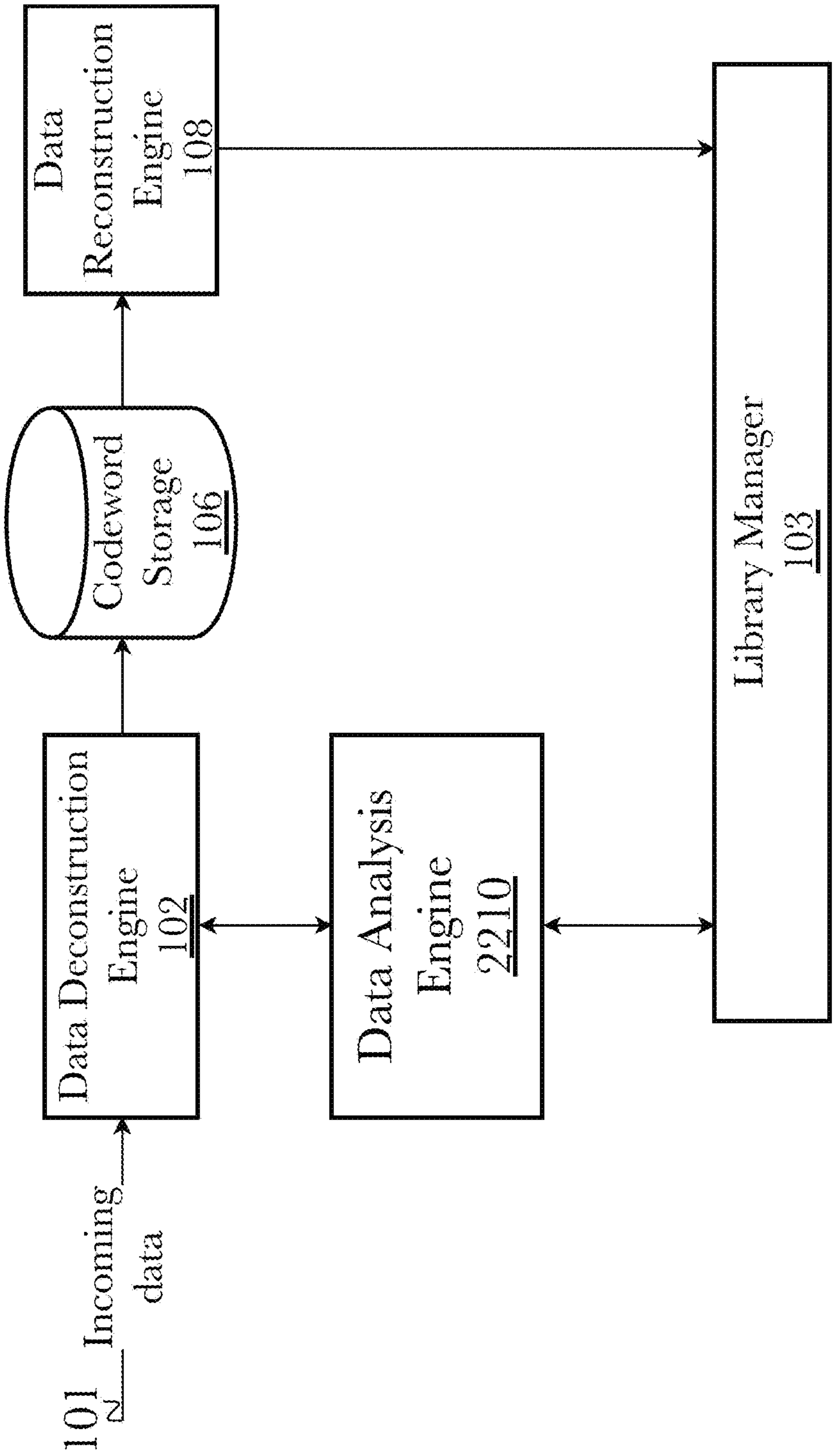
FIG. 22 is an exemplary system architecture of a data encoding system used for data mining and analysis purposes.

FIG. 22 is an exemplary system architecture of a data encoding system used for data mining and analysis purposes. Much like in FIG. 1, incoming data 101 to be deconstructed is sent to a data deconstruction engine 102, which may attempt to deconstruct the data and turn it into a collection of codewords using a library manager 103. Codeword storage 106 serves to store unique codewords from this process, and may be queried by a data reconstruction engine 108 which may reconstruct the original data from the codewords, using a library manager 103. A data analysis engine 2210, typically operating while the system is otherwise idle, sends requests for data to the data reconstruction engine 108, which retrieves the codewords representing the requested data from codeword storage 106, reconstructs them into the data represented by the codewords, and send the reconstructed data to the data analysis engine 2210 for analysis and extraction of useful data (i.e., data mining). Because the speed of reconstruction is significantly faster than decompression using traditional compression technologies (i.e., significantly less decompression latency), this approach makes data mining feasible. Very often, data stored using traditional compression is not mined precisely because decompression lag makes it unfeasible, especially during shorter periods of system idleness. Increasing the speed of data reconstruction broadens the circumstances under which data mining of stored data is feasible.

Figure 24:
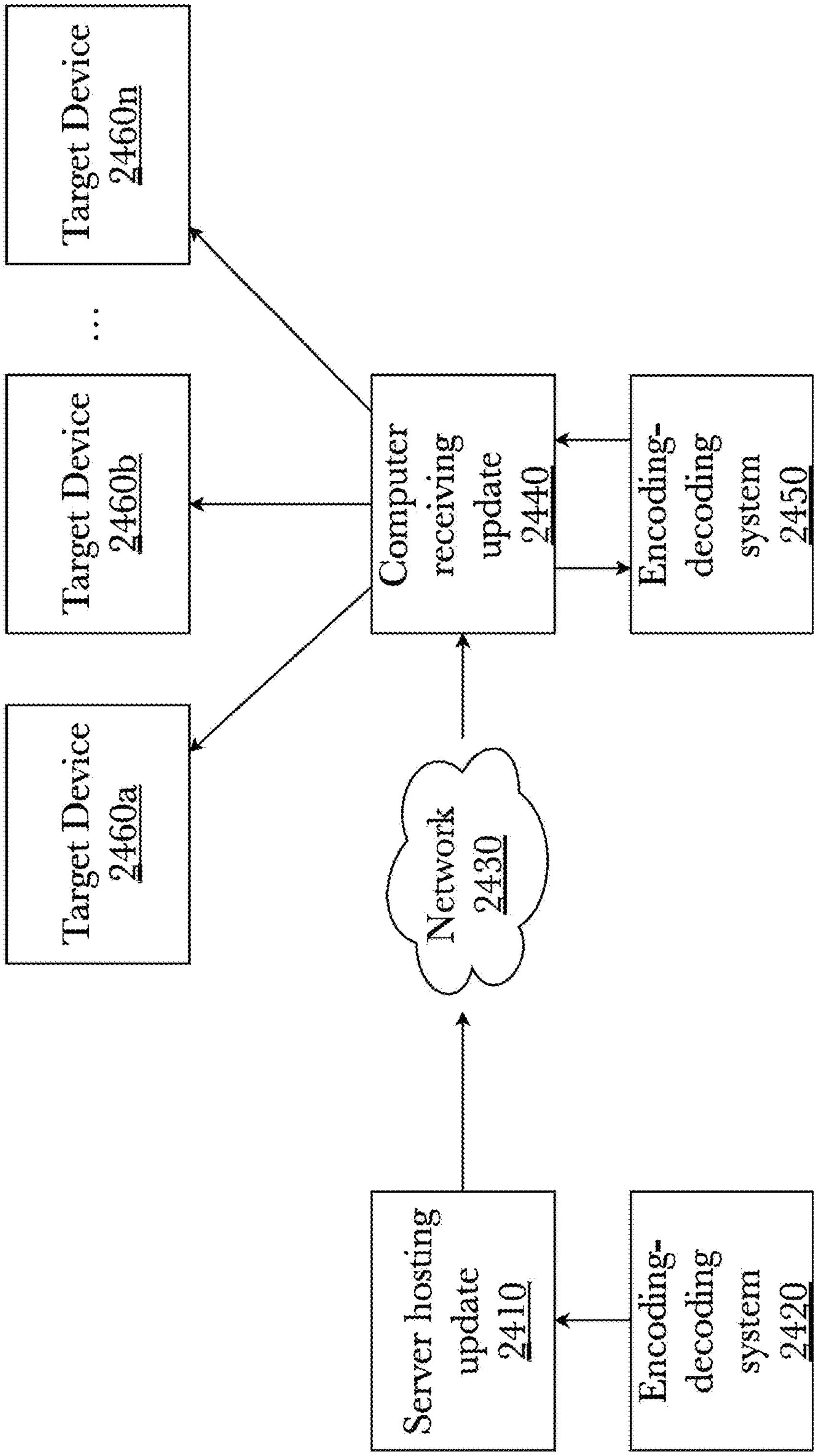
FIG. 24 is an exemplary system architecture of a data encoding system used for remote software and firmware updates.

FIG. 24 is an exemplary system architecture of a data encoding system used for remote software and firmware updates. Software and firmware updates typically require smaller, but more frequent, file transfers. A server which hosts a software or firmware update 2410 may host an encoding-decoding system 2420, allowing for data to be encoded into, and decoded from, sourceblocks or codewords, as disclosed in previous figures. Such a server may possess a software update, operating system update, firmware update, device driver update, or any other form of software update, which in some cases may be minor changes to a file, but nevertheless necessitate sending the new, completed file to the recipient. Such a server is connected over a network 2430, which is further connected to a recipient computer 2440, which may be connected to a server 2410 for receiving such an update to its system. In this instance, the recipient device 2440 also hosts the encoding and decoding system 2450, along with a codebook or library of reference codes that the hosting server 2410 also shares. The updates are retrieved from storage at the hosting server 2410 in the form of codewords, transferred over the network 2430 in the form of codewords, and reconstructed on the receiving computer 2440. In this way, a far smaller file size, and smaller total update size, may be sent over a network. The receiving computer 2440 may then install the updates on any number of target computing devices 2460*a-n*, using a local network or other high-bandwidth connection.

Figure 26:
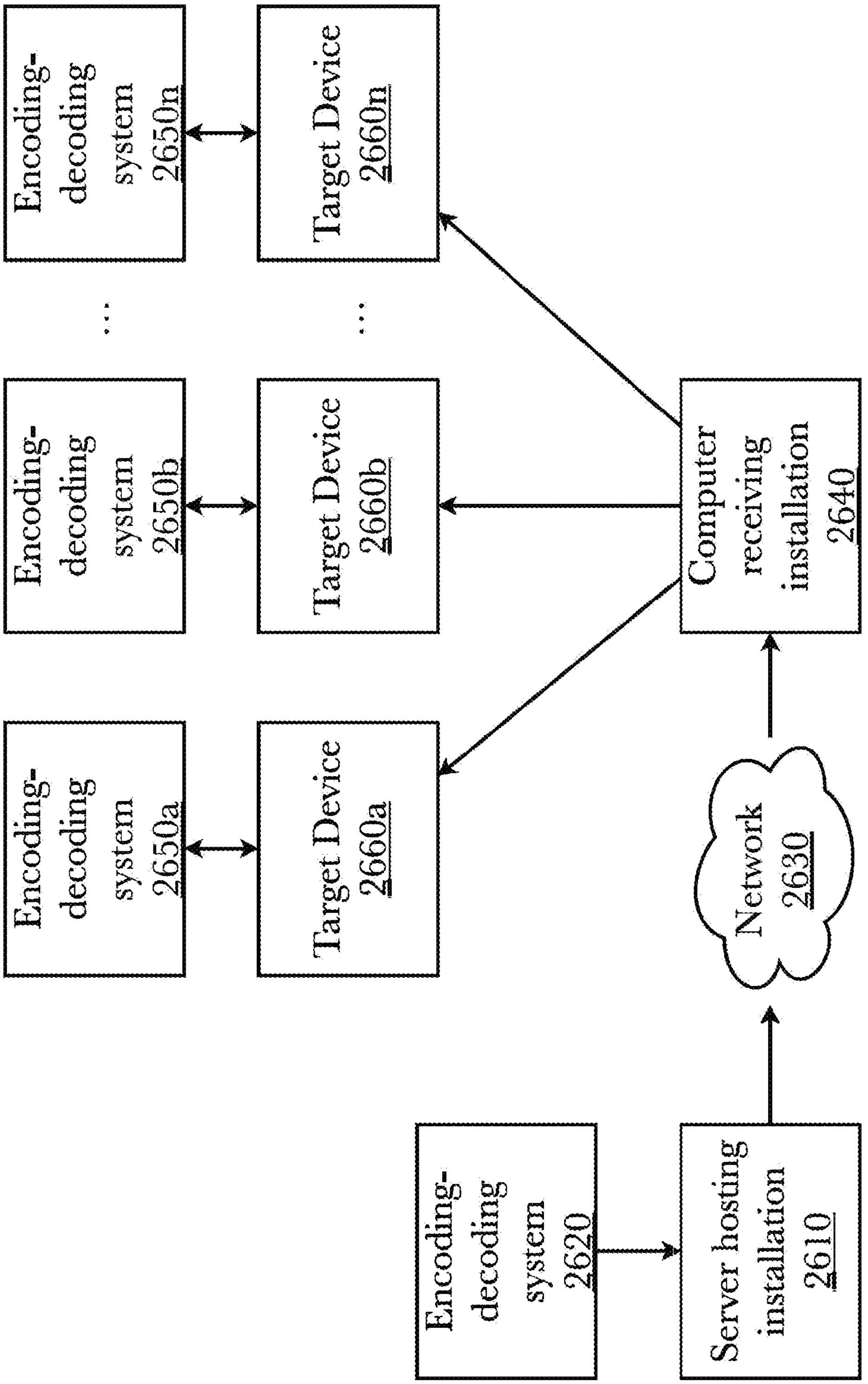
FIG. 26 is an exemplary system architecture of a data encoding system used for large-scale software installation such as operating systems.

FIG. 26 is an exemplary system architecture of a data encoding system used for large-scale software installation such as operating systems. Large-scale software installations typically require very large, but infrequent, file transfers. A server which hosts an installable software 2610 may host an encoding-decoding system 2620, allowing for data to be encoded into, and decoded from, sourceblocks or codewords, as disclosed in previous figures. The files for the large scale software installation are hosted on the server 2610, which is connected over a network 2630 to a recipient computer 2640. In this instance, the encoding and decoding system 2650*a-n* is stored on or connected to one or more target devices 2660*a-n*, along with a codebook or library of reference codes that the hosting server 2610 shares. The software is retrieved from storage at the hosting server 2610 in the form of codewords, and transferred over the network 2630 in the form of codewords to the receiving computer 2640. However, instead of being reconstructed at the receiving computer 2640, the codewords are transmitted to one or more target computing devices, and reconstructed and installed directly on the target devices 2660*a-n*. In this way, a far smaller file size, and smaller total update size, may be sent over a network or transferred between computing devices, even where the network 2630 between the receiving computer 2640 and target devices 2660*a-n* is low bandwidth, or where there are many target devices 2660*a-n*.

Figure 28:
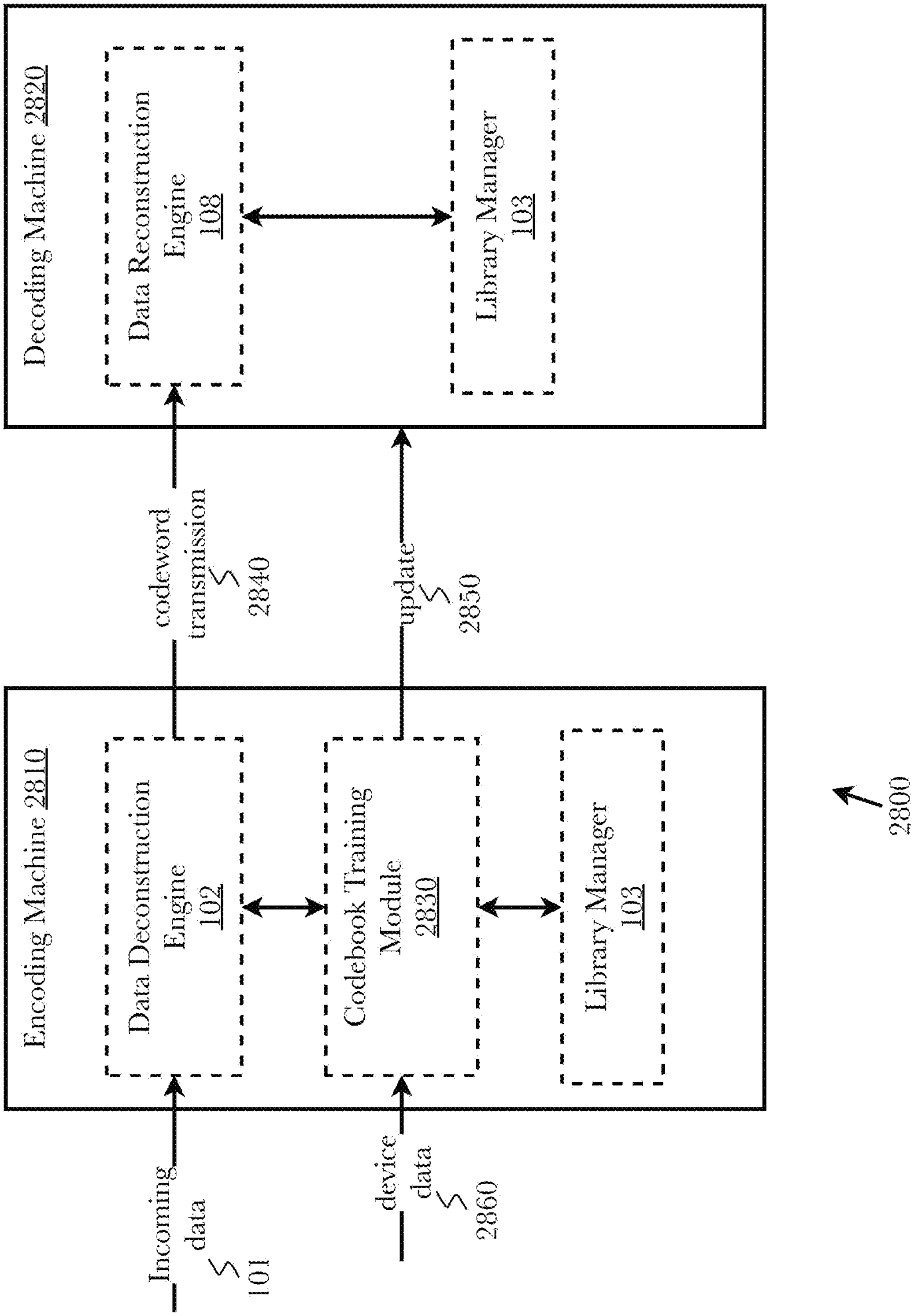
FIG. 28 is a block diagram of an exemplary system architecture of a codebook training system for a data encoding system, according to an embodiment.

FIG. 28 is a block diagram of an exemplary system architecture 2800 of a codebook training system for a data encoding system, according to an embodiment. According to this embodiment, two separate machines may be used for encoding 2810 and decoding 2820. Much like in FIG. 1, incoming data 101 to be deconstructed is sent to a data deconstruction engine 102 residing on encoding machine 2810, which may attempt to deconstruct the data and turn it into a collection of codewords using a library manager 103. Codewords may be transmitted 2840 to a data reconstruction engine 108 residing on decoding machine 2820, which may reconstruct the original data from the codewords, using a library manager 103. However, according to this embodiment, a codebook training module 2830 is present on the decoding machine 2810, communicating in-between a library manager 103 and a deconstruction engine 102. According to other embodiments, codebook training module 2830 may reside instead on decoding machine 2820 if the machine has enough computing resources available; which machine the module 2830 is located on may depend on the system user's architecture and network structure. Codebook training module 2830 may send requests for data to the data reconstruction engine 2810, which routes incoming data 101 to codebook training module 2830. Codebook training module 2830 may perform analyses on the requested data in order to gather information about the distribution of incoming data 101 as well as monitor the encoding/decoding model performance. Additionally, codebook training module 2830 may also request and receive device data 2860 to supervise network connected devices and their processes and, according to some embodiments, to allocate training resources when requested by devices running the encoding system. Devices may include, but are not limited to, encoding and decoding machines, training machines, sensors, mobile computing devices, and Internet-of-things ("IoT") devices. Based on the results of the analyses, the codebook training module 2830 may create a new training dataset from a subset of the requested data in order to counteract the effects of data drift on the encoding/decoding models, and then publish updated 2850 codebooks to both the encoding machine 2810 and decoding machine 2820.

Figure 29:
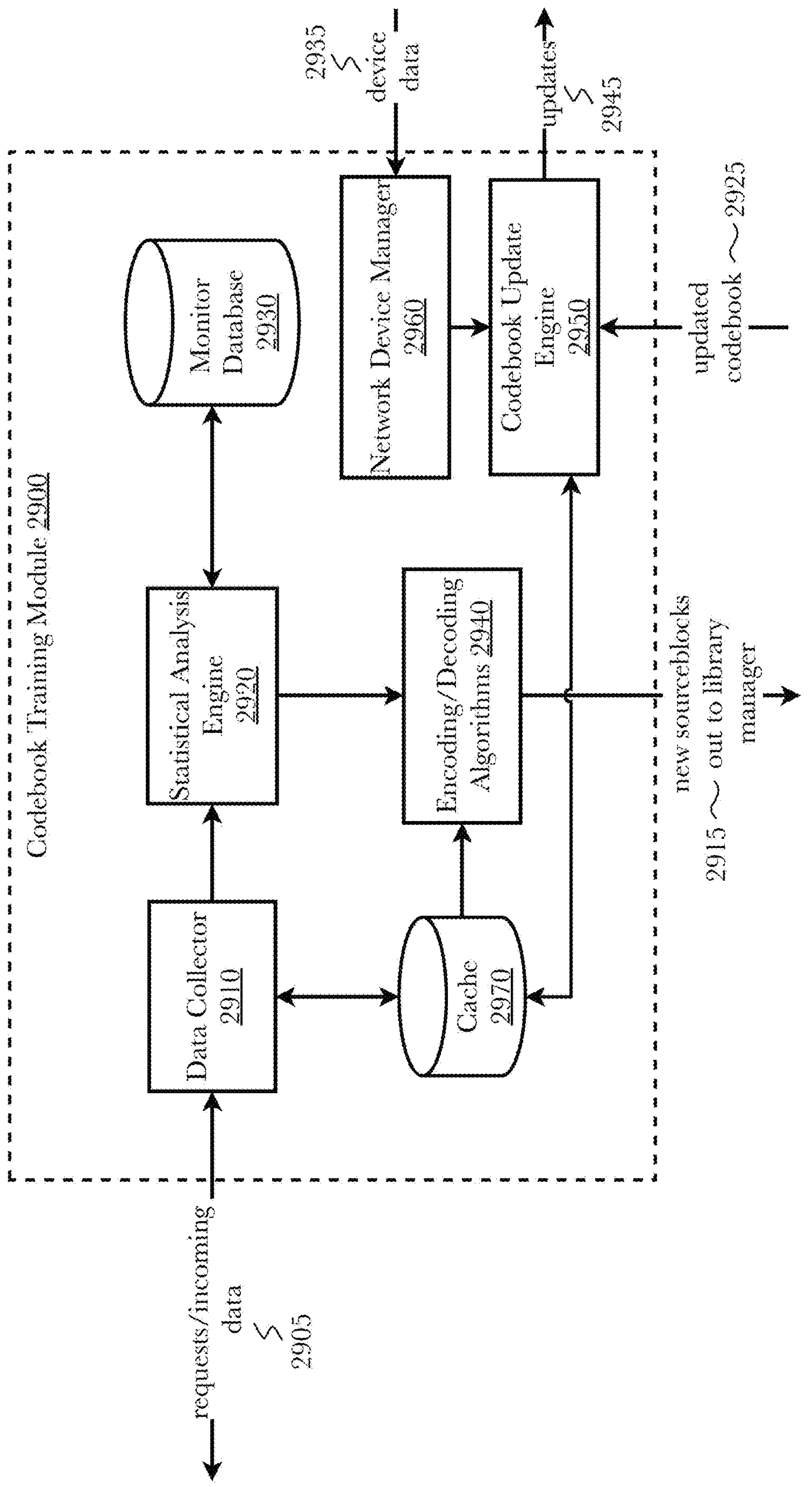
FIG. 29 is a block diagram of an exemplary architecture for a codebook training module, according to an embodiment.

FIG. 29 is a block diagram of an exemplary architecture for a codebook training module 2900, according to an embodiment. According to the embodiment, a data collector 2910 is present which may send requests for incoming data 2905 to a data deconstruction engine 102 which may receive the request and route incoming data to codebook training module 2900 where it may be received by data collector 2910. Data collector 2910 may be configured to request data periodically such as at schedule time intervals, or for example, it may be configured to request data after a certain amount of data has been processed through the encoding machine 2810 or decoding machine 2820. The received data may be a plurality of sourceblocks, which are a series of binary digits, originating from a source packet otherwise referred to as a datagram. The received data may compiled into a test dataset and temporarily stored in a cache 2970. Once stored, the test dataset may be forwarded to a statistical analysis engine 2920 which may utilize one or more algorithms to determine the probability distribution of the test dataset. Best-practice probability distribution algorithms such as Kullback-Leibler divergence, adaptive windowing, and Jensen-Shannon divergence may be used to compute the probability distribution of training and test datasets. A monitoring database 2930 may be used to store a variety of statistical data related to training datasets and model performance metrics in one place to facilitate quick and accurate system monitoring capabilities as well as assist in system debugging functions. For example, the original or current training dataset and the calculated probability distribution of this training dataset used to develop the current encoding and decoding algorithms may be stored in monitor database 2930.

Since data drifts involve statistical change in the data, the best approach to detect drift is by monitoring the incoming data's statistical properties, the model's predictions, and their correlation with other factors. After statistical analysis engine 2920 calculates the probability distribution of the test dataset it may retrieve from monitor database 2930 the calculated and stored probability distribution of the current training dataset. It may then compare the two probability distributions of the two different datasets in order to verify if the difference in calculated distributions exceeds a predetermined difference threshold. If the difference in distributions does not exceed the difference threshold, that indicates the test dataset, and therefore the incoming data, has not experienced enough data drift to cause the encoding/decoding system performance to degrade significantly, which indicates that no updates are necessary to the existing codebooks. However, if the difference threshold has been surpassed, then the data drift is significant enough to cause the encoding/decoding system performance to degrade to the point where the existing models and accompanying codebooks need to be updated. According to an embodiment, an alert may be generated by statistical analysis engine 2920 if the difference threshold is surpassed or if otherwise unexpected behavior arises.

In the event that an update is required, the test dataset stored in the cache 2970 and its associated calculated probability distribution may be sent to monitor database 2930 for long term storage. This test dataset may be used as a new training dataset to retrain the encoding and decoding algorithms 2940 used to create new sourceblocks based upon the changed probability distribution. The new sourceblocks may be sent out to a library manager 2915 where the sourceblocks can be assigned new codewords. Each new sourceblock and its associated codeword may then be added to a new codebook and stored in a storage device. The new and updated codebook may then be sent back 2925 to codebook training module 2900 and received by a codebook update engine 2950. Codebook update engine 2950 may temporarily store the received updated codebook in the cache 2970 until other network devices and machines are ready, at which point codebook update engine 2950 will publish the updated codebooks 2945 to the necessary network devices.

A network device manager 2960 may also be present which may request and receive network device data 2935 from a plurality of network connected devices and machines. When the disclosed encoding system and codebook training system 2800 are deployed in a production environment, upstream process changes may lead to data drift, or other unexpected behavior. For example, a sensor being replaced that changes the units of measurement from inches to centimeters, data quality issues such as a broken sensor always reading 0, and covariate shift which occurs when there is a change in the distribution of input variables from the training set. These sorts of behavior and issues may be determined from the received device data 2935 in order to identify potential causes of system error that is not related to data drift and therefore does not require an updated codebook. This can save network resources from being unnecessarily used on training new algorithms as well as alert system users to malfunctions and unexpected behavior devices connected to their networks. Network device manager 2960 may also utilize device data 2935 to determine available network resources and device downtime or periods of time when device usage is at its lowest. Codebook update engine 2950 may request network and device availability data from network device manager 2960 in order to determine the most optimal time to transmit updated codebooks (i.e., trained libraries) to encoder and decoder devices and machines.

Figure 30:
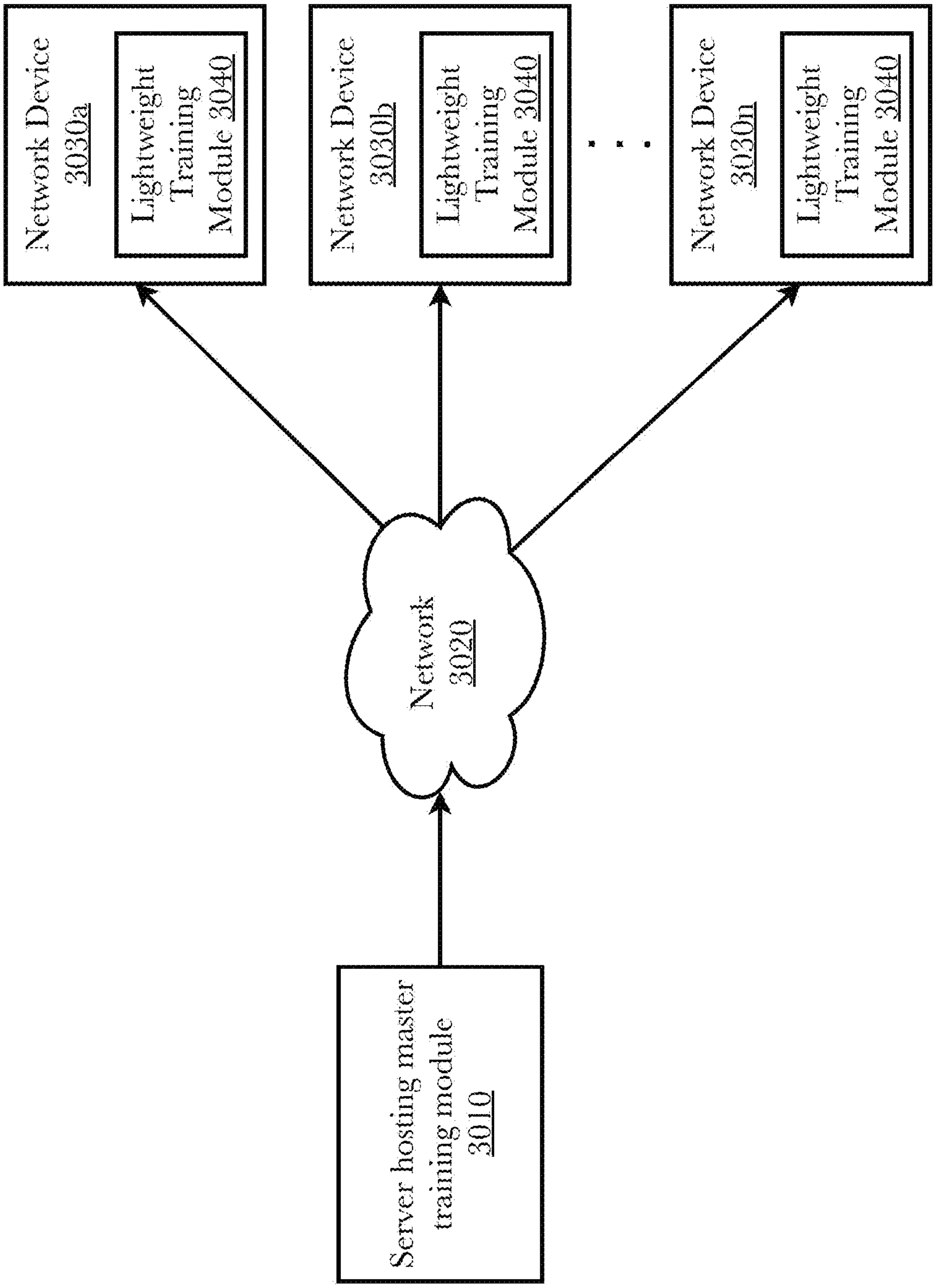
FIG. 30 is a block diagram of another embodiment of the codebook training system using a distributed architecture and a modified training module.

FIG. 30 is a block diagram of another embodiment of the codebook training system using a distributed architecture and a modified training module. According to an embodiment, there may be a server which maintains a master supervisory process over remote training devices hosting a master training module 3010 which communicates via a network 3020 to a plurality of connected network devices 3030*a-n*. The server may be located at the remote training end such as, but not limited to, cloud-based resources, a user-owned data center, etc. The master training module located on the server operates similarly to the codebook training module disclosed in FIG. 29 above, however, the server 3010 utilizes the master training module via the network device manager 2960 to farm out training resources to network devices 3030*a-n*. The server 3010 may allocate resources in a variety of ways, for example, round-robin, priority-based, or other manner, depending on the user needs, costs, and number of devices running the encoding/decoding system. Server 3010 may identify elastic resources which can be employed if available to scale up training when the load becomes too burdensome. On the network devices 3030*a-n* may be present a lightweight version of the training module 3040 that trades a little suboptimality in the codebook for training on limited machinery and/or makes training happen in low-priority threads to take advantage of idle time. In this way the training of new encoding/decoding algorithms may take place in a distributed manner which allows data gathering or generating devices to process and train on data gathered locally, which may improve system latency and optimize available network resources.

Figure 32:
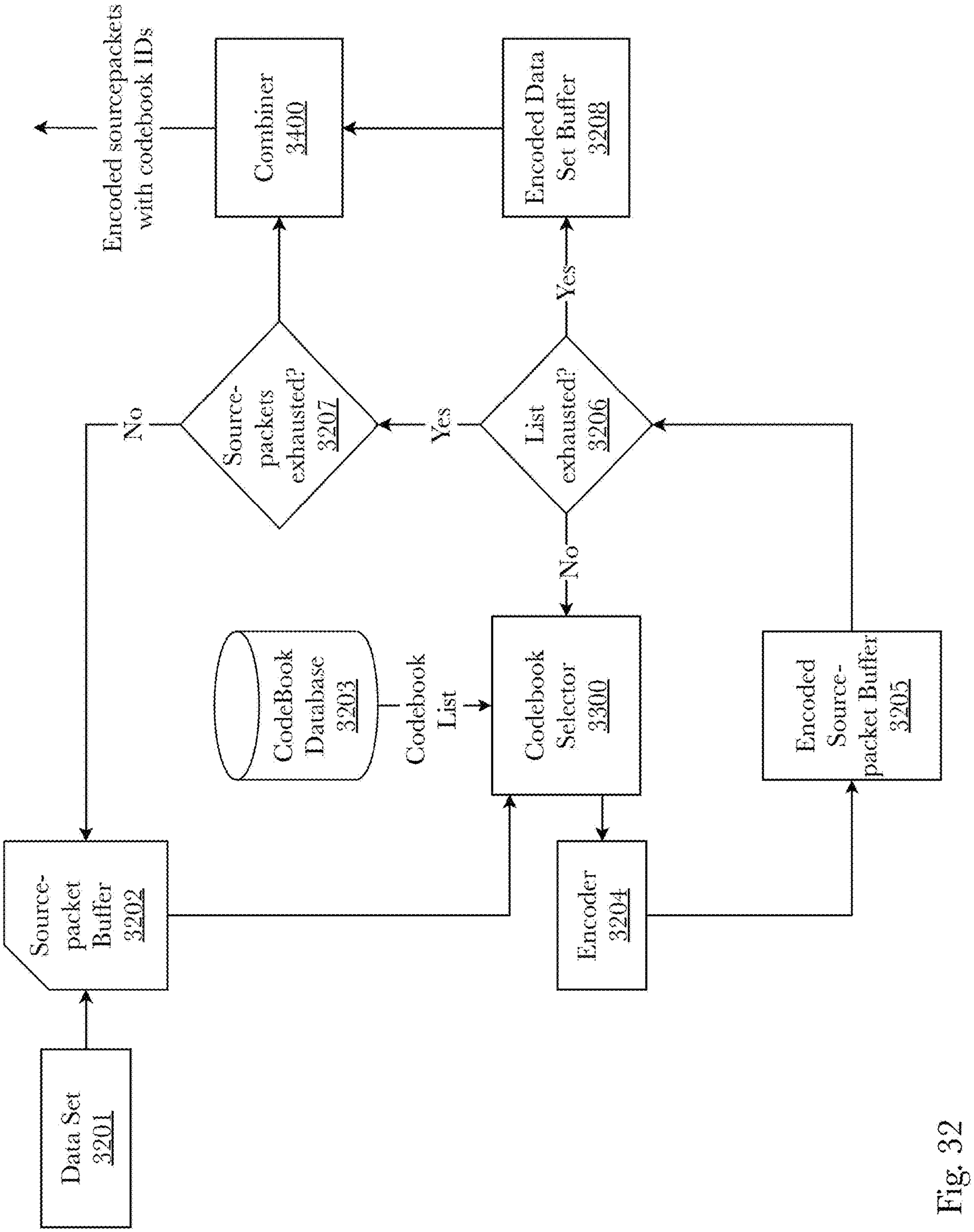
FIG. 32 is an exemplary system architecture for an encoding system with multiple codebooks.

FIG. 32 is an exemplary system architecture for an encoding system with multiple codebooks. A data set to be encoded 3201 is sent to a sourcepacket buffer 3202. The sourcepacket buffer is an array which stores the data which is to be encoded and may contain a plurality of sourcepackets. Each sourcepacket is routed to a codebook selector 3300, which retrieves a list of codebooks from a codebook database 3203. The sourcepacket is encoded using the first codebook on the list via an encoder 3204, and the output is stored in an encoded sourcepacket buffer 3205. The process is repeated with the same sourcepacket using each subsequent codebook on the list until the list of codebooks is exhausted 3206, at which point the most compact encoded version of the sourcepacket is selected from the encoded sourcepacket buffer 3205 and sent to an encoded data set buffer 3208 along with the ID of the codebook used to produce it. The sourcepacket buffer 3202 is determined to be exhausted 3207, a notification is sent to a combiner 3400, which retrieves all of the encoded sourcepackets and codebook IDs from the encoded data set buffer 3208, and combines them into a single file for output.

According to an embodiment, the list of codebooks used in encoding the data set may be consolidated to a single codebook which is provided to the combiner 3400 for output along with the encoded sourcepackets and codebook IDs. In this case, the single codebook will contain the data from, and codebook IDs of, each of the codebooks used to encode the data set. This may provide a reduction in data transfer time, although it is not required since each sourcepacket (or sourceblock) will contain a reference to a specific codebook ID which references a codebook that can be pulled from a database or be sent alongside the encoded data to a receiving device for the decoding process.

In some embodiments, each sourcepacket of a data set 3201 arriving at the encoder 3204 is encoded using a different sourceblock length. Changing the sourceblock length changes the encoding output of a given codebook. Two sourcepackets encoded with the same codebook but using different sourceblock lengths would produce different encoded outputs. Therefore, changing the sourceblock length of some or all sourcepackets in a data set 3201 provides additional security. Even if the codebook was known, the sourceblock length would have to be known or derived for each sourceblock in order to decode the data set 3201. Changing the sourceblock length may be used in conjunction with the use of multiple codebooks.

Figure 33:
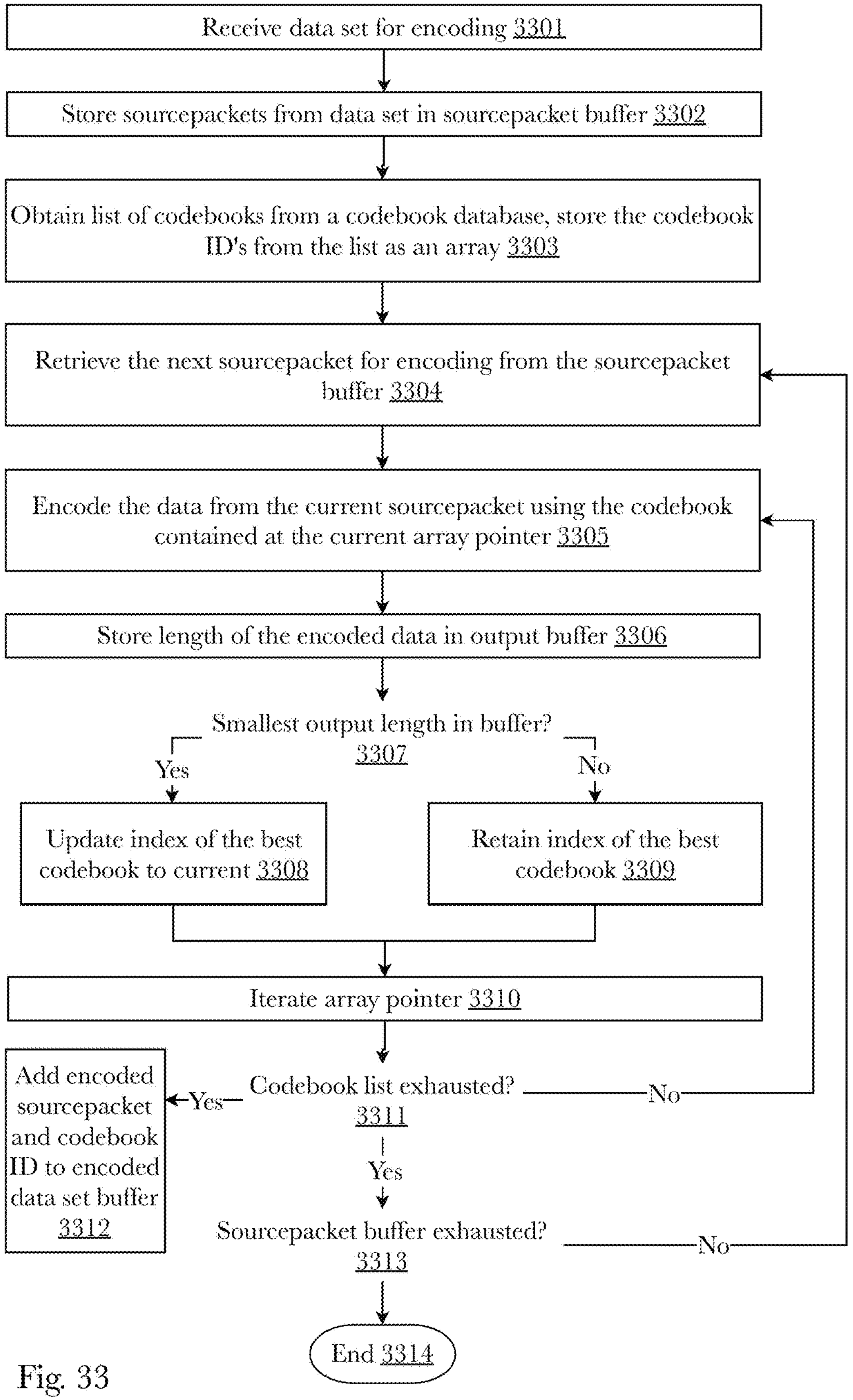
FIG. 33 is a flow diagram describing an exemplary algorithm for encoding of data using multiple codebooks.

FIG. 33 is a flow diagram describing an exemplary algorithm for encoding of data using multiple codebooks. A data set is received for encoding 3301, the data set comprising a plurality of sourcepackets. The sourcepackets are stored in a sourcepacket buffer 3302. A list of codebooks to be used for multiple codebook encoding is retrieved from a codebook database (which may contain more codebooks than are contained in the list) and the codebook IDs for each codebook on the list are stored as an array 3303. The next sourcepacket in the sourcepacket buffer is retrieved from the sourcepacket buffer for encoding 3304. The sourcepacket is encoded using the codebook in the array indicated by a current array pointer 3305. The encoded sourcepacket and length of the encoded sourcepacket is stored in an encoded sourcepacket buffer 3306. If the length of the most recently stored sourcepacket is the shortest in the buffer 3307, an index in the buffer is updated to indicate that the codebook indicated by the current array pointer is the most efficient codebook in the buffer for that sourcepacket. If the length of the most recently stored sourcepacket is not the shortest in the buffer 3307, the index in the buffer is not updated 3308 because a previous codebook used to encode that sourcepacket was more efficient 3309. The current array pointer is iterated to select the next codebook in the list 3310. If the list of codebooks has not been exhausted 3311, the process is repeated for the next codebook in the list, starting at step 3305. If the list of codebooks has been exhausted 3311, the encoded sourcepacket in the encoded sourcepacket buffer (the most compact version) and the codebook ID for the codebook that encoded it are added to an encoded data set buffer 3312 for later combination with other encoded sourcepackets from the same data set. At that point, the sourcepacket buffer is checked to see if any sourcepackets remain to be encoded 3313. If the sourcepacket buffer is not exhausted, the next sourcepacket is retrieved 3304 and the process is repeated starting at step 3304. If the sourcepacket buffer is exhausted 3313, the encoding process ends 3314. In some embodiments, rather than storing the encoded sourcepacket itself in the encoded sourcepacket buffer, a universal unique identification (UUID) is assigned to each encoded sourcepacket, and the UUID is stored in the encoded sourcepacket buffer instead of the entire encoded sourcepacket.

FIG. 34 is a diagram showing an exemplary control byte used to combine sourcepackets encoded with multiple codebooks. In this embodiment, a control byte 3401 (i.e., a series of 8 bits) is inserted at the before (or after, depending on the configuration) the encoded sourcepacket with which it is associated, and provides information about the codebook that was used to encode the sourcepacket. In this way, sourcepackets of a data set encoded using multiple codebooks can be combined into a data structure comprising the encoded sourcepackets, each with a control byte that tells the system how the sourcepacket can be decoded. The data structure may be of numerous forms, but in an embodiment, the data structure comprises a continuous series of control bytes followed by the sourcepacket associated with the control byte. In some embodiments, the data structure will comprise a continuous series of control bytes followed by the UUID of the sourcepacket associated with the control byte (and not the encoded sourcepacket, itself). In some embodiments, the data structure may further comprise a UUID inserted to identify the codebook used to encode the sourcepacket, rather than identifying the codebook in the control byte. Note that, while a very short control code (one byte) is used in this example, the control code may be of any length, and may be considerably longer than one byte in cases where the sourceblocks size is large or in cases where a large number of codebooks have been used to encode the sourcepacket or data set.

In this embodiment, for each bit location 3402 of the control byte 3401, a data bit or combinations of data bits 3403 provide information necessary for decoding of the sourcepacket associated with the control byte. Reading in reverse order of bit locations, the first bit N (location 7) indicates whether the entire control byte is used or not. If a single codebook is used to encode all sourcepackets in the data set, N is set to 0, and bits 3 to 0 of the control byte 3401 are ignored. However, where multiple codebooks are used, N is set to 1 and all 8 bits of the control byte 3401 are used. The next three bits RRR (locations 6 to 4) are a residual count of the number of bits that were not used in the last byte of the sourcepacket. Unused bits in the last byte of a sourcepacket can occur depending on the sourceblock size used to encode the sourcepacket. The next bit I (location 3) is used to identify the codebook used to encode the sourcepacket. If bit I is 0, the next three bits CCC (locations 2 to 0) provide the codebook ID used to encode the sourcepacket. The codebook ID may take the form of a codebook cache index, where the codebooks are stored in an enumerated cache. If bit I is 1, then the codebook is identified using a four-byte UUID that follows the control byte.

Figure 35:
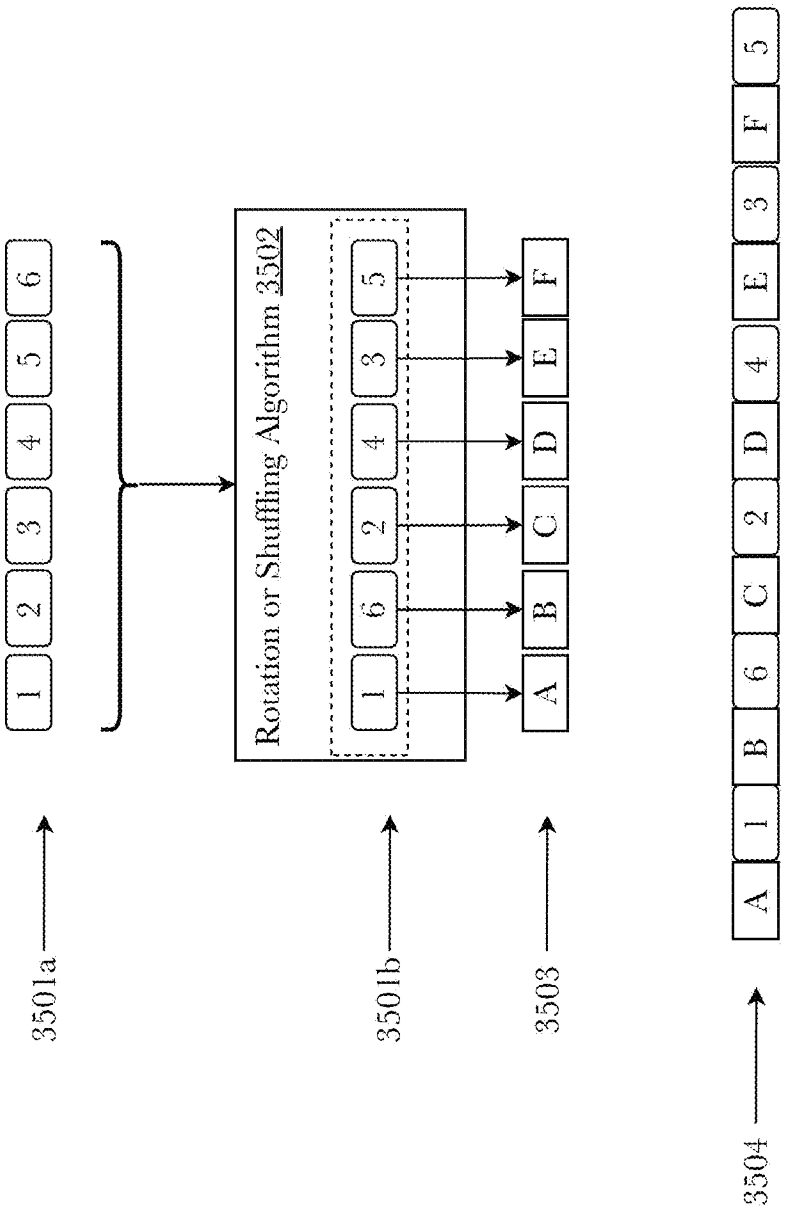
FIG. 35 is a diagram showing an exemplary codebook shuffling method.

FIG. 35 is a diagram showing an exemplary codebook shuffling method. In this embodiment, rather than selecting codebooks for encoding based on their compression efficiency, codebooks are selected either based on a rotating list or based on a shuffling algorithm. The methodology of this embodiment provides additional security to compressed data, as the data cannot be decoded without knowing the precise sequence of codebooks used to encode any given sourcepacket or data set.

Here, a list of six codebooks is selected for shuffling, each identified by a number from 1 to 6 3501*a*. The list of codebooks is sent to a rotation or shuffling algorithm 3502, and reorganized according to the algorithm 3501*b*. The first six of a series of sourcepackets, each identified by a letter from A to E, 3503 is each encoded by one of the algorithms, in this case A is encoded by codebook 1, B is encoded by codebook 6, C is encoded by codebook 2, D is encoded by codebook 4, E is encoded by codebook 13 A is encoded by codebook 5. The encoded sourcepackets 3503 and their associated codebook identifiers 3501*b* are combined into a data structure 3504 in which each encoded sourcepacket is followed by the identifier of the codebook used to encode that particular sourcepacket.

According to an embodiment, the codebook rotation or shuffling algorithm 3502 may produce a random or pseudo-random selection of codebooks based on a function. Some non-limiting functions that may be used for shuffling include:

1. given a function f(n) which returns a codebook according to an input parameter n in the range 1 to N are, and given t the number of the current sourcepacket or sourceblock: f(t*M modulo p), where M is an arbitrary multiplying factor (1<=M<=p−1) which acts as a key, and p is a large prime number less than or equal to N;
2. f(A^t modulo p), where A is a base relatively prime to p−1 which acts as a key, and p is a large prime number less than or equal to N;
3. f(floor(t*x)modulo N), and x is an irrational number chosen randomly to act as a key;
4. f(t XOR K) where the XOR is performed bit-wise on the binary representations of t and a key K with same number of bits in its representation of N. The function f(n) may return the nth codebook simply by referencing the nth element in a list of codebooks, or it could return the nth codebook given by a formula chosen by a user.

In one embodiment, prior to transmission, the endpoints (users or devices) of a transmission agree in advance about the rotation list or shuffling function to be used, along with any necessary input parameters such as a list order, function code, cryptographic key, or other indicator, depending on the requirements of the type of list or function being used. Once the rotation list or shuffling function is agreed, the endpoints can encode and decode transmissions from one another using the encodings set forth in the current codebook in the rotation or shuffle plus any necessary input parameters.

In some embodiments, the shuffling function may be restricted to permutations within a set of codewords of a given length.

Note that the rotation or shuffling algorithm is not limited to cycling through codebooks in a defined order. In some embodiments, the order may change in each round of encoding. In some embodiments, there may be no restrictions on repetition of the use of codebooks.

In some embodiments, codebooks may be chosen based on some combination of compression performance and rotation or shuffling. For example, codebook shuffling may be repeatedly applied to each sourcepacket until a codebook is found that meets a minimum level of compression for that sourcepacket. Thus, codebooks are chosen randomly or pseudo-randomly for each sourcepacket, but only those that produce encodings of the sourcepacket better than a threshold will be used.

Figure 36:
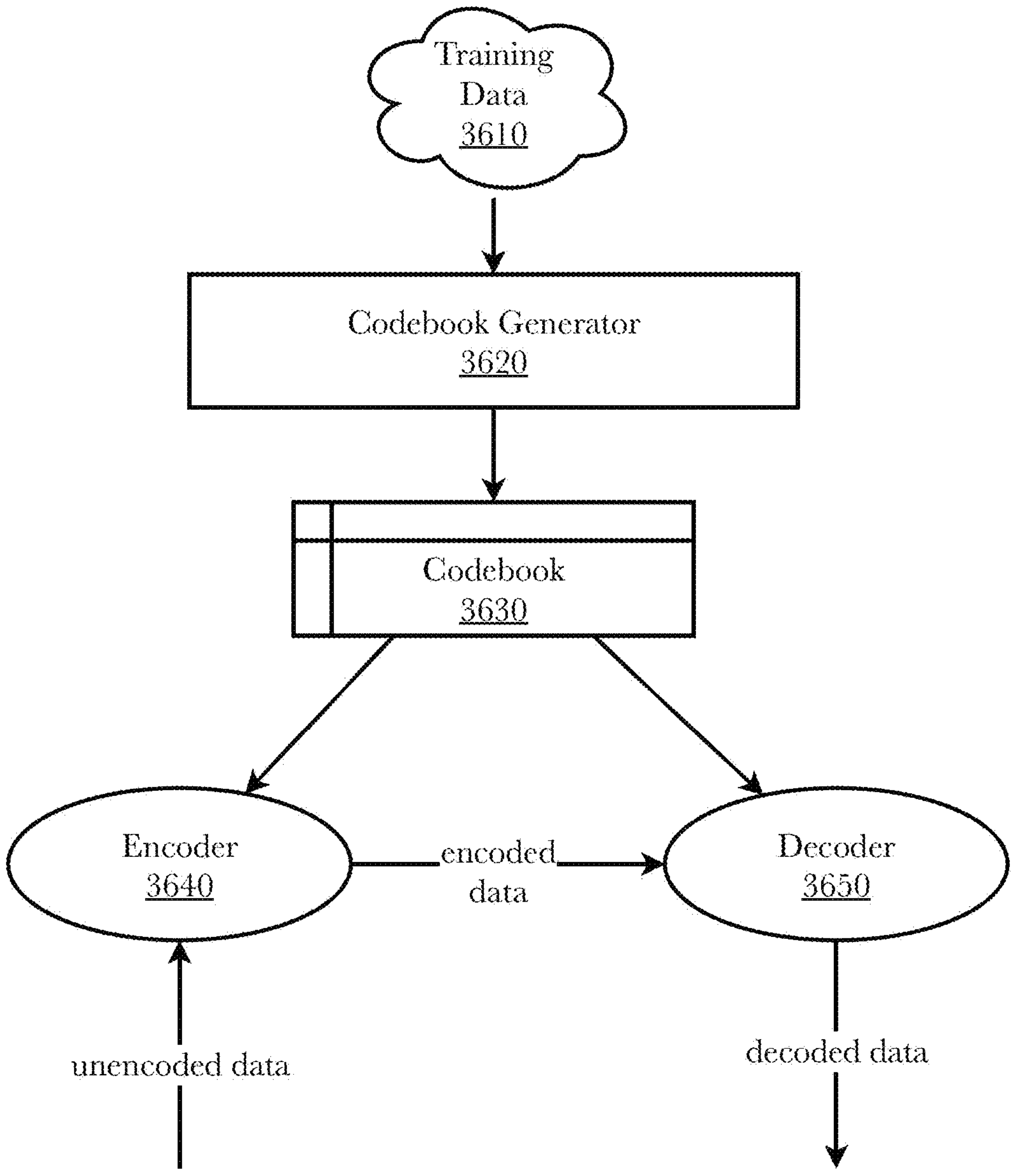
FIG. 36 shows an exemplary encoding/decoding configuration as previously described in an embodiment.

FIG. 36 shows an encoding/decoding configuration as previously described in an embodiment. In certain previously-described embodiments, training data 3610 is fed to a codebook generator 3620, which generates a codebook based on the training data. The codebook 3630 is sent to both an encoder 3640 and a decoder 3650 which may be on the same computer or on different computers, depending on the configuration. The encoder 3640 receives unencoded data, encodes it into codewords using the codebook 3630, and sends encoded data in the form of codewords to the decoder 3650. The decoder 3650 receives the encoded data in the form of codewords, decodes it using the same codebook 3630 (which may be a different copy of the codebook in some configurations), and outputs decoded data which is identical to the unencoded data received by the encoder 3640.

Figure 37:
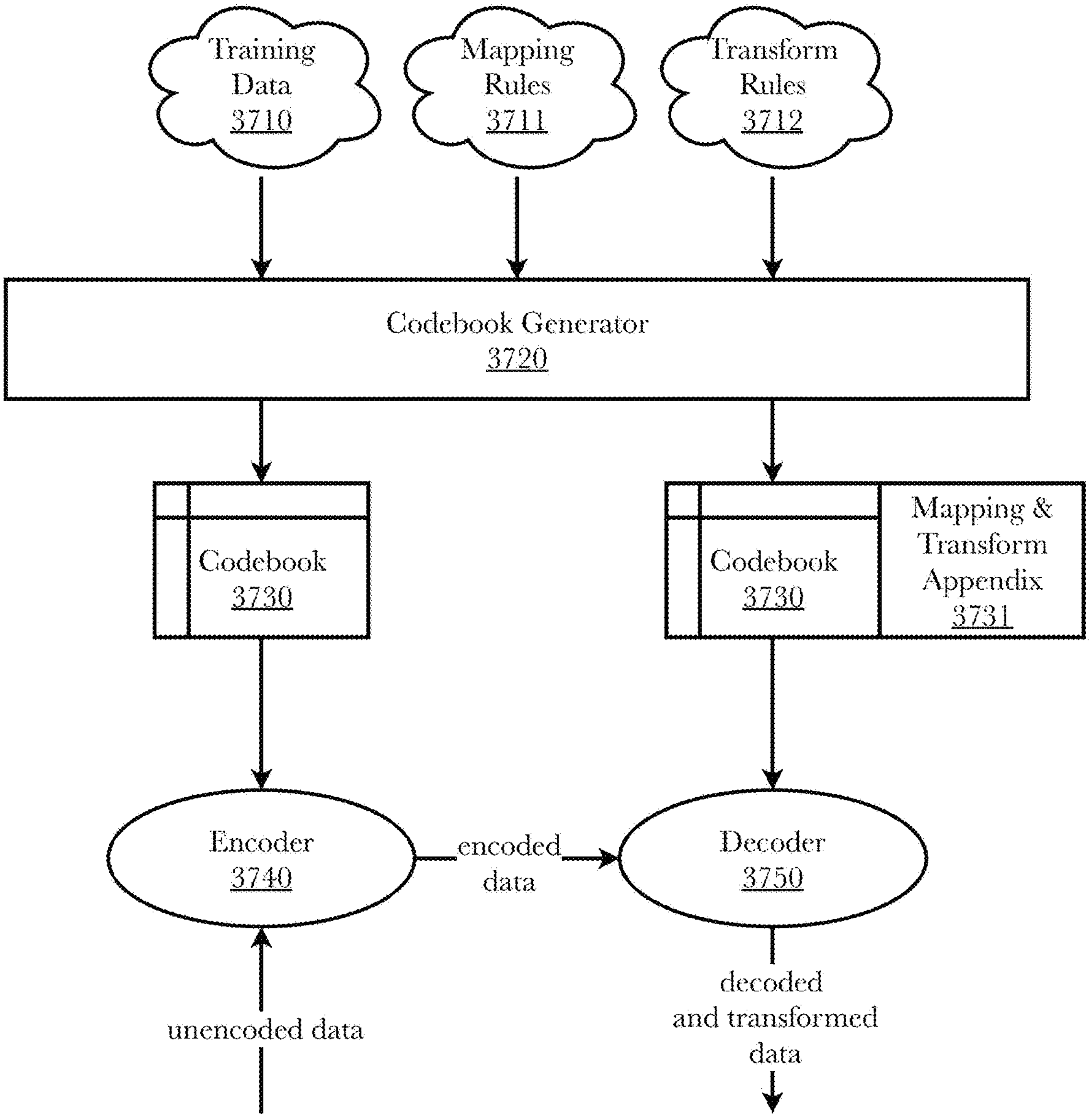
FIG. 37 shows an exemplary encoding/decoding configuration with extended functionality suitable to derive a different data set at the decoder from the data arriving at the encoder.

FIG. 37 shows an encoding/decoding configuration with extended functionality suitable to derive a different data set at the decoder from the data arriving at the encoder. In this configuration, mapping rules 3711 and data transformation rules 3712 are combined with the training data 3710 fed into the codebook generator. The codebook generator 3720 creates a codebook 3730 from the training data. The codebook 3730 is sent to the encoder 3740 which receives unencoded data, encodes it into codewords using the codebook 3730, and sends encoded data in the form of codewords to the decoder 3750. In this configuration, however, the codebook generator 3720 also creates a mapping and transformation appendix 3731 which it appends to the copy of the codebook 3730 sent to the decoder. The appendix 3731 may be a separate file or document, or may be integrated into the codebook 3730, such as in the form of bit extensions appended to each sourceblock in the codebook 3730 or an additional dimensional array to the codebook 3730 which provides instructions as to mapping and transformations.

The decoder 3750 receives the encoded data in the form of codewords, decodes it using the same codebook 3730 (which may be a different copy of the codebook in some configurations), but instead of outputting decoded data which is identical to the unencoded data received by the encoder 3740, the decoder maps and/or transforms the decoded data according to the mapping and transformation appendix, converting the decoded data into a transformed data output. As a simple example of the operation of this configuration, the unencoded data received by the encoder 3740 might be a list of geographical location names, and the decoded and transformed data output by the decoder based on the mapping and transformation appendix 3731 might be a list of GPS coordinates for those geographical location names.

In some embodiments, artificial intelligence or machine learning algorithms might be used to develop or generate the mapping and transformation rules. For example, the training data might be processed through a machine learning algorithm trained (on a different set of training data) to identify certain characteristics within the training data such as unusual numbers of repetitions of certain bit patterns, unusual amounts of gaps in the data (e.g., large numbers of zeros), or even unusual amounts of randomness, each of which might indicate a problem with the data such as missing or corrupted data, possible malware, possible encryption, etc. As the training data is processed, the mapping and transform appendix 3731 is generated by the machine learning algorithm based on the identified characteristics. In this example, the output of the decoder might be indications of the locations of possible malware in the decoded data or portions of the decoded data that are encrypted. In some embodiments, direct encryption (e.g., SSL) might be used to further protect the encoded data during transmission.

Figure 38:
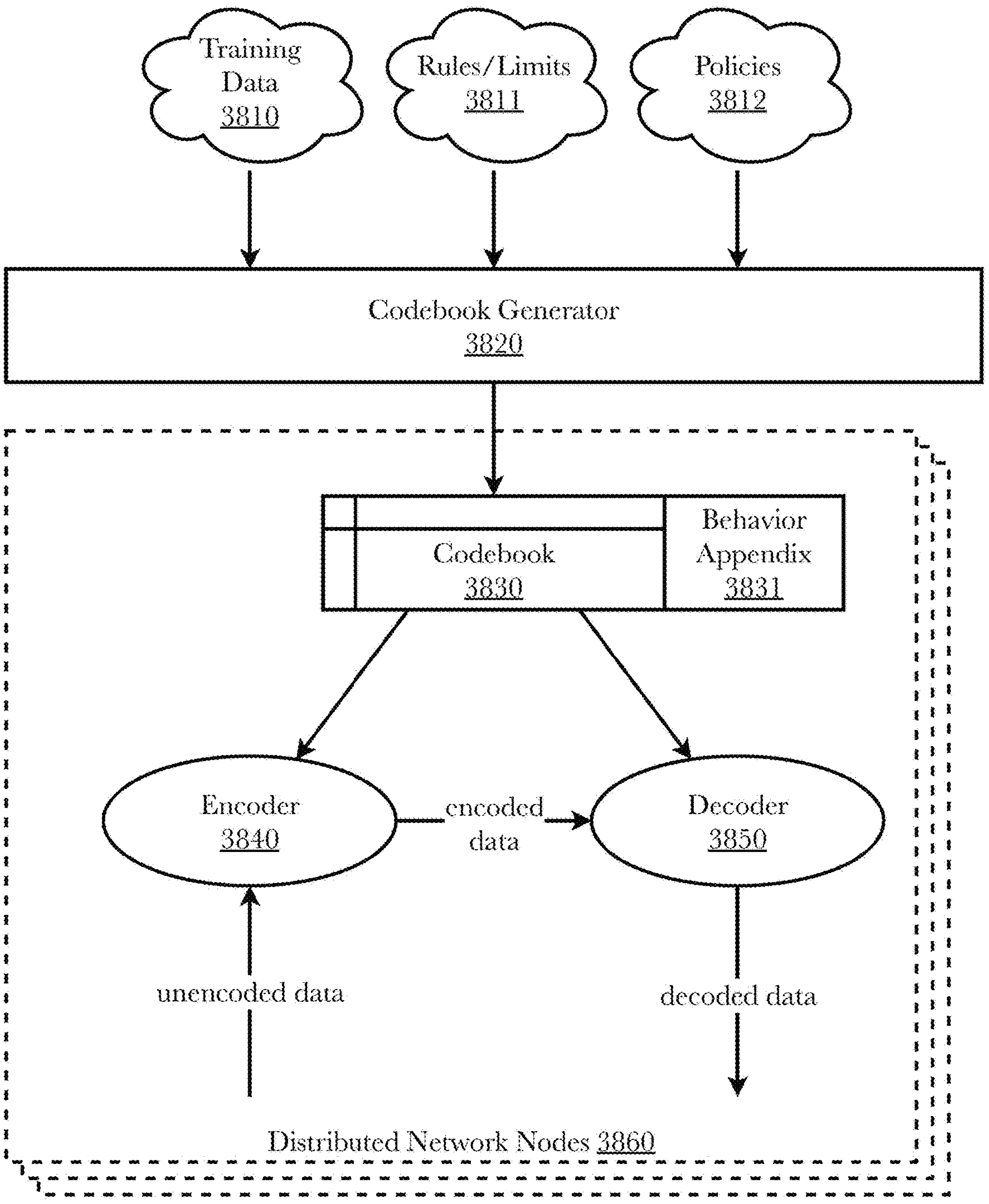
FIG. 38 shows an exemplary encoding/decoding configuration with extended functionality suitable for using in a distributed computing environment.

FIG. 38 shows an encoding/decoding configuration with extended functionality suitable for using in a distributed computing environment comprising a plurality of distributed network nodes 3860. In this configuration, network rules and limits 3811 and network policies 3812 are combined with the training data 3810 fed into the codebook generator. The codebook generator 3820 creates a codebook 3830 from the training data. The codebook generator 3820 also creates a behavior appendix 3831 which it appends to the copies of the codebook 3830 sent to both the encoder 3840 and decoder 3850. The appendix 3831 may be a separate file or document, or may be integrated into the codebook 3830, such as in the form of bit extensions appended to each sourceblock in the codebook 3830 which provide instructions as to mapping and transformations. In some embodiments, the behavior appendix 3831 may be sent only to the encoder 3840 or decoder 3850, depending on network configuration and other parameters.

The encoder 3840 receives unencoded data, implements any behaviors required by the behavior appendix 3831 such as limit checking, network policies, data prioritization, permissions, etc., as encodes it into codewords using the codebook 3830. For example, as data is encoded, the encoder may check the behavior appendix for each sourceblock within the data to determine whether that sourceblock (or a combination of sourceblocks) violates any network rules. As a couple of non-limiting examples, certain sourceblocks may be identified, for example, as fingerprints for malware or viruses, and may be blocked from further encoding or transmission, or certain sourceblocks or combinations of sourceblocks may be restricted to encoding on some nodes of the network, but not others. The decoder works in a similar manner. The decoder 3850 receives encoded data, implements any behaviors required by the behavior appendix 3831 such as limit checking, network policies, data prioritization, permissions, etc., as decodes it into decoded data using the codebook 3830 resulting in data identical to the unencoded data received by the encoder 3840. For example, as data is decoded, the decoder may check the behavior appendix for each sourceblock within the data to determine whether that sourceblock (or a combination of sourceblocks) violates any network rules. As a couple of non-limiting examples, certain sourceblocks may be identified, for example, as fingerprints for malware or viruses, and may be blocked from further decoding or transmission, or certain sourceblocks or combinations of sourceblocks may be restricted to decoding on some nodes of the network, but not others.

In some embodiments, artificial intelligence or machine learning algorithms might be used to develop or generate the behavioral appendix 3831. For example, the training data might be processed through a machine learning algorithm trained (on a different set of training data) to identify certain characteristics within the training data such as unusual numbers of repetitions of certain bit patterns, unusual amounts of gaps in the data (e.g., large numbers of zeros), or even unusual amounts of randomness, each of which might indicate a problem with the data such as missing or corrupted data, possible malware, possible encryption, etc. As the training data is processed, the mapping and transform appendix 3831 is generated by the machine learning algorithm based on the identified characteristics. As a couple of non-limiting examples, the machine learning algorithm might generate a behavior appendix 3831 in which certain sourceblocks are identified, for example, as fingerprints for malware or viruses, and are blocked from further decoding or transmission, or in which certain sourceblocks or combinations of sourceblocks are restricted to decoding on some nodes of the network, but not others.

Figure 39:
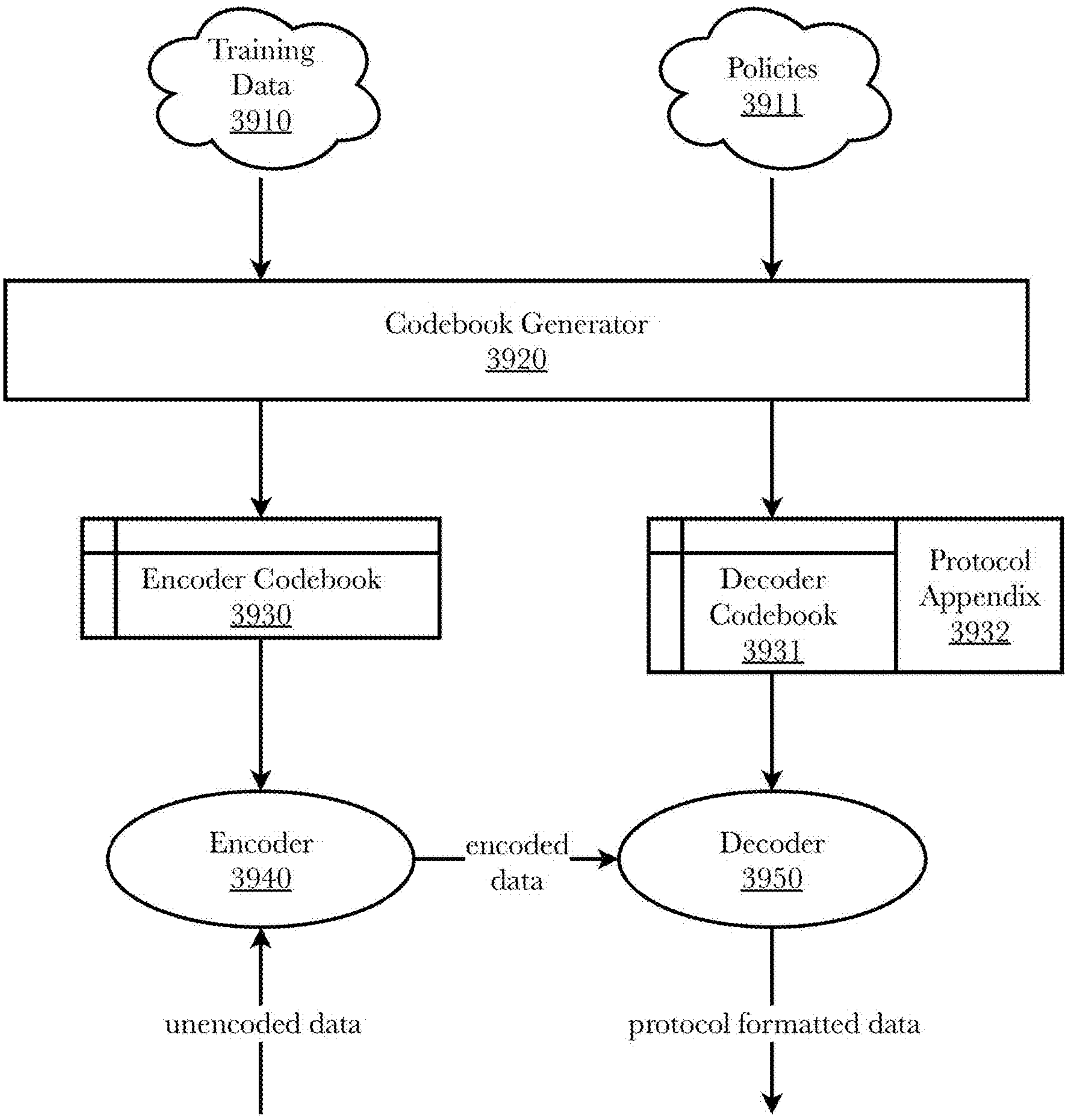
FIG. 39 shows an exemplary encoding/decoding configuration with extended functionality suitable for generating protocol formatted data at the decoder derived from data arriving at the encoder.

FIG. 39 shows an encoding/decoding configuration with extended functionality suitable for generating protocol formatted data at the decoder derived from data arriving at the encoder. In this configuration, protocol formatting policies 3911 are combined with the training data 3910 fed into the codebook generator. The codebook generator 3920 creates a codebook 3930 from the training data. The codebook 3930 is sent to the encoder 3940 which receives unencoded data, encodes it into codewords using the codebook 3930, and sends encoded data in the form of codewords to the decoder 3950. In this configuration, however, the codebook generator 3920 also creates a protocol appendix 3931 which it appends to the copy of the codebook 3930 sent to the decoder. The appendix 3931 may be a separate file or document, or may be integrated into the codebook 3930, such as in the form of bit extensions appended to each sourceblock in the codebook 3930 or an additional dimensional array to the codebook 3930 which provides instructions as to protocol formatting.

The decoder 3950 receives the encoded data in the form of codewords, decodes it using the same codebook 3930 (which may be a different copy of the codebook in some configurations), and but instead of outputting decoded data which is identical to the unencoded data received by the encoder 3940, the decoder converts the decoded data according to the protocol appendix, converting the decoded data into a protocol formatted data output. As a simple example of the operation of this configuration, the unencoded data received by the encoder 3940 might be a data to be transferred over a TCP/IP connection, and the decoded and transformed data output by the decoder based on the protocol appendix 3931 might be the data formatted according to the TCP/IP protocol.

In some embodiments, artificial intelligence or machine learning algorithms might be used to develop or generate the protocol policies. For example, the training data might be processed through a machine learning algorithm trained (on a different set of training data) to identify certain characteristics within the training data such as types of files or portions of data that are typically sent to a particular port on a particular node of a network, etc. As the training data is processed, the protocol appendix 3931 is generated by the machine learning algorithm based on the identified characteristics. In this example, the output of the decoder might be the unencoded data formatted according to the TCP/IP protocol in which the TCP/IP destination is changed based on the contents of the data or portions of the data (e.g., portions of data of one type are sent to one port on a node and portions of data of a different type are sent to a different port on the same node). In some embodiments, direct encryption (e.g., SSL) might be used to further protect the encoded data during transmission.

Figure 40:
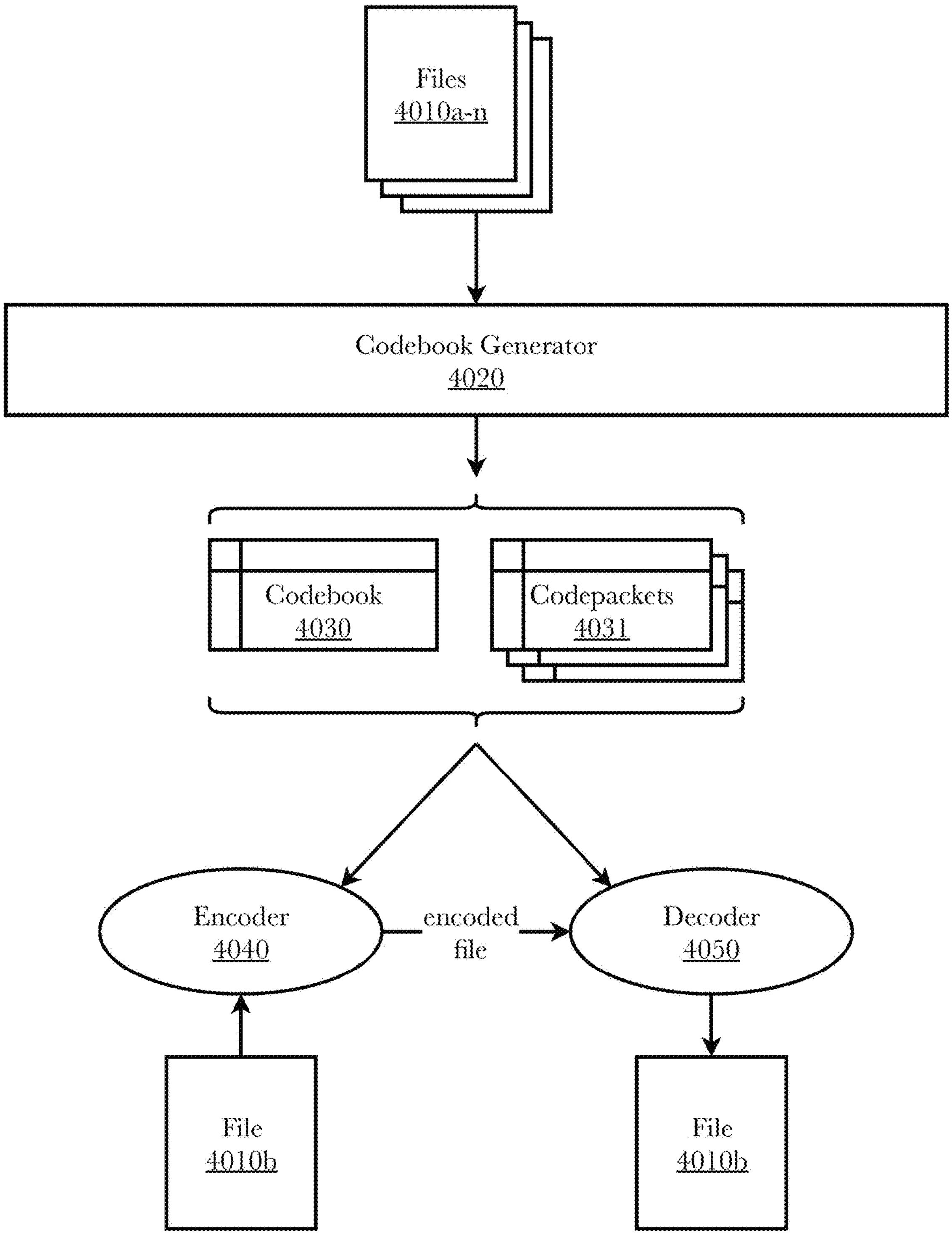
FIG. 40 shows an exemplary encoding/decoding configuration with extended functionality suitable for file-based encoding/decoding.

FIG. 40 shows an exemplary encoding/decoding configuration with extended functionality suitable for file-based encoding/decoding. In this configuration, training data in the form of a set of files 4010 is fed to a codebook generator 4020, which generates a codebook based on the files 4010. The codebook may comprise a single codebook 4030 generated from all of the files, or a set of smaller codebooks called codepackets 4031, each codepacket 4031 being generated from one of the files, or a combination of both. The codebook 4030 and/or codepackets 4031 are sent to both an encoder 4040 and a decoder 4050 which may be on the same computer or on different computers, depending on the configuration. The encoder 4040 receives a file, encodes it into codewords using the codebook 4030 or one of the codepackets 4031, and sends encoded file in the form of codewords to the decoder 4050. The decoder 4050 receives the encoded file in the form of codewords, decodes it using the same codebook 4030 (which may be a different copy of the codebook in some configurations), and outputs a decoded file which is identical to the unencoded data received by the encoder 4040. Any codebook miss (a codeword that can't be found either in the codebook 4030 or the relevant codepacket 4031) that occurs during decoding indicates that the file 4011 has been changed between encoding and decoding, thus providing the file-based encoding/decoding with inherent protection against changes.

Figure 41:
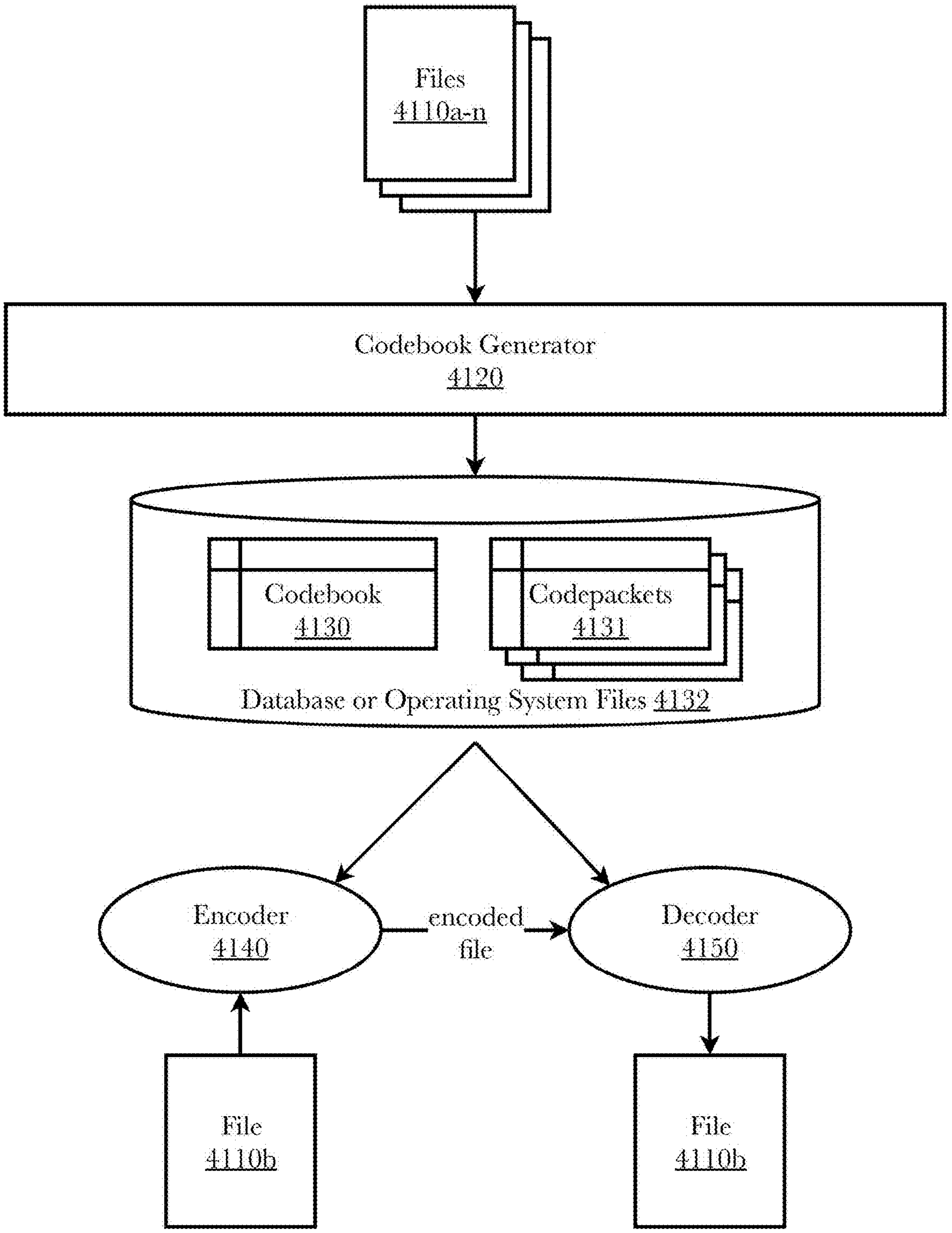
FIG. 41 shows an exemplary encoding/decoding configuration with extended functionality suitable for file-based encoding/decoding or operating system files.

FIG. 41 shows an exemplary encoding/decoding configuration with extended functionality suitable for file-based encoding/decoding or operating system files. File-based encoding/decoding of operating system files is a variant of the file-based encoding/decoding configuration described above. In file-based encoding/decoding of operating systems, one or more operating system files 4010*a-n* are used to create a codebook 4030 or a set of smaller files called codepackets 4031, each codepacket 4031 being created from a particular operating system file. Encoding and decoding of those same operating system files 4110*a-n* would be performed using the codebook 4130 or codepackets 4131 created from the operating system files 4110*a-n*. Consequently, encoding and decoding would be expected to produce no encoding misses (i.e., all possible sourceblocks of an operating system file to be encoded would be as sourceblocks in the codebook 4130 or the codepacket 4131 corresponding to the operating system file). A miss during encoding would indicate that the operating system file is either not one of those used to generate the codebook 4130 or has been changed. A miss during decoding (assuming that the operating system file encoded without a miss) will be flagged as an indication the operating system file has been changed between encoding and decoding. Access to operating system files would be required to pass through the encoding/decoding process, thus protecting operating system files from tampering.

In this configuration, training data in the form of a set of operating system files 4110 is fed to a codebook generator 4120, which generates a codebook based on the operating system files 4110. The codebook may comprise a single codebook 4130 generated from all of the operating system files, or a set of smaller codebooks called codepackets 4131, each codepacket 4131 being generated from one of the operating system files, or a combination of both. The codebook 4130 and/or codepackets 4131 are sent to both an encoder 4141 and a decoder 4150 which may be on the same computer or on different computers, depending on the configuration. The encoder 4141 receives an operating system file 4110*b* from the set of operating system files 4110*a-n* used to generate the codebook 4130, encodes it into codewords using the codebook 4130 or one of the codepackets 4131, and sends encoded operating system file 4110*b* in the form of codewords to the decoder 4150. The decoder 4150 receives the encoded operating system file 4110*b* in the form of codewords, decodes it using the same codebook 4130 (which may be a different copy of the codebook in some configurations), and outputs a decoded operating system file 4110*b* which is identical to the unencoded operating system file 4110*b* received by the encoder 4141. Any codebook miss (a codeword that can't be found either in the codebook 4130 or the relevant codepacket 4131) that occurs during decoding indicates that the operating system file 4110*b* has been changed between encoding and decoding, thus providing the operating system file-based encoding/decoding with inherent protection against changes.

Figure 42:
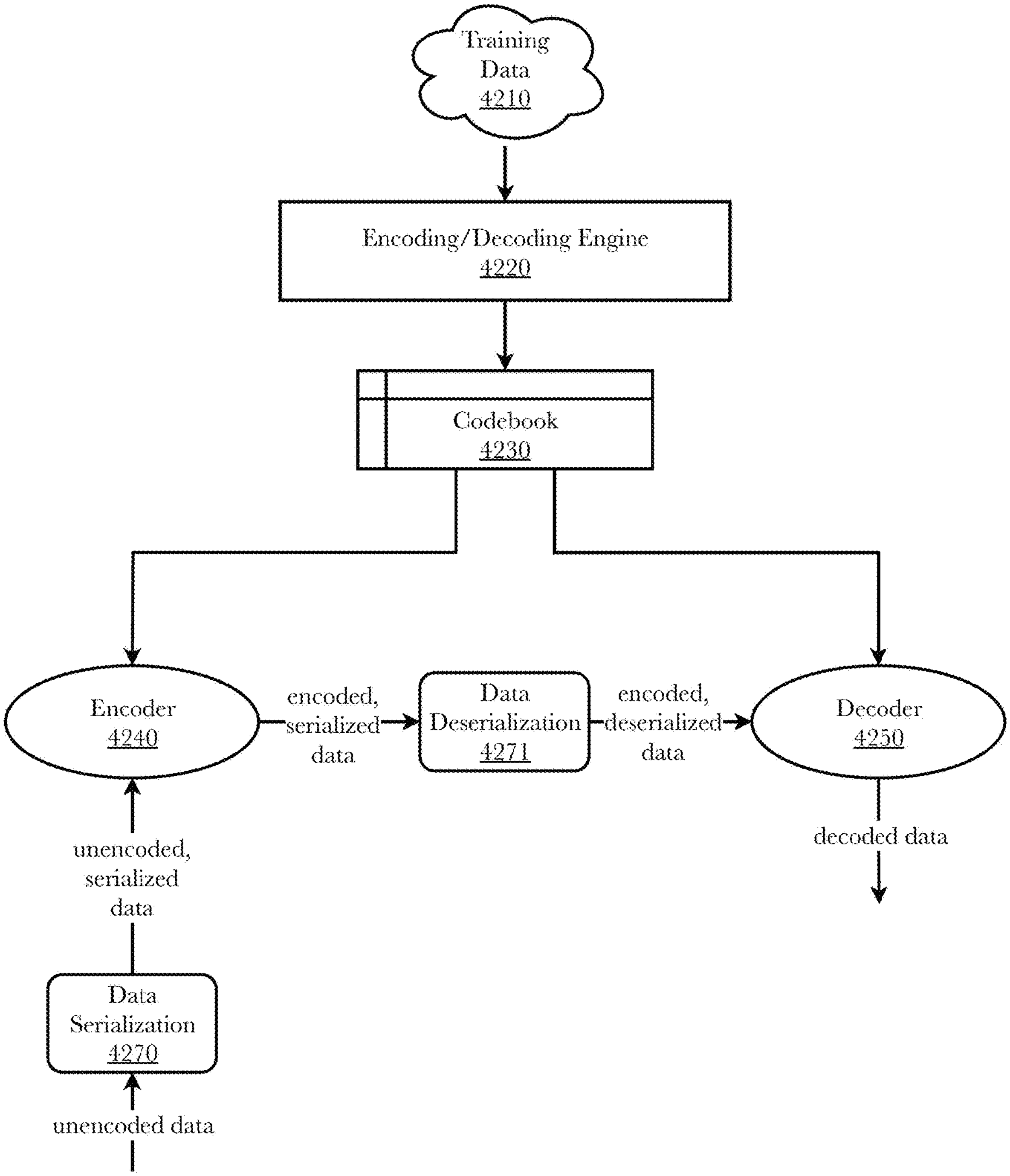
FIG. 42 shows an exemplary encoding/decoding configuration with data serialization and deserialization.

FIG. 42 shows an exemplary encoding/decoding configuration with data serialization and deserialization. In this embodiment, training data 4210 is fed to a codebook generator 4220, which generates a codebook based on the training data. The codebook 4230 is sent to both an encoder 4240 and a decoder 4250 which may be on the same computer or on different computers, depending on the configuration. Unencoded data is sent to a data serializer 4270, which serializes the data according to a serialization protocol (e.g., BeBop, Google Protocol Buffers, MessagePack) to create a wrapper or connector for the unencoded data. The encoder 4240 receives unencoded, serialized data, encodes it into codewords using the codebook 4230, and sends the encoded, serialized data to a destination, at which destination the data is received by a data deserializer 4271 which deserializes the data using the same serialization protocol as was used to serialize the data, and the encoded, deserialized data is then to a decoder 4250, which receives the encoded, unserialized data in the form of codewords, decodes it using the same codebook 4230 (which may be a different copy of the codebook in some configurations), and outputs decoded data which is identical to the unencoded data received by the encoder 4240.

The combination of data compression with data serialization can be used to maximize compression and data transfer with extremely low latency and no loss. For example, a wrapper or connector may be constructed using certain serialization protocols (e.g., BeBop, Google Protocol Buffers, MessagePack). The idea is to use known, deterministic file structure (schemes, grammars, etc.) to reduce data size first via token abbreviation and serialization, and then to use the data compression methods described herein to take advantage of stochastic/statistical structure by training it on the output of serialization. The encoding process can be summarized as: serialization-encode→compress-encode, and the decoding process would be the reverse: compress-decode→serialization-decode. The deterministic file structure could be automatically discovered or encoded by the user manually as a scheme/grammar. Another benefit of serialization in addition to those listed above is deeper obfuscation of data, further hardening the cryptographic benefits of encoding using codebooks.

Figure 47:
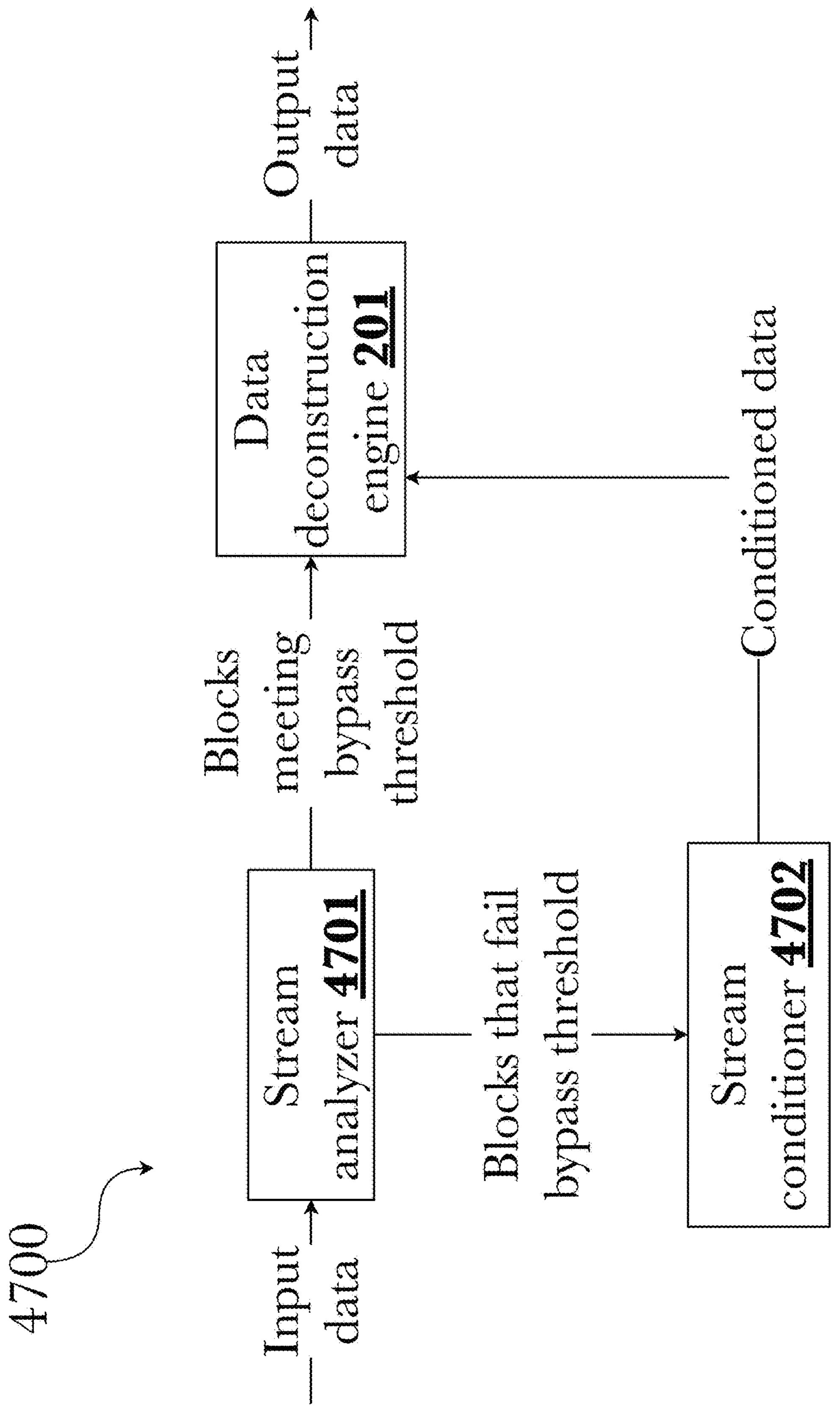
FIG. 47 is a block diagram illustrating an exemplary system architecture for combining data compression with encryption using split-stream processing.

FIG. 47 is a block diagram illustrating an exemplary system architecture 4700 for combining data compression with encryption using split-stream processing. According to the embodiment, an incoming data stream can be compressed and encrypted simultaneously through the use of split-stream processing, wherein the data stream is broken into blocks that are compared against the stream as a whole to determine their frequency (i.e., their probability distribution within the data stream). Huffman coding works provably ideally when the elements being encoded have dyadic probabilities, that is probabilities that are all of the form 1/(2); in actual practice, not all data blocks will have a dyadic probability, and thus the efficiency of Huffman coding decreases. To improve efficiency while also providing encryption of the data stream, those blocks that have non-dyadic probability may be identified and replaced with other blocks, effectively shuffling the data blocks until all blocks present in the output stream have dyadic probability by using some blocks more frequently and others less frequently to "adjust" their probability within the output stream. For purposes of reconstruction, a second error stream is produced that contains the modifications made, so that the recipient need only compare the error stream against the received data stream to reverse the process and restore the data.

A stream analyzer 4701 receives an input data stream and analyzes it to determine the frequency of each unique data block within the stream. A bypass threshold may be used to determine whether the data stream deviates sufficiently from an idealized value (for example, in a hypothetical data stream with all-dyadic data block probabilities), and if this threshold is met the data stream may be sent directly to a data deconstruction engine 201 for deconstruction into codewords as described below in greater detail (with reference to FIG. 2). If the bypass threshold is not met, the data stream is instead sent to a stream conditioner 4702 for conditioning. Stream conditioner 4702 receives a data stream from stream analyzer 4701 when the bypass threshold is not met, and handles the encryption process of swapping data blocks to arrive at a more-ideal data stream with a higher occurrence of dyadic probabilities; this facilitates both encryption of the data and greater compression efficiency by improving the performance of the Huffman coding employed by data deconstruction engine 201. To achieve this, each data block in the data stream is checked against a conditioning threshold using the algorithm $|(P_1-P_2)|>T_C$, where $P_1$ is the actual probability of the data block, $P_2$ is the ideal probability of the block (generally, the nearest dyadic probability), and $T_C$ is the conditioning threshold value. If the threshold value is exceeded (that is, the data block's real probability is "too far" from the nearest ideal probability), a conditioning rule is applied to the data block. After conditioning, a logical XOR operation may be applied to the conditioned data block against the original data block, and the result (that is, the difference between the original and conditioned data) is appended to an error stream. The conditioned data stream (containing both conditioned and unconditioned blocks that did not meet the threshold) and the error stream are then sent to the data deconstruction engine 201 to be compressed, as described below in FIG. 2.

To condition a data block, a variety of approaches may be used according to a particular setup or desired encryption goal. One such exemplary technique may be to selectively replace or "shuffle" data blocks based on their real probability as compared to an idealized probability: if the block occurs less-frequently than desired or anticipated, it may be added to a list of "swap blocks" and left in place in the data stream; if a data block occurs more frequently than desired, it is replaced with a random block from the swap block list. This increases the frequency of blocks that were originally "too low", and decreases it for those that were originally "too high", bringing the data stream closer in line with the idealized probability and thereby improving compression efficiency while simultaneously obfuscating the data. Another approach may be to simply replace too-frequent data blocks with any random data block from the original data stream, eliminating the need for a separate list of swap blocks, and leaving any too-low data blocks unmodified. This approach does not necessarily increase the probability of blocks that were originally too-low (apart from any that may be randomly selected to replace a block that was too-high), but it may improve system performance due to the elimination of the swap block list and associated operations.

It should be appreciated that both the bypass and conditioning thresholds used may vary, for example, one or both may be a manually-configured value set by a system operator, a stored value retrieved from a database as part of an initial configuration, or a value that may be adjusted on-the-fly as the system adjusts to operating conditions and live data.

Figure 48:
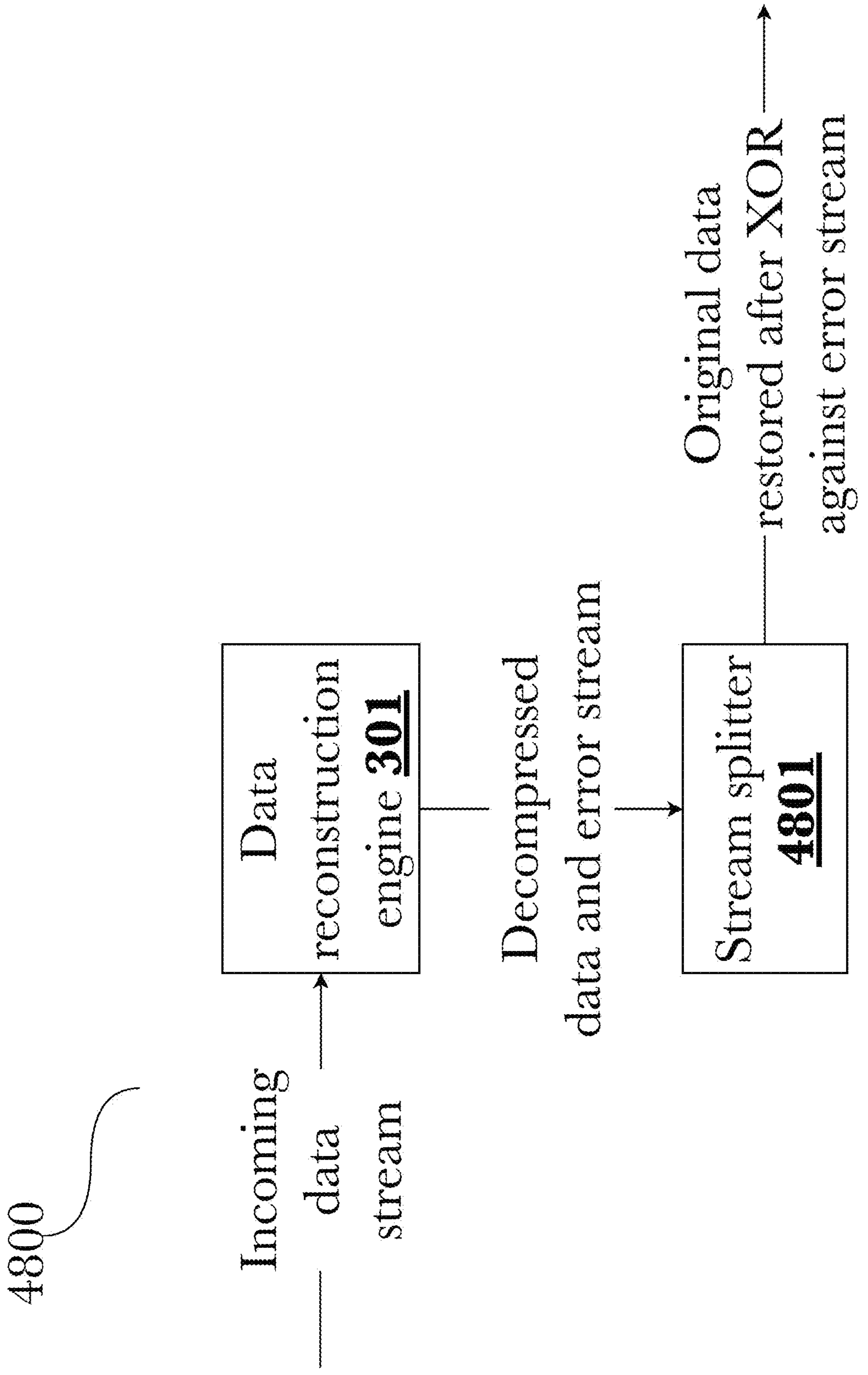
FIG. 48 is a block diagram illustrating an exemplary system architecture for decompressing and decrypting incoming data that was processed using split-stream processing.

FIG. 48 is a block diagram illustrating an exemplary system architecture 4800 for decompressing and decrypting incoming data that was processed using split-stream processing. To decompress and decrypt received data, a data reconstruction engine 301 may first be used to reverse the compression on a data stream as described below in FIG. 3, passing the decompressed (but still encrypted) data to a stream splitter 4801. The corresponding error stream may be separated from the data stream (for example, the two streams may have been combined during compression but during decompression they are separated) or it may be received independently as a second data stream. Stream splitter 4801 applies XOR logical operations to each data block according to the error stream, reversing the original block conditioning process and restoring the original data on a block-by-block basis.

Figure 49:
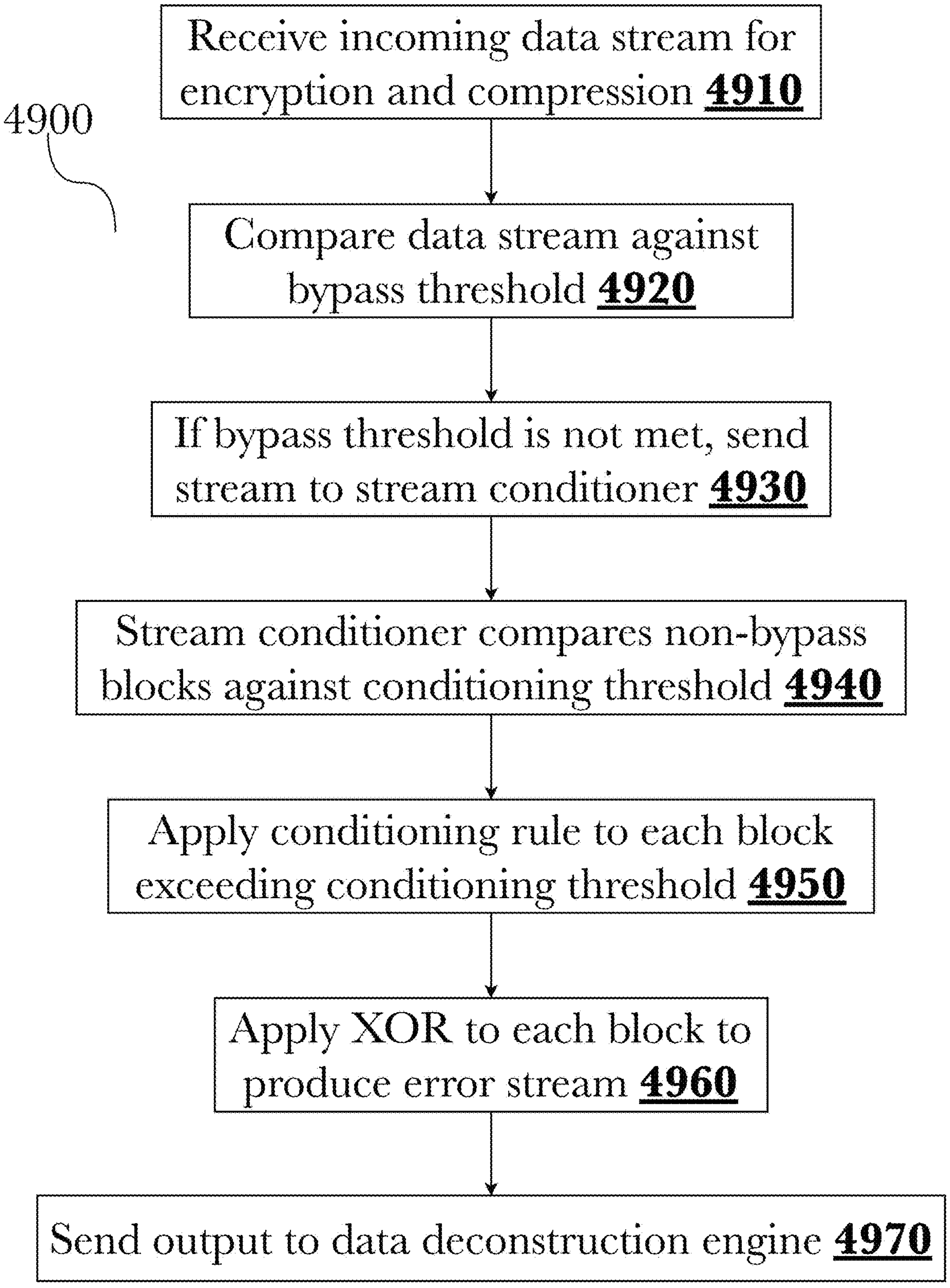
FIG. 49 is a flow diagram illustrating an exemplary method for compressing and encrypting data using split-stream processing.

FIG. 49 is a flow diagram illustrating an exemplary method 4900 for compressing and encrypting data using split-stream processing. In an initial step 4910, a data stream is received for compression and encryption. Each block in the data stream may be compared against a bypass threshold 4920 to determine whether the stream should be conditioned, and if so the stream is then passed 4930 to a stream conditioner 4702. The stream conditioner 4702 then compares each block 4940 against a conditioning threshold based on the block's actual vs. ideal frequency, and those blocks that exceed the threshold have a conditioning rule applied 4950. Each block may then be processed using an XOR logical operation 4960, and the output appended to an error stream that correspond to the difference between the original data and the conditioned data. The conditioned data and the error stream are then sent as output 4970 for compression as described in further detail below, with reference to at least FIG. 10.

Figure 50:
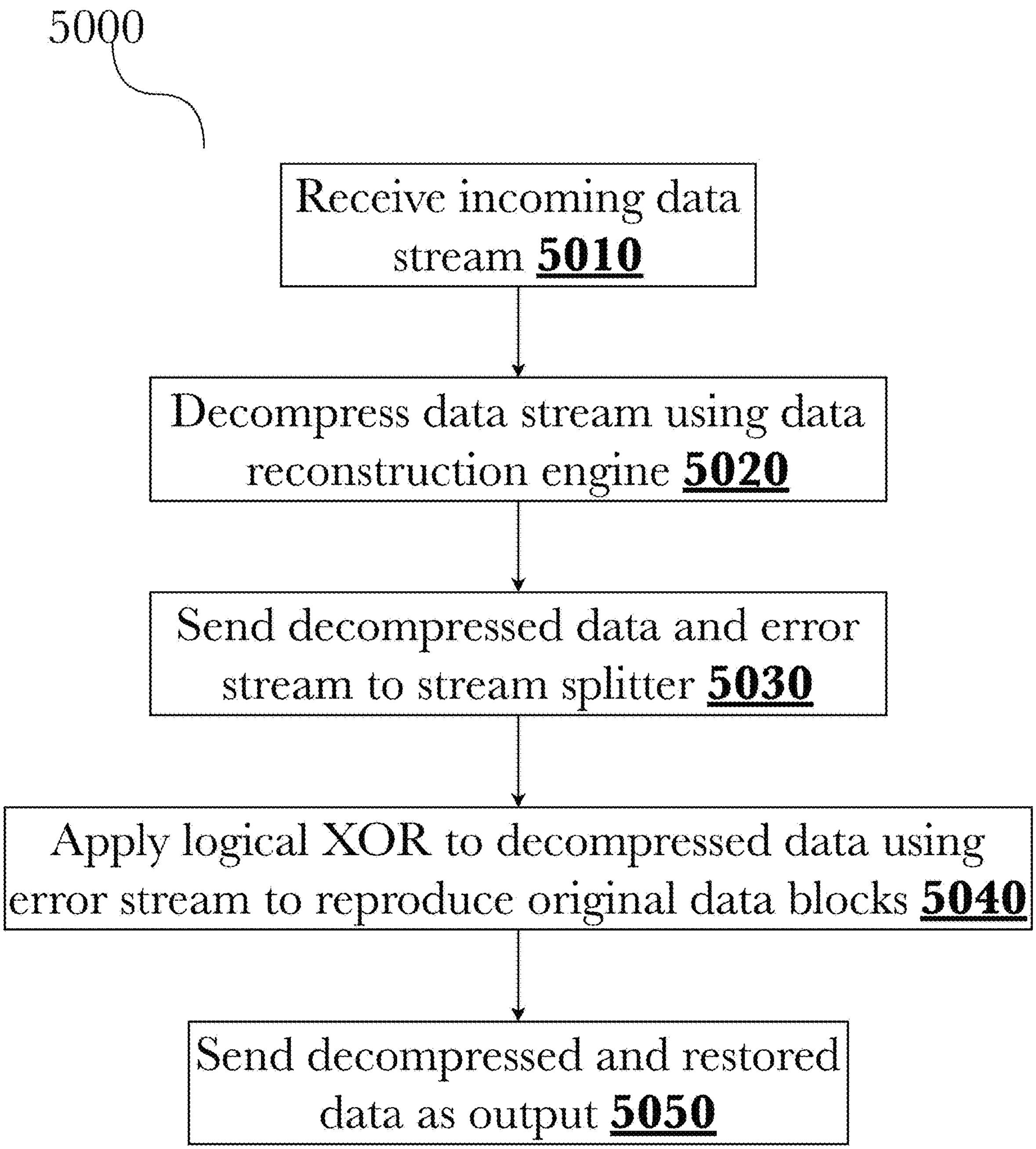
FIG. 50 is a flow diagram illustrating an exemplary method for decrypting and decompressing split-stream data.

FIG. 50 is a flow diagram illustrating an exemplary method 5000 for decrypting and decompressing split-stream data. In an initial step 5010, a data stream is received at a data decompression engine 301. The data stream is decompressed 5020 by reversing the encoding as described below with reference to FIG. 11, and the decompressed (but still encrypted) data and error stream are passed 5030 to a stream splitter 4801. The stream splitter performs logical XOR operations on each data block 5040 using the error stream, reversing any conditioning done to each data block, producing the original data as output 5050.

Figure 51:
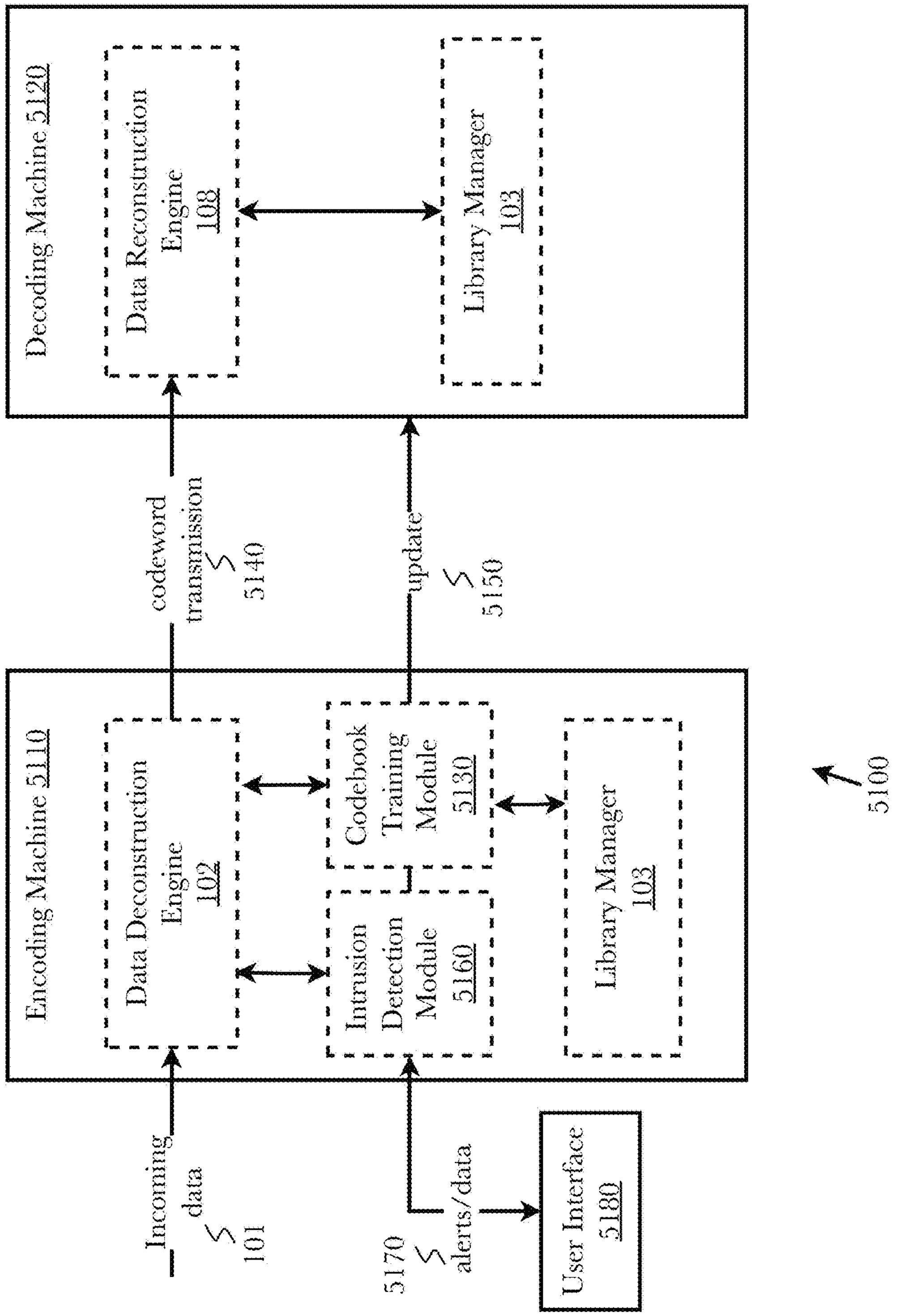
FIG. 51 is a block diagram illustrating an exemplary architecture for a data compression and intrusion detection system, according to an embodiment.

FIG. 51 is a block diagram illustrating an exemplary architecture for a data compression and intrusion detection system, according to an embodiment. According to this embodiment, two separate machines may be used for encoding 5110 and decoding 5120. Much like in FIG. 1, incoming data 101 to be deconstructed is sent to a data deconstruction engine 102 residing on encoding machine 5110, which may attempt to deconstruct the data and turn it into a collection of codewords using a library manager 103. Codewords may be transmitted 5140 to a data reconstruction engine 108 residing on decoding machine 5120, which may reconstruct the original data from the codewords, using a library manager 103. However, according to this embodiment, a codebook training module 5130 is present on the encoding machine 5110, communicating in-between a library manager 103 and a deconstruction engine 102. Additionally, an intrusion detection module 5160 is present on the encoding machine 5110, communicating in-between a user interface 5180 and a data deconstruction engine 102. According to other embodiments, codebook training module 5130 may reside instead on decoding machine 5120 if the machine has enough computing resources available; which machine the module 5130 is located on may depend on the system user's architecture and network structure. Codebook training module 5130 may send requests for data to the data reconstruction engine 108, which routes incoming data 101 to codebook training module 5130. Codebook training module 5130 may perform analyses on the requested data in order to gather information about the distribution of incoming data 101 as well as monitor the encoding/decoding model performance. Additionally, codebook training module 5130 may also request and receive device data to supervise network connected devices and their processes and, according to some embodiments, to allocate training resources when requested by devices running the encoding system. Devices may include, but are not limited to, encoding and decoding machines, training machines, sensors, mobile computing devices, and Internet-of-things ("IoT") devices. Based on the results of the analyses, the codebook training module 5130 may create a new training dataset from a subset of the requested data in order to counteract the effects of data drift on the encoding/decoding models, and then publish updated 5150 codebooks to both the encoding machine 5110 and decoding machine 5120.

According to the embodiment, intrusion detection module 5160 may receive, retrieve, or otherwise obtain a codeword data stream, such as the data stream associated with codeword transmission 5140, and to perform analyses on the codeword data stream in order to determine if an unusual distribution of codewords has occurred (i.e., anomalous behavior), and if anomalous behavior is detected to categorize the behavior as data intrusion or from some other cause. In either case, the anomalous behavior may be recorded for further analysis and auditing, and an alert may be sent 5170 to user interface 5180 wherein a user can view and interact and configure system 5100 components. For compression to be used for the purpose of detecting intrusions, on-the-fly-builds of codebooks may be used to ensure that accurate, stable levels of compression can be measured for a specific device(s) on a specific platform. The codebook training module 5130 can enable a local device or server to build and provision new dynamic codebooks as needed on the basis of changing conditions, such as weather, changes to hardware or software, and other conditions.

Intrusion detection module 5160 is configured for unusual distribution detection ("UDD") capability for the detection of a potential intrusion. Intrusion detection module 5160 can detect a UDD in a codeword data stream and identify a likely reason for a detected unusual compression ratio such as, for example, a source other than a likely intrusion such as a device error, a corrupted codebook, an environment change, or a likely intrusion. Because intrusion detection depends on highly localized monitoring of deviation from expected an expected compression ratio, dynamic codebooks provide a useful tool for intrusion detection for a few reasons. First, the codebook training module 5130 will enable fully automated local builds and provisioning of codebooks. This capability will enable new local deployments of the system 5100 for purposes of UDD quickly and with as little human intervention as possible. Codebook training module 5130 provides a practical approach to deploying the system for intrusion detection on a large scale with relative ease. Second, the dynamic codebooks will also enable local users operating hardware or software with communication capabilities to adapt the system for their use simply and easily. For example, a squadron of aircraft operating in an arctic environment may have different equipment than the same aircraft operating in a tropical environment, or the same equipment may generate data from certain equipment that is significantly different, such as ambient temperature. The same logic applies to situations in which changes in hardware, software, and environmental conditions have affected the content of machine files generated for transmission, automating the process of adapting to these changes.

Codebook training module 5130 provides a practical approach to both scale deployments of the system and to rapidly updating codebooks in existing system deployments, whether as a response to an intrusion or as an update in response to a reduction in compression ratio resulting from another source.

The user interface 5180 may be configured to display a variety of information related to, but not necessarily limited to, device and system compression levels, intrusion detection information and alerting, user selected risk sensitivity settings, controls related to the codebook training module 5130 (e.g., user selected threshold levels, test and training dataset size, etc.) and intrusion detection module 5160 (e.g., risk sensitivity threshold, divergence quantities, compression ratio limits, etc.), and/or the like.

Figure 52:
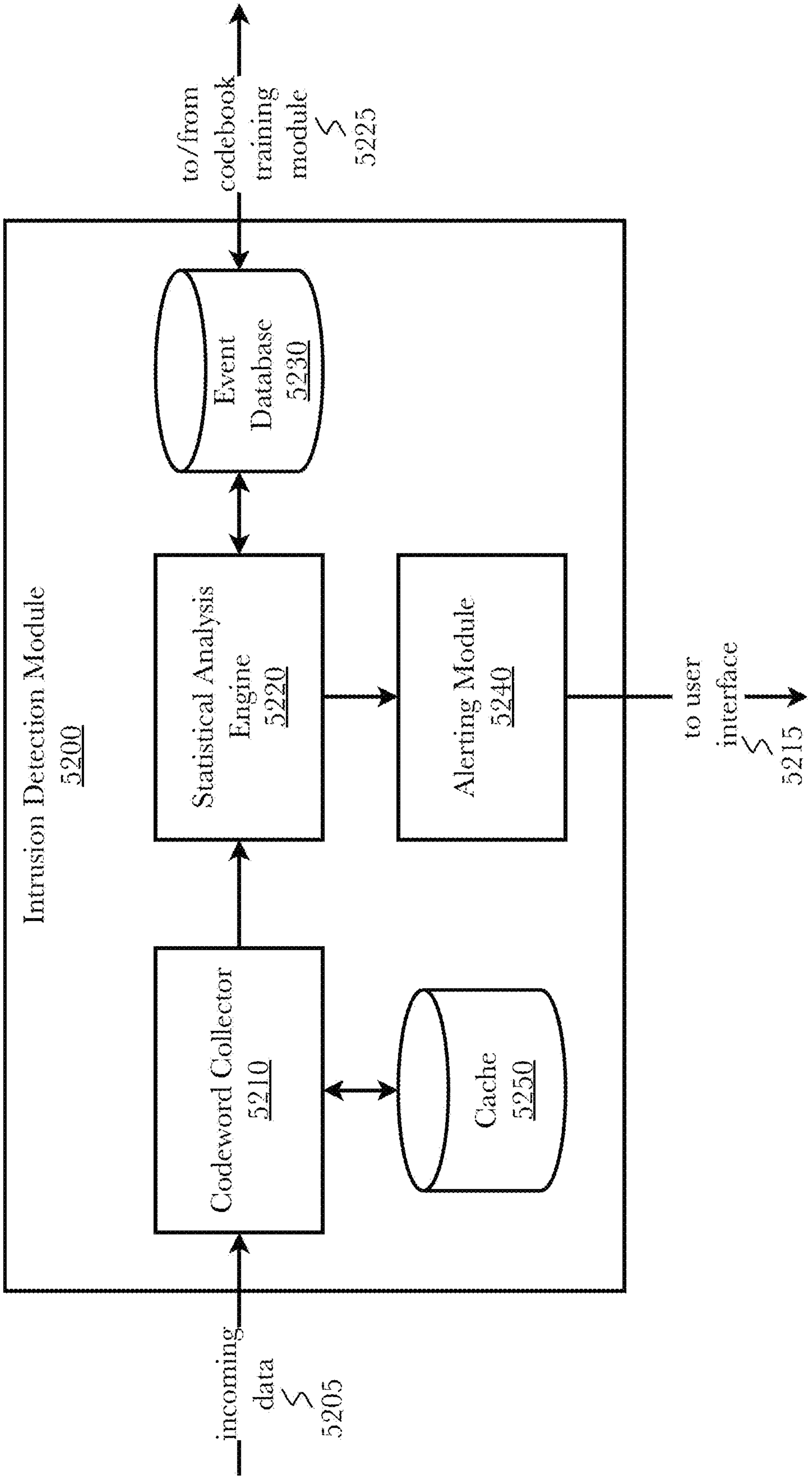
FIG. 52 is a block diagram illustrating an exemplary architecture for an aspect of a system for data compression with intrusion detection, an intrusion detection module.

FIG. 52 is a block diagram illustrating an exemplary architecture for an aspect of a system for data compression with intrusion detection, an intrusion detection module. According to the embodiment, a codeword collector 5210 is present which may send request for incoming codewords 5205 to a data deconstruction engine 102 where it may be received by codeword collector 5210. In some implementations, codeword collector 5210 need not necessarily request incoming codewords, but may be retrieved or otherwise obtained from data deconstruction engine 102. Data deconstruction engine 102 may send a codeword data stream to decoding machine 5120 and codeword collector 5210 may obtain this codeword data stream in real-time and send each code of the plurality of codewords in the data stream to statistical analysis engine 5220. Codeword collector 5210 may also send codewords for temporary storage in a cache 5250.

According to the embodiment, statistical analysis engine 5220 is configured to use advanced statistical methods to establish whether a detected UDD is likely to be a result of an intrusion or some other cause. Statistical analysis engine 5220 may compute the probability distribution of the codeword data stream and compare that computed value to a reference probability distribution (i.e., a reference codebook) in order to calculate the divergence between the two sets of probability distributions, and use the calculated divergence to make a determination on whether an unusual distribution is due to an intrusion or some other cause. The reference codebook may be created by codebook training module 5130 and sent 5225 to intrusion detection module 5200 to be used for comparison tasks. Best-practice probability distribution algorithms such as Kullback-Leibler divergence, adaptive windowing, and Jensen-Shannon divergence may be used to compute the probability distribution of the received codeword data stream. In some implementations, the basis of intrusion detection module's 5200 analysis may be Kullback-Leibler divergence (also called KL divergence, or relative entropy), which is a type of statistical distance, to determine a measure of how an observed probability distribution P based on data generated in the "real-world" is different, or diverges in statistical terms, from a second reference probability distribution Q. In an embodiment, a large sample set of approximately independent and identically distributed ("iid") symbols will act as sourceblocks to be used as a reference probability distribution "training" set to be used by codebook training module 5130 to build reference codebooks to be used as Q. The probability distribution of live data in a short window of time provides P. Data which precisely matches the training data distribution will have a KL-divergence of 0, which is observable at a compression ratio at or close to the expected ratio as measured during training. Data which deviates significantly from the training data distribution, i.e., an anomalous event, is observable as an unusual compression ratio, since this ratio is lower-bounded by and closely estimates the KL-divergence between P and Q. The compression/encoding techniques disclosed herein are highly stable and provide a highly stable data stream (of codewords) for monitoring. A UDD, consequently, can be detected easily and quickly. UDDs may include, but are not limited to: an out of tolerance compression ratio, such as 70% compression rising in some specified timeframe to 90%; out of tolerance compression ratio, low, such as 70% compression falling in some specified timeframe to 50%; and a suspiciously stable compression ration over a selectable timeframe. The timeframe in these and other scenarios may be configured by a system user to suit their individual or enterprise goals. Likewise, a risk sensitivity threshold may be configured by a system user to suit their use cases and personal level of assumed risk.

KL-divergence is a well-established methodology for determining the expected excess surprise from using the probability Q, when the actual distribution is P. As implemented by the data compression and intrusion detection system 5100, the codebook generated by approximate iid sample data will be used as a model for Q, and for the live data the actual distribution is P, the codebook generated from the live data. A UDD event may be indicated when P exceeds the expected excess surprise. Although KL-divergence is a distance between two probability distributions, it is not a metric and is not symmetric in comparing probability distributions. This is a distinct difference of KL-divergence/relative entropy compared measurements of variation. It is a type of divergence, better characterized as a generalization of squared distance. It is a consequence of Shannon's Source Coding Theorem that the optimal coding (read: compression) rate of data is its entropy rate, and that this is achievable asymptotically. The design of the disclosed compression/encoding protocol ensures that the compression ratio indeed comes quite close to this theoretical limit when the data being encoded is identically distributed to the training data. A deeper consequence of the Source Coding Theorem is that, if an ideal entropy coding method, trained on data with distribution Q, is used to encode data that actually has probability distribution P, the degradation in compression will be the KL-divergence between P and Q. Therefore, the data whose probability distribution deviates from the training data will be compressed by the system 5100 at a rate exceeding the training data's entropy rate by the same amount.

Conversely, if data resembles the training data more so than would be expected for live data with all its natural variability, this is detectable as an unusually low compression ratio, because the actual compression rate will also have some natural level of variability resulting from transient deviations from the probability distribution of training data.

As a third tool for detecting anomalies, if data of any amount of deviation from training data in distribution shows an unusually stable compression ratio, this is a possible indicator of synthetic data being injected to obscure a possible intrusion/attack.

In various implementations, during codebook training and testing, statistical analysis engine 5220 can assess the expected compression ratio μ after verifying that sufficient data is available to obtain a reliable measurement, and also to estimate the variance σ in the compression ratio the system can expect to observe. During live data observation, statistical analysis engine 5220 can produce a data stream of current compression ratio, a temporally local measurement of the ratio between the bit rate of compressed data and the input raw data, using a windowed moving average, an Exponentially Weighted Moving Average ("EWMA"), or similar, according to various implementations. This numerical stream $X_t$ will then be subtracted from u to obtain a current deviation from expected ratio, and the number of standard deviations from the mean, $$z_t = \frac{(x_t - \mu)}{\sigma},$$

fed to the alerting module 5240. In some implementations, as a default setting, it may be assumed that $X_t$ has a normal distribution, so that a system user can set a risk tolerance level for $z_t$ equal to $2\Phi(-|Z|)$, where $\Phi$ is the standard normal cumulative distribution function. For example, a highly risk-averse user can ask for alerting if a null-hypothesis event occurs at or above a p-value of 5%, entailing a report when $|z_t| \geq 2$. This quantity can easily be adjusted to accommodate multiple independent data feeds as well.

According to various embodiments, intrusion detection module 5200 can be configured to analytically compute the probability distribution of this quantity z under the assumption that the input data is a true iid symbol stream. Then, using the resulting parametrized family of distributions $\{f_\theta:\theta\in\Omega\}$, not only will $\sigma$ be calculated during the training and testing phase, but an empirical distribution function of $z_t$ will be computed, and from it, the most likely parameter choice $\theta$ and corresponding distribution $f_\theta$ will be learned. This can enable the system to estimate the probability p that an observed deviation from the mean would be observed under null-hypothesis conditions (i.e., no intrusion or unusual state), which will trigger an alert when p exceeds a user-determined risk tolerance threshold. Since this method eschews the assumption of normality in the time series $X_t$, it can provide an even more accurate and sensitive UDD mechanism.

When $X_t$ exceeds the threshold in the positive direction, alerting module 5240 can generate an alert to the effect that an unusual data distribution has been observed can be recorded/transmitted, indicating a possible intrusion or interruption. Anomalous event data may be stored in an event database 5230, the anomalous event data comprising the computed divergence, the computed probability distribution, and the codeword. Alerting module 5240 is further configured to send the generated alerts to a user interface 5215 as well as other information and statistics about the codeword data stream and the probability distribution and compression ratios for devices and systems, and/or the like. When $X_t$ falls below the threshold (i.e., $z_t$ is sufficiently negative), an alert is generated to the effect that a possible "replay attack" is observed, wherein training data is injected into the system whose output data is being compressed instead of the expected real data feed. Furthermore, the variance in $X_t$ will also be monitored in a recent temporal window, and excessive stability or volatility will be reported as these can also indicate possible attacks with synthetic data injection.

Gaining access to a network via intrusion, once achieved by an attacker, provides access to an entire system, or at least a large part of a system. An attacker who has achieved access to a codebook by whatever means, however, only has access to information encoded by that codebook. With access to a single codebook, the attacker has no access to information that was encoded by other codebooks. Consequently, the attacker could not, without access to additional codebooks, conduct an attack via any other codebook. Moreover, if malware is encoded in a transmission by a codebook and is detected by the system, and transmissions encoded by that codebook are terminated, the attacker will lose their access immediately to that codebook data stream and will not force the entire data stream encoded by any other codebooks to be terminated. Consequently, disruption based on an intrusion detected by data compression with intrusion detection system will be limited only to the data encoded by the compromised codebook. Finally, upon determination of an intrusion UDD, the compromised codebook can be replaced within minutes by codebook training module 5130 and transmissions resumed.

Key to determining whether an intrusion has occurred, once a UDD has been observed, will be to determine if the UDD was likely an intrusion or the result of some other event. Other potential causes of a UDD include the following: a device error or corrupted codebook, including zero data; a change in environment; and an intrusion/hack.

With respect to a device error, if a UDD is detected, and encoded data is decoded and found to be unreadable, the likely causes are device error or a corrupted codebook. For devices using multiple codebooks, if significant variance of a similar character is simultaneously detected in multiple codebooks in use by that system, the likely cause is a device error. Individual circumstances need to be taken in account, however, since a single gateway may encode data from many sources on a platform, for example, and while one system, such as pressure monitoring, may be faulty and cause a UDD to occur even if other systems are functioning normally. Consequently, in an operational environment, correlation with other systems, such as a fault detection system, may be integrated as a part of an implementation of the intrusion detection system.

With respect to a change in environment, if other devices on the same platform are monitoring a similar event, such as outside air temperature, and several record a UDD simultaneously, a change in environment is a likely cause. Again, correlation with a real-world change seen in the data, such as the temperature readings on multiple devices or systems, could help avoid a false positive for a potential intrusion.

With respect to an intrusion/hack, when using the compression/encoding methods described herein variance tends to be very small, typically in the range of +/−2-3% for most data streams. Significant variance in timeframes of more than a few seconds, or more than one or two encoded messages, is rare, unless there is a major change in device hardware or software. Consequently, if device error/corrupted codebook/environmental change can be eliminated as a cause, an intrusion is a likely source of a UDD.

Description of Method Aspects

Since the library consists of re-usable building source-blocks, and the actual data is represented by reference codes to the library, the total storage space of a single set of data would be much smaller than conventional methods, wherein the data is stored in its entirety. The more data sets that are stored, the larger the library becomes, and the more data can be stored in reference code form.

As an analogy, imagine each data set as a collection of printed books that are only occasionally accessed. The amount of physical shelf space required to store many collections would be quite large, and is analogous to conventional methods of storing every single bit of data in every data set. Consider, however, storing all common elements within and across books in a single library, and storing the books as references codes to those common elements in that library. As a single book is added to the library, it will contain many repetitions of words and phrases. Instead of storing the whole words and phrases, they are added to a library, and given a reference code, and stored as reference codes. At this scale, some space savings may be achieved, but the reference codes will be on the order of the same size as the words themselves. As more books are added to the library, larger phrases, quotations, and other words patterns will become common among the books. The larger the word patterns, the smaller the reference codes will be in relation to them as not all possible word patterns will be used. As entire collections of books are added to the library, sentences, paragraphs, pages, or even whole books will become repetitive. There may be many duplicates of books within a collection and across multiple collections, many references and quotations from one book to another, and much common phraseology within books on particular subjects. If each unique page of a book is stored only once in a common library and given a reference code, then a book of 1,000 pages or more could be stored on a few printed pages as a string of codes referencing the proper full-sized pages in the common library. The physical space taken up by the books would be dramatically reduced. The more collections that are added, the greater the likelihood that phrases, paragraphs, pages, or entire books will already be in the library, and the more information in each collection of books can be stored in reference form. Accessing entire collections of books is then limited not by physical shelf space, but by the ability to reprint and recycle the books as needed for use.

The projected increase in storage capacity using the method herein described is primarily dependent on two factors: 1) the ratio of the number of bits in a block to the number of bits in the reference code, and 2) the amount of repetition in data being stored by the system.

With respect to the first factor, the number of bits used in the reference codes to the sourceblocks must be smaller than the number of bits in the sourceblocks themselves in order for any additional data storage capacity to be obtained. As a simple example, 16-bit sourceblocks would require 216, or 65536, unique reference codes to represent all possible patterns of bits. If all possible 65536 blocks patterns are utilized, then the reference code itself would also need to contain sixteen bits in order to refer to all possible 65,536 blocks patterns. In such case, there would be no storage savings. However, if only 16 of those block patterns are utilized, the reference code can be reduced to 4 bits in size, representing an effective compression of 4 times (16 bits/4 bits=4) versus conventional storage. Using a typical block size of 512 bytes, or 4,096 bits, the number of possible block patterns is 24,096, which for all practical purposes is unlimited. A typical hard drive contains one terabyte (TB) of physical storage capacity, which represents 1,953,125,000, or roughly 231, 512 byte blocks. Assuming that 1 TB of unique 512-byte sourceblocks were contained in the library, and that the reference code would thus need to be 31 bits long, the effective compression ratio for stored data would be on the order of 132 times (4,096/31≈132) that of conventional storage.

With respect to the second factor, in most cases it could be assumed that there would be sufficient repetition within a data set such that, when the data set is broken down into sourceblocks, its size within the library would be smaller than the original data. However, it is conceivable that the initial copy of a data set could require somewhat more storage space than the data stored in a conventional manner, if all or nearly all sourceblocks in that set were unique. For example, assuming that the reference codes are $1/10^{th}$ the size of a full-sized copy, the first copy stored as sourceblocks in the library would need to be 1.1 megabytes (MB), (1 MB for the complete set of full-sized sourceblocks in the library and 0.1 MB for the reference codes). However, since the sourceblocks stored in the library are universal, the more duplicate copies of something you save, the greater efficiency versus conventional storage methods. Conventionally, storing 10 copies of the same data requires 10 times the storage space of a single copy. For example, ten copies of a 1 MB file would take up 10 MB of storage space. However, using the method described herein, only a single full-sized copy is stored, and subsequent copies are stored as reference codes. Each additional copy takes up only a fraction of the space of the full-sized copy. For example, again assuming that the reference codes are $1/10^{th}$ the size of the full-size copy, ten copies of a 1 MB file would take up only 2 MB of space (1 MB for the full-sized copy, and 0.1 MB each for ten sets of reference codes). The larger the library, the more likely that part or all of incoming data will duplicate sourceblocks already existing in the library.

The size of the library could be reduced in a manner similar to storage of data. Where sourceblocks differ from each other only by a certain number of bits, instead of storing a new sourceblock that is very similar to one already existing in the library, the new sourceblock could be represented as a reference code to the existing sourceblock, plus information about which bits in the new block differ from the existing block. For example, in the case where 512 byte sourceblocks are being used, if the system receives a new sourceblock that differs by only one bit from a sourceblock already existing in the library, instead of storing a new 512 byte sourceblock, the new sourceblock could be stored as a reference code to the existing sourceblock, plus a reference to the bit that differs. Storing the new sourceblock as a reference code plus changes would require only a few bytes of physical storage space versus the 512 bytes that a full sourceblock would require. The algorithm could be optimized to store new sourceblocks in this reference code plus changes form unless the changes portion is large enough that it is more efficient to store a new, full sourceblock.

It will be understood by one skilled in the art that transfer and synchronization of data would be increased to the same extent as for storage. By transferring or synchronizing reference codes instead of full-sized data, the bandwidth requirements for both types of operations are dramatically reduced.

In addition, the method described herein is inherently a form of encryption. When the data is converted from its full form to reference codes, none of the original data is contained in the reference codes. Without access to the library of sourceblocks, it would be impossible to reconstruct any portion of the data from the reference codes. This inherent property of the method described herein could obviate the need for traditional encryption algorithms, thereby offsetting most or all of the computational cost of conversion of data back and forth to reference codes. In theory, the method described herein should not utilize any additional computing power beyond traditional storage using encryption algorithms. Alternatively, the method described herein could be in addition to other encryption algorithms to increase data security even further.

In other embodiments, additional security features could be added, such as: creating a proprietary library of sourceblocks for proprietary networks, physical separation of the reference codes from the library of sourceblocks, storage of the library of sourceblocks on a removable device to enable easy physical separation of the library and reference codes from any network, and incorporation of proprietary sequences of how sourceblocks are read and the data reassembled.

Figure 7:
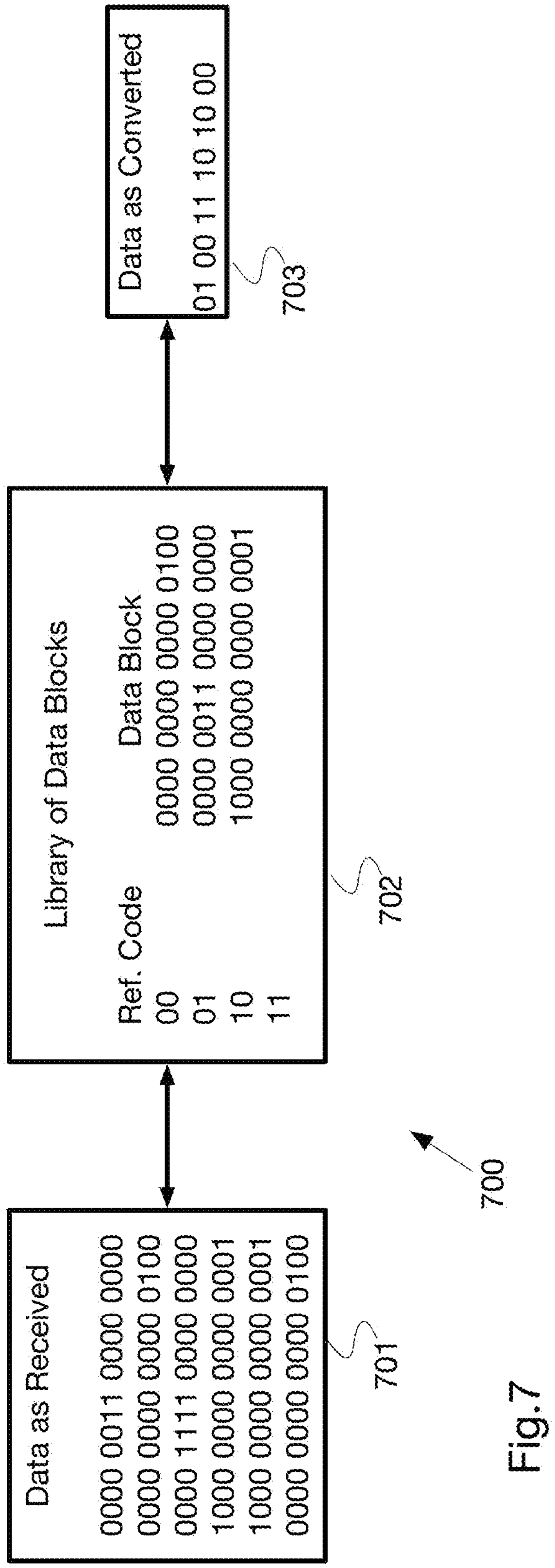
FIG. 7 is a diagram showing an example of how data might be converted into reference codes using an aspect of an embodiment.

FIG. 7 is a diagram showing an example of how data might be converted into reference codes using an aspect of an embodiment 700. As data is received 701, it is read by the processor in sourceblocks of a size dynamically determined by the previously disclosed sourceblock size optimizer 410. In this example, each sourceblock is 16 bits in length, and the library 702 initially contains three sourceblocks with reference codes 00, 01, and 10. The entry for reference code 11 is initially empty. As each 16 bit sourceblock is received, it is compared with the library. If that sourceblock is already contained in the library, it is assigned the corresponding reference code. So, for example, as the first line of data (0000 0011 0000 0000) is received, it is assigned the reference code (01) associated with that sourceblock in the library. If that sourceblock is not already contained in the library, as is the case with the third line of data (0000 1111 0000 0000) received in the example, that sourceblock is added to the library and assigned a reference code, in this case 11. The data is thus converted 703 to a series of reference codes to sourceblocks in the library. The data is stored as a collection of codewords, each of which contains the reference code to a sourceblock and information about the location of the sourceblocks in the data set. Reconstructing the data is performed by reversing the process. Each stored reference code in a data collection is compared with the reference codes in the library, the corresponding sourceblock is read from the library, and the data is reconstructed into its original form.

Figure 8:
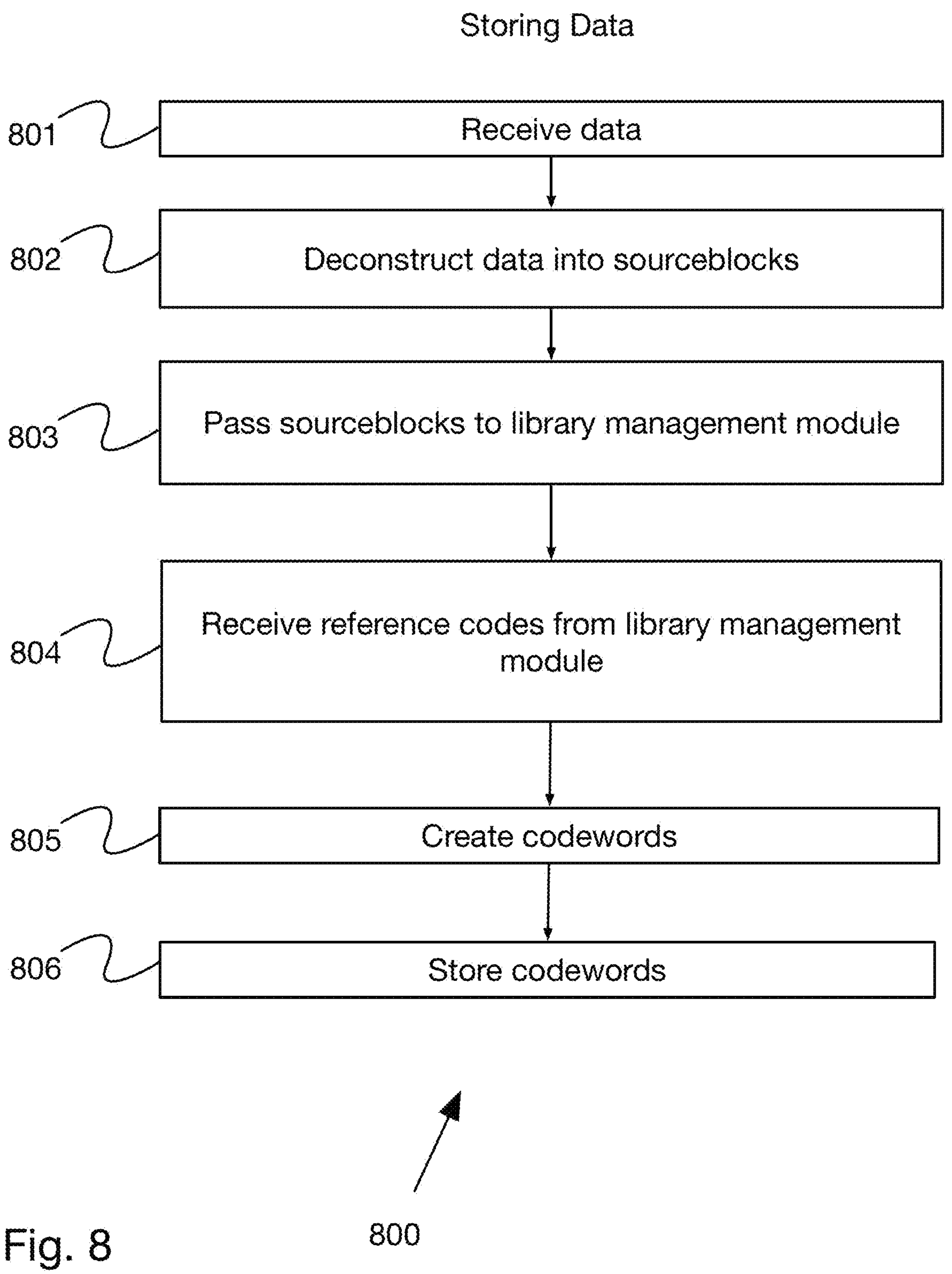
FIG. 8 is a method diagram showing the steps involved in using an embodiment to store data.

FIG. 8 is a method diagram showing the steps involved in using an embodiment 800 to store data. As data is received 801, it would be deconstructed into sourceblocks 802, and passed 803 to the library management module for processing. Reference codes would be received back 804 from the library management module, and could be combined with location information to create codewords 805, which would then be stored 806 as representations of the original data.

Figure 9:
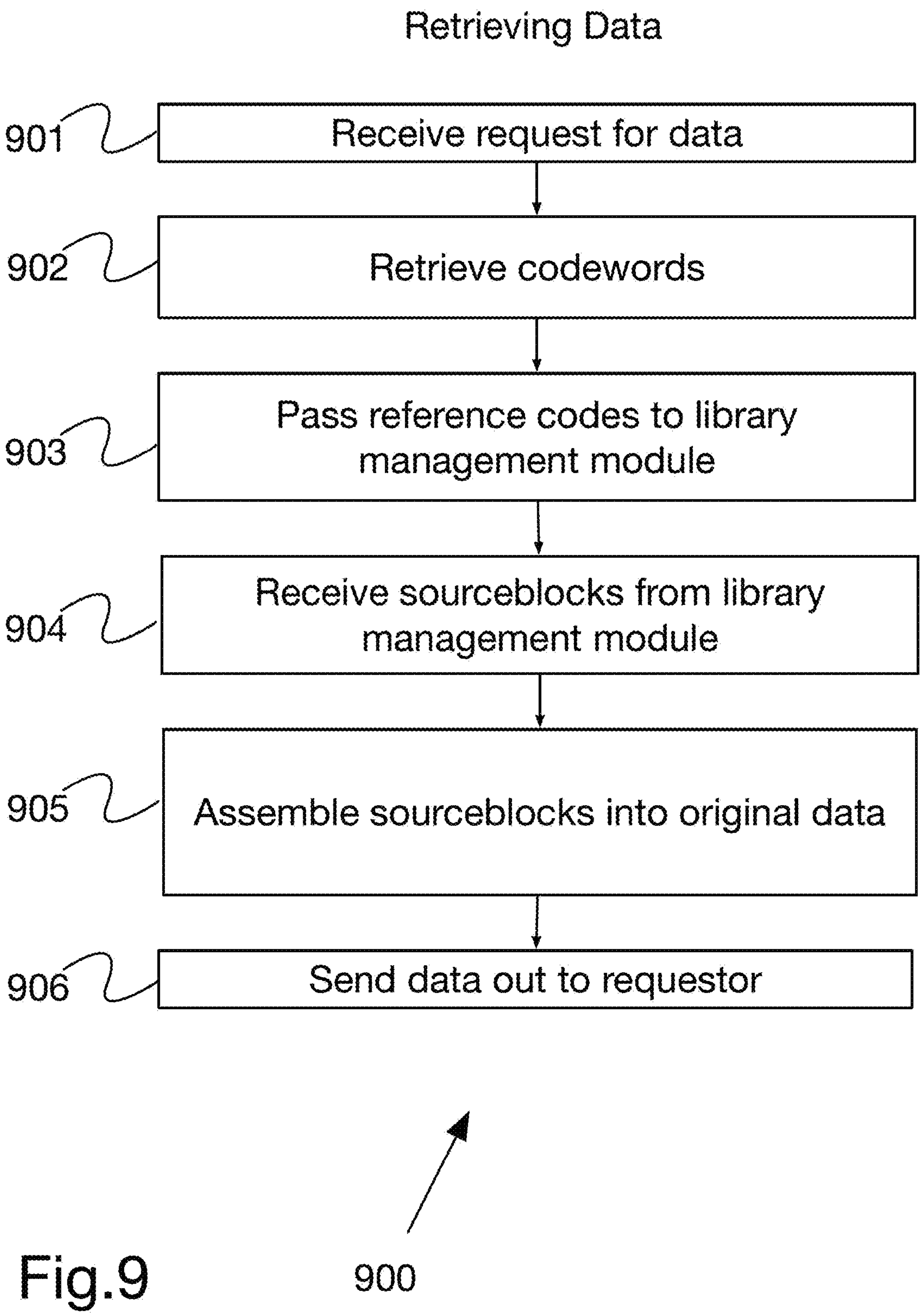
FIG. 9 is a method diagram showing the steps involved in using an embodiment to retrieve data.

FIG. 9 is a method diagram showing the steps involved in using an embodiment 900 to retrieve data. When a request for data is received 901, the associated codewords would be retrieved 902 from the library. The codewords would be passed 903 to the library management module, and the associated sourceblocks would be received back 904. Upon receipt, the sourceblocks would be assembled 905 into the original data using the location data contained in the codewords, and the reconstructed data would be sent out 906 to the requestor.

Figure 10:
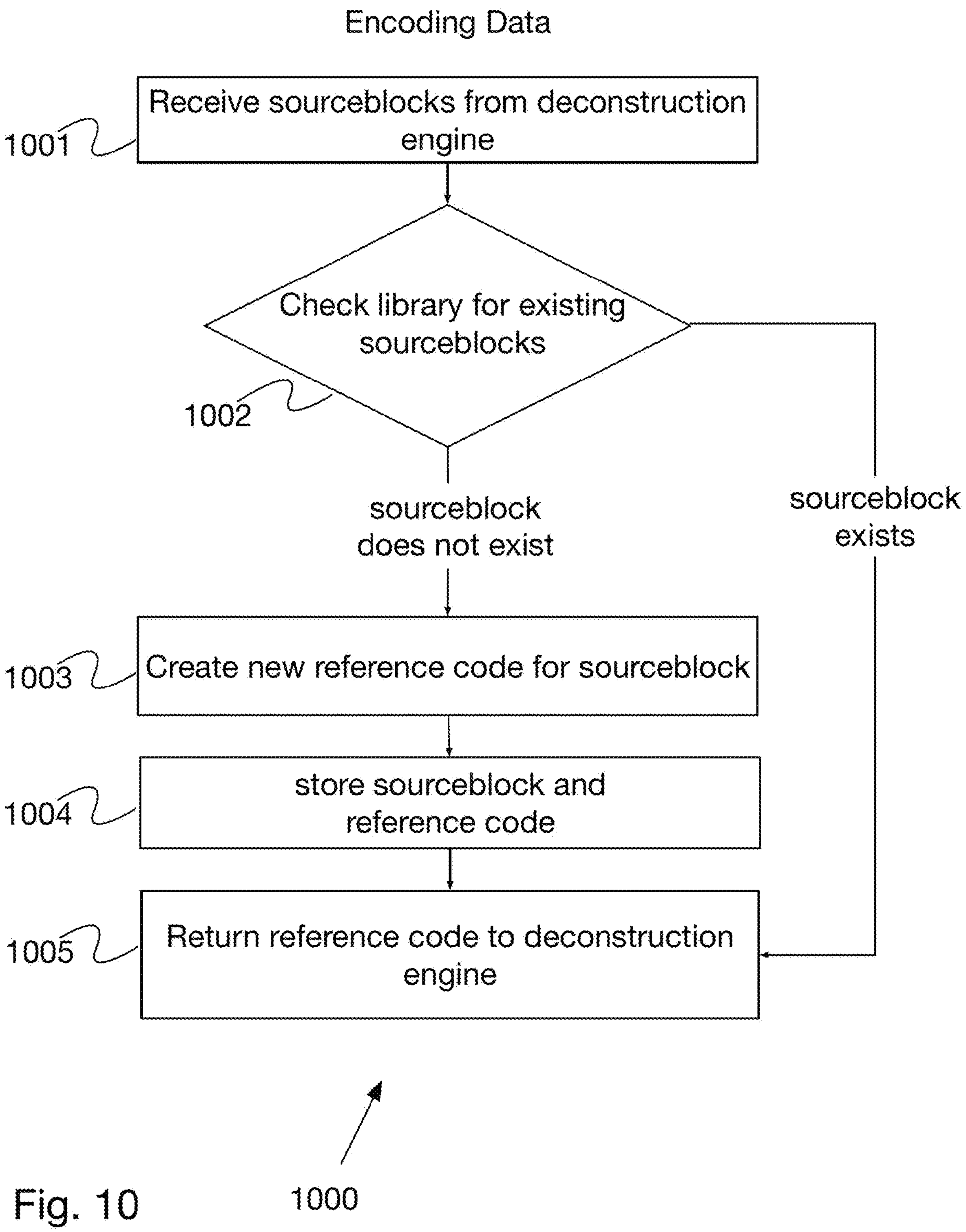
FIG. 10 is a method diagram showing the steps involved in using an embodiment to encode data.

FIG. 10 is a method diagram showing the steps involved in using an embodiment 1000 to encode data. As sourceblocks are received 1001 from the deconstruction engine, they would be compared 1002 with the sourceblocks already contained in the library. If that sourceblock already exists in the library, the associated reference code would be returned 1005 to the deconstruction engine. If the sourceblock does not already exist in the library, a new reference code would be created 1003 for the sourceblock. The new reference code and its associated sourceblock would be stored 1004 in the library, and the reference code would be returned to the deconstruction engine.

Figure 11:
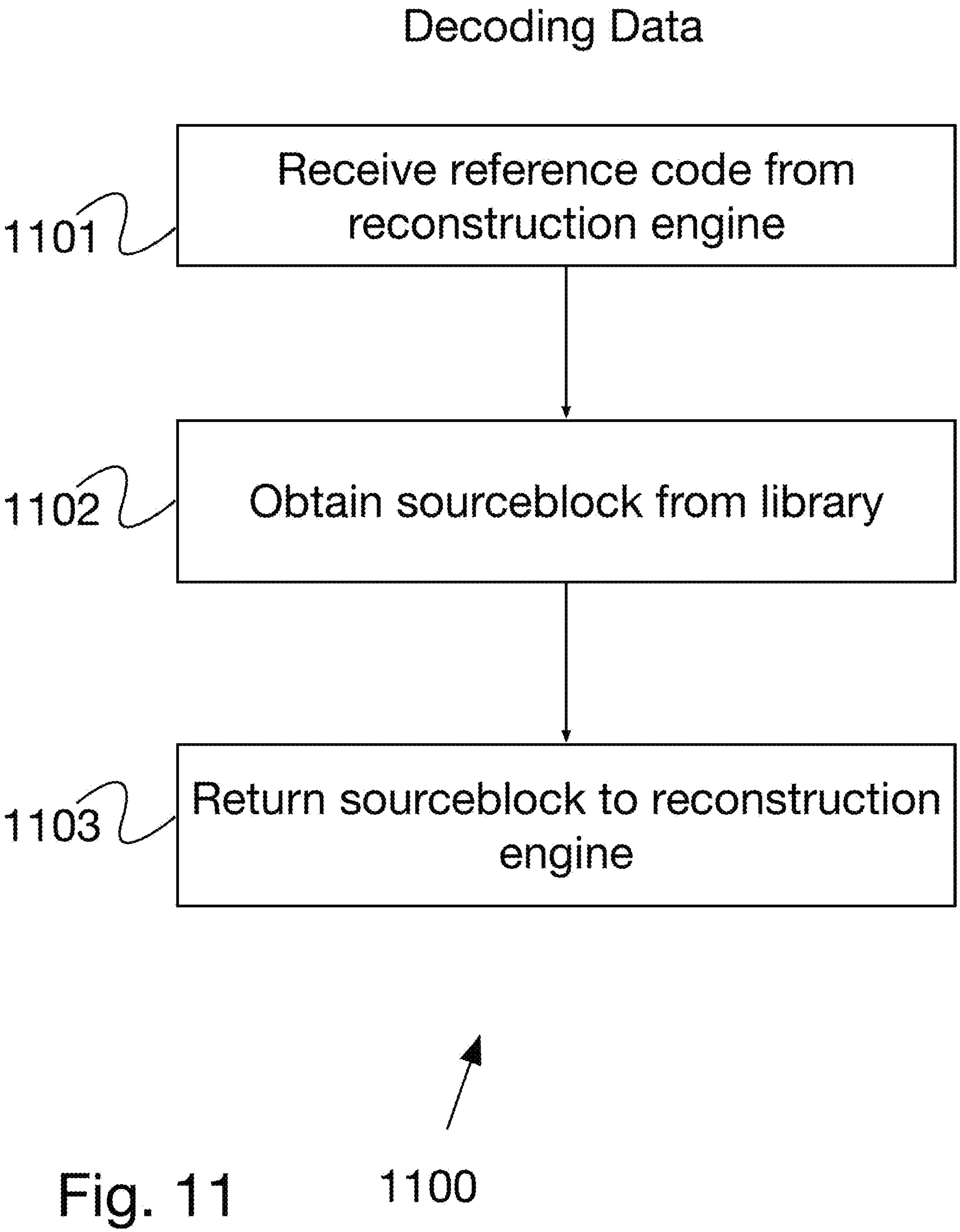
FIG. 11 is a method diagram showing the steps involved in using an embodiment to decode data.

FIG. 11 is a method diagram showing the steps involved in using an embodiment 1100 to decode data. As reference codes are received 1101 from the reconstruction engine, the associated sourceblocks are retrieved 1102 from the library, and returned 1103 to the reconstruction engine.

Figure 16:
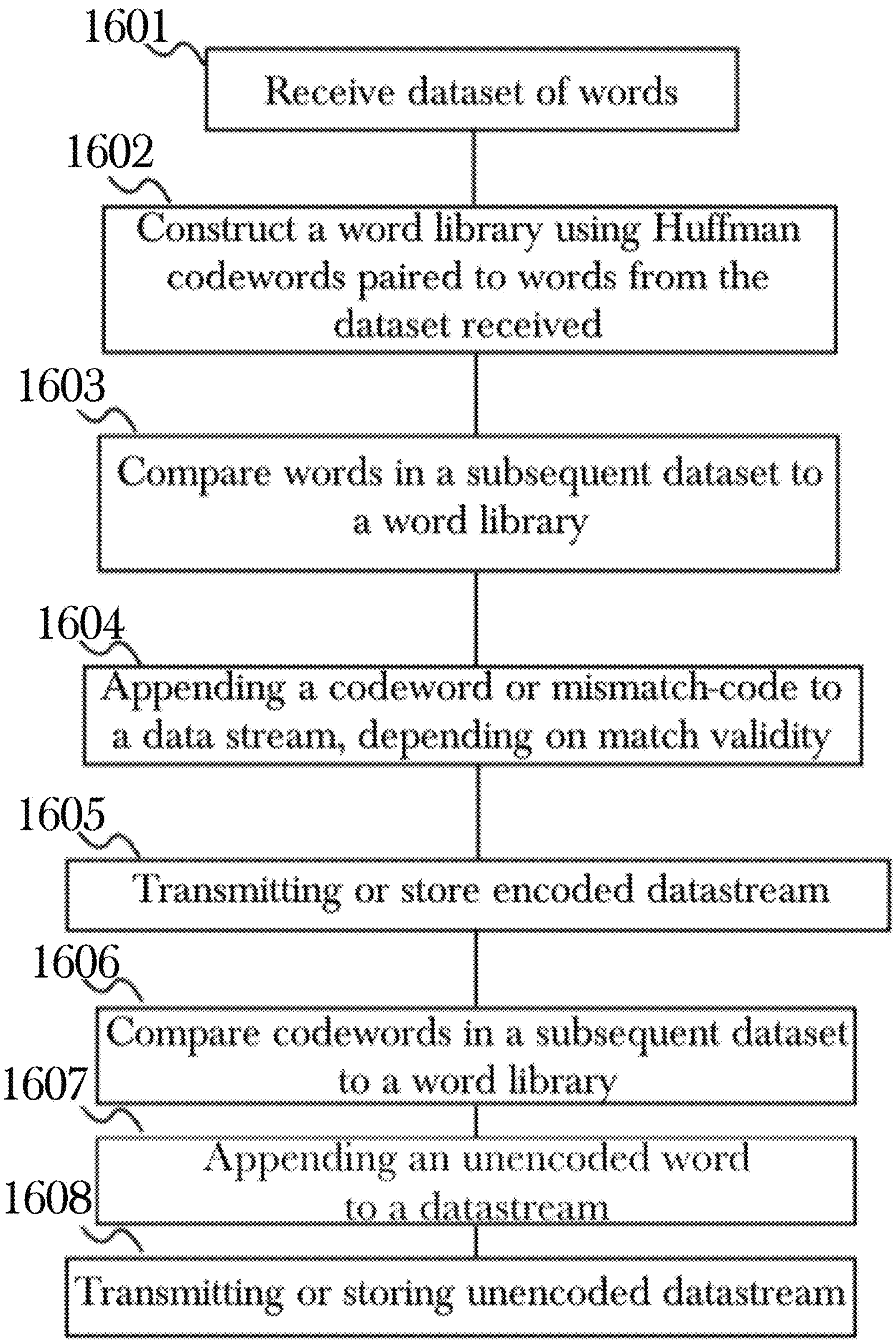
FIG. 16 is a method diagram illustrating key system functionality utilizing an encoder and decoder pair.

FIG. 16 is a method diagram illustrating key system functionality utilizing an encoder and decoder pair, according to a preferred embodiment. In a first step 1601, at least one incoming data set may be received at a customized library generator 1300 that then 1602 processes data to produce a customized word library 1201 comprising key-value pairs of data words (each comprising a string of bits) and their corresponding calculated binary Huffman codewords. A subsequent dataset may be received, and compared to the word library 1603 to determine the proper codewords to use in order to encode the dataset. Words in the dataset are checked against the word library and appropriate encodings are appended to a data stream 1604. If a word is mismatched within the word library and the dataset, meaning that it is present in the dataset but not the word library, then a mismatched code is appended, followed by the unencoded original word. If a word has a match within the word library, then the appropriate codeword in the word library is appended to the data stream. Such a data stream may then be stored or transmitted 1605 to a destination as desired. For the purposes of decoding, an already-encoded data stream may be received and compared 1606, and un-encoded words may be appended to a new data stream 1607 depending on word matches found between the encoded data stream and the word library that is present. A matching codeword that is found in a word library is replaced with the matching word and appended to a data stream, and a mismatch code found in a data stream is deleted and the following unencoded word is re-appended to a new data stream, the inverse of the process of encoding described earlier. Such a data stream may then be stored or transmitted 1608 as desired.

Figure 17:
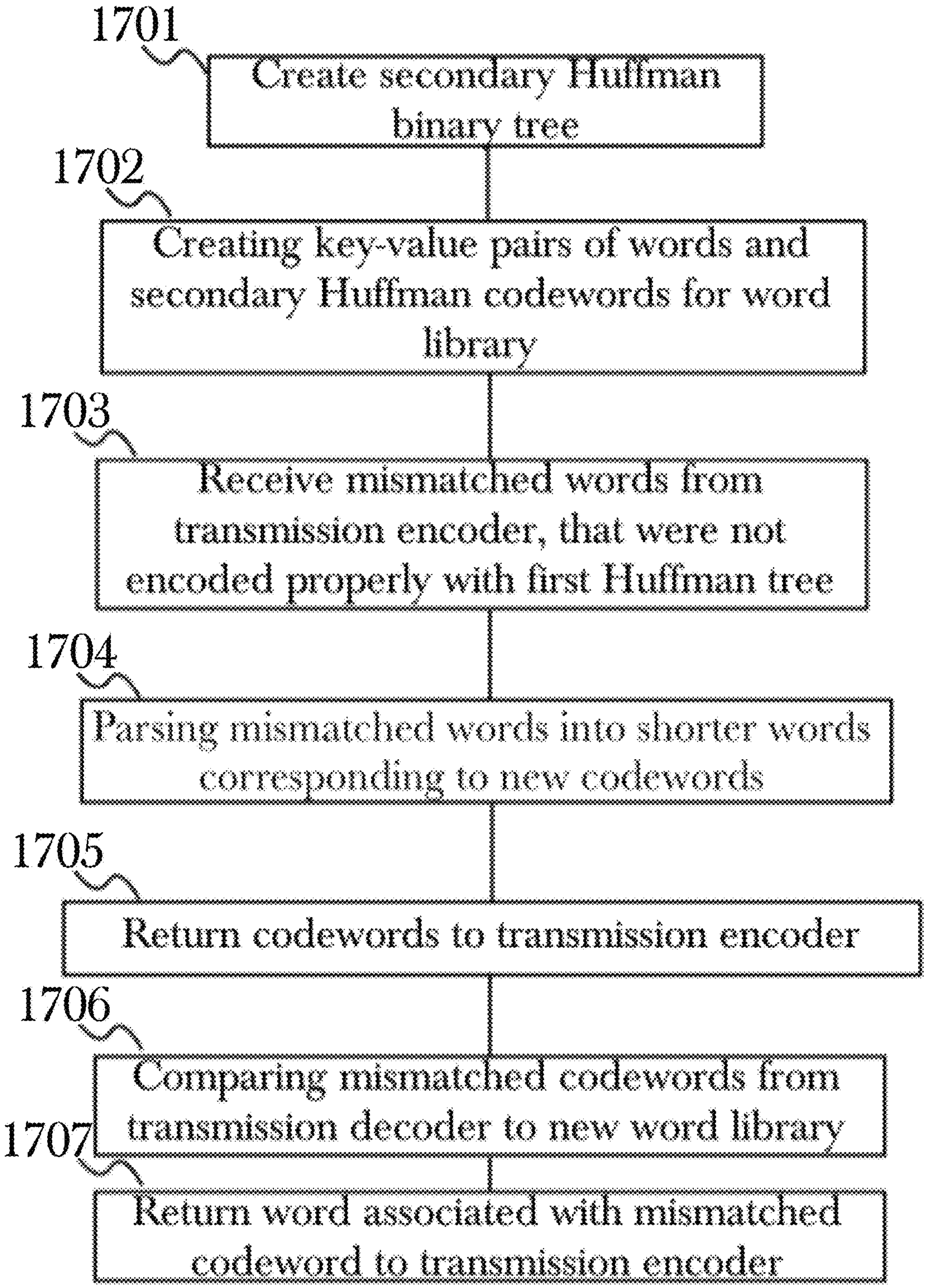
FIG. 17 is a method diagram illustrating possible use of a hybrid encoder/decoder to improve the compression ratio.

FIG. 17 is a method diagram illustrating possible use of a hybrid encoder/decoder to improve the compression ratio, according to a preferred aspect. A second Huffman binary tree may be created 1701, having a shorter maximum length of codewords than a first Huffman binary tree 1602, allowing a word library to be filled with every combination of codeword possible in this shorter Huffman binary tree 1702. A word library may be filled with these Huffman codewords and words from a dataset 1702, such that a hybrid encoder/decoder 1304, 1503 may receive any mismatched words from a dataset for which encoding has been attempted with a first Huffman binary tree 1703, 1604 and parse previously mismatched words into new partial codewords (that is, codewords that are each a substring of an original mismatched codeword) using the second Huffman binary tree 1704. In this way, an incomplete word library may be supplemented by a second word library. New codewords attained in this way may then be returned to a transmission encoder 1705, 1500. In the event that an encoded dataset is received for decoding, and there is a mismatch code indicating that additional coding is needed, a mismatch code may be removed and the unencoded word used to generate a new codeword as before 1706, so that a transmission encoder 1500 may have the word and newly generated codeword added to its word library 1707, to prevent further mismatching and errors in encoding and decoding.

It will be recognized by a person skilled in the art that the methods described herein can be applied to data in any form. For example, the method described herein could be used to store genetic data, which has four data units: C, G, A, and T. Those four data units can be represented as 2 bit sequences: 00, 01, 10, and 11, which can be processed and stored using the method described herein.

It will be recognized by a person skilled in the art that certain embodiments of the methods described herein may have uses other than data storage. For example, because the data is stored in reference code form, it cannot be reconstructed without the availability of the library of sourceblocks. This is effectively a form of encryption, which could be used for cyber security purposes. As another example, an embodiment of the method described herein could be used to store backup copies of data, provide for redundancy in the event of server failure, or provide additional security against cyberattacks by distributing multiple partial copies of the library among computers are various locations, ensuring that at least two copies of each sourceblock exist in different locations within the network.

Figure 18:
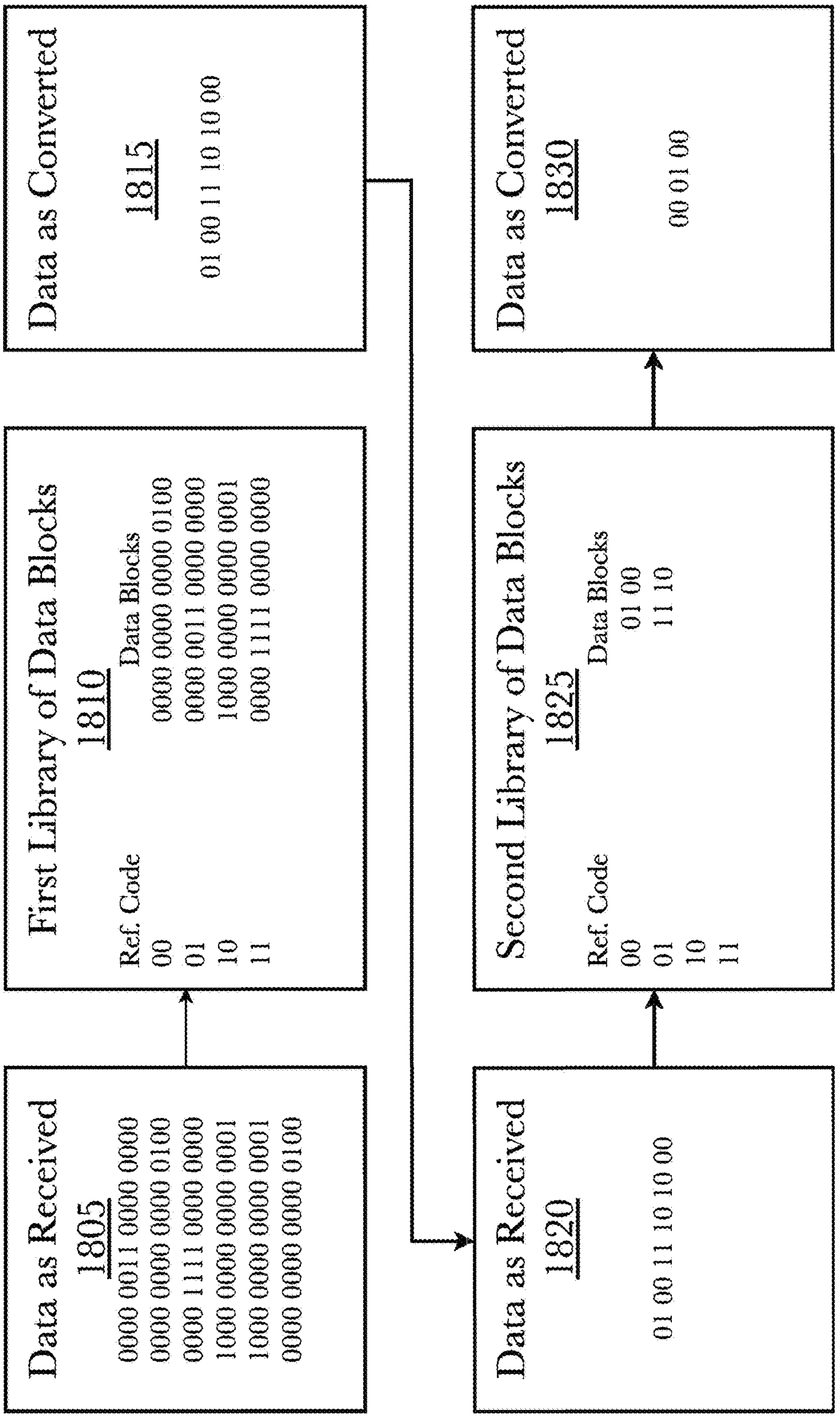
FIG. 18 is a flow diagram illustrating the use of a data encoding system used to recursively encode data to further reduce data size.

FIG. 18 is a flow diagram illustrating the use of a data encoding system used to recursively encode data to further reduce data size. Data may be input 1805 into a data deconstruction engine 102 to be deconstructed into code references, using a library of code references based on the input 1810. Such example data is shown in a converted, encoded format 1815, highly compressed, reducing the example data from 96 bits of data, to 12 bits of data, before sending this newly encoded data through the process again 1820, to be encoded by a second library 1825, reducing it even further. The newly converted data 1830 is shown as only 6 bits in this example, thus a size of 6.25% of the original data packet. With recursive encoding, then, it is possible and implemented in the system to achieve increasing compression ratios, using multi-layered encoding, through recursively encoding data. Both initial encoding libraries 1810 and subsequent libraries 1825 may be achieved through machine learning techniques to find optimal encoding patterns to reduce size, with the libraries being distributed to recipients prior to transfer of the actual encoded data, such that only the compressed data 1830 must be transferred or stored, allowing for smaller data footprints and bandwidth requirements. This process can be reversed to reconstruct the data. While this example shows only two levels of encoding, recursive encoding may be repeated any number of times. The number of levels of recursive encoding will depend on many factors, a non-exhaustive list of which includes the type of data being encoded, the size of the original data, the intended usage of the data, the number of instances of data being stored, and available storage space for codebooks and libraries. Additionally, recursive encoding can be applied not only to data to be stored or transmitted, but also to the codebooks and/or libraries, themselves. For example, many installations of different libraries could take up a substantial amount of storage space. Recursively encoding those different libraries to a single, universal library would dramatically reduce the amount of storage space required, and each different library could be reconstructed as necessary to reconstruct incoming streams of data.

Figure 20:
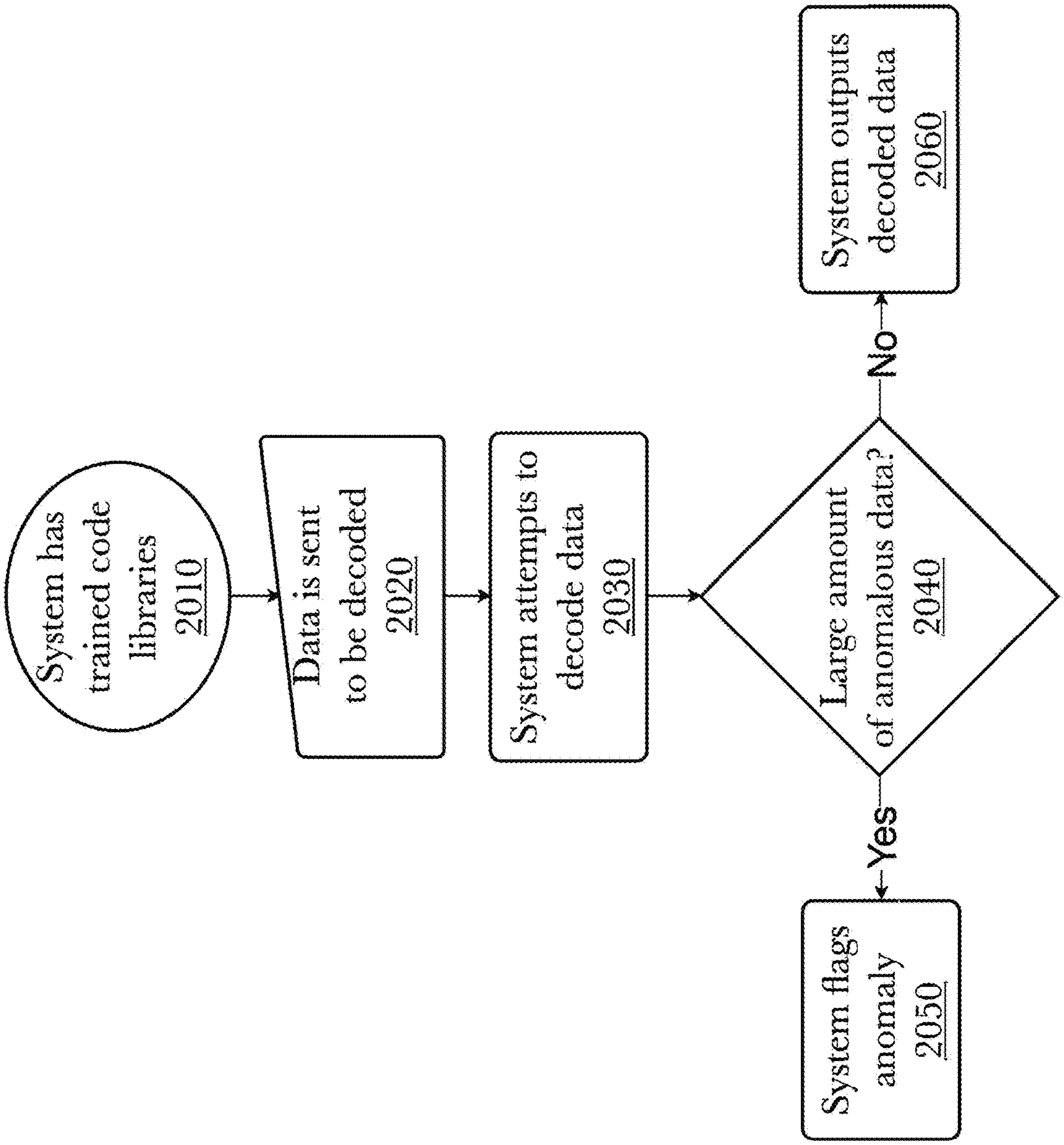
FIG. 20 is a flow diagram of an exemplary method used to detect anomalies in received encoded data and producing a warning.

FIG. 20 is a flow diagram of an exemplary method used to detect anomalies in received encoded data and producing a warning. A system may have trained encoding libraries 2010, before data is received from some source such as a network connected device or a locally connected device including USB connected devices, to be decoded 2020. Decoding in this context refers to the process of using the encoding libraries to take the received data and attempt to use encoded references to decode the data into its original source 2030, potentially more than once if recursive encoding was used, but not necessarily more than once. An anomaly detector 1910 may be configured to detect a large amount of un-encoded data 2040 in the midst of encoded data, by locating data or references that do not appear in the encoding libraries, indicating at least an anomaly, and potentially data tampering or faulty encoding libraries. A flag or warning is set by the system 2050, allowing a user to be warned at least of the presence of the anomaly and the characteristics of the anomaly. However, if a large amount of invalid references or unencoded data are not present in the encoded data that is attempting to be decoded, the data may be decoded and output as normal 2060, indicating no anomaly has been detected.

Figure 21:
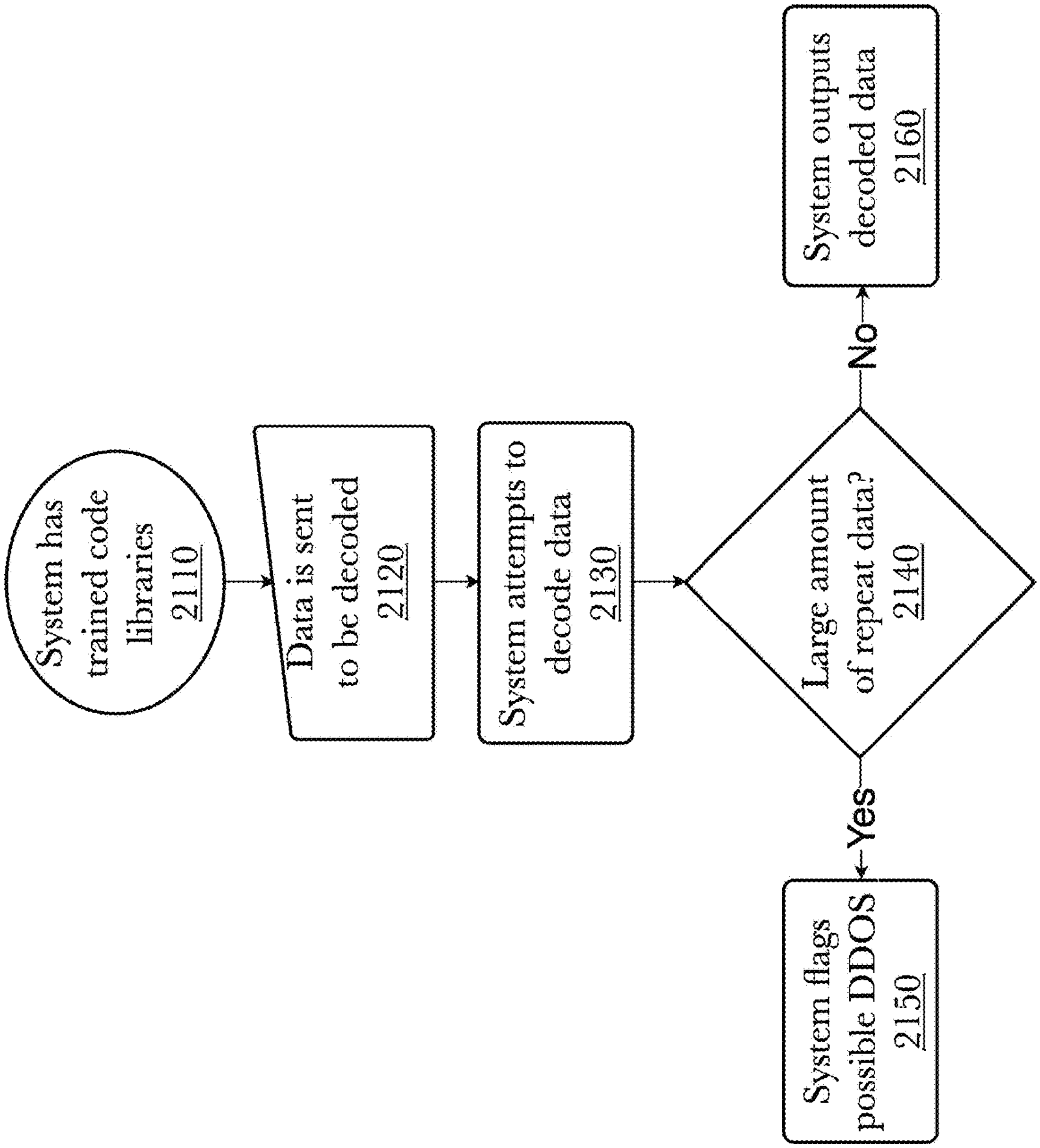
FIG. 21 is a flow diagram of a data encoding system used for Distributed Denial of Service (DDOS) attack denial.

FIG. 21 is a flow diagram of a method used for Distributed Denial of Service (DDoS) attack denial. A system may have trained encoding libraries 2110, before data is received from some source such as a network connected device or a locally connected device including USB connected devices, to be decoded 2120. Decoding in this context refers to the process of using the encoding libraries to take the received data and attempt to use encoded references to decode the data into its original source 2130, potentially more than once if recursive encoding was used, but not necessarily more than once. A DDOS detector 1920 may be configured to detect a large amount of repeating data 2140 in the encoded data, by locating data or references that repeat many times over (the number of which can be configured by a user or administrator as need be), indicating a possible DDOS attack. A flag or warning is set by the system 2150, allowing a user to be warned at least of the presence of a possible DDOS attack, including characteristics about the data and source that initiated the flag, allowing a user to then block incoming data from that source. However, if a large amount of repeat data in a short span of time is not detected, the data may be decoded and output as normal 2160, indicating no DDOS attack has been detected.

Figure 23:
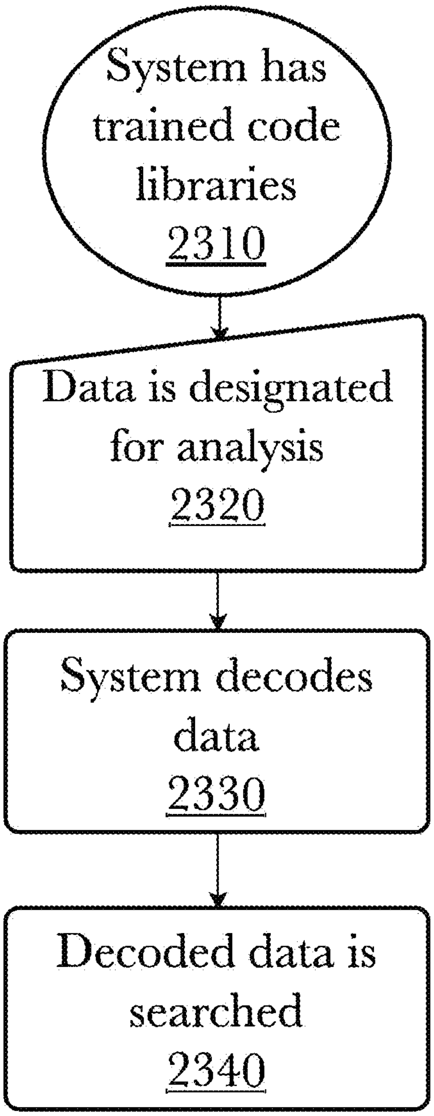
FIG. 23 is a flow diagram of an exemplary method used to enable high-speed data mining of repetitive data.

FIG. 23 is a flow diagram of an exemplary method used to enable high-speed data mining of repetitive data. A system may have trained encoding libraries 2310, before data is received from some source such as a network connected device or a locally connected device including USB connected devices, to be analyzed 2320 and decoded 2330. When determining data for analysis, users may select specific data to designate for decoding 2330, before running any data mining or analytics functions or software on the decoded data 2340. Rather than having traditional decryption and decompression operate over distributed drives, data can be regenerated immediately using the encoding libraries disclosed herein, as it is being searched. Using methods described in FIG. 9 and FIG. 11, data can be stored, retrieved, and decoded swiftly for searching, even across multiple devices, because the encoding library may be on each device. For example, if a group of servers host codewords relevant for data mining purposes, a single computer can request these codewords, and the codewords can be sent to the recipient swiftly over the bandwidth of their connection, allowing the recipient to locally decode the data for immediate evaluation and searching, rather than running slow, traditional decompression algorithms on data stored across multiple devices or transfer larger sums of data across limited bandwidth.

Figure 25:
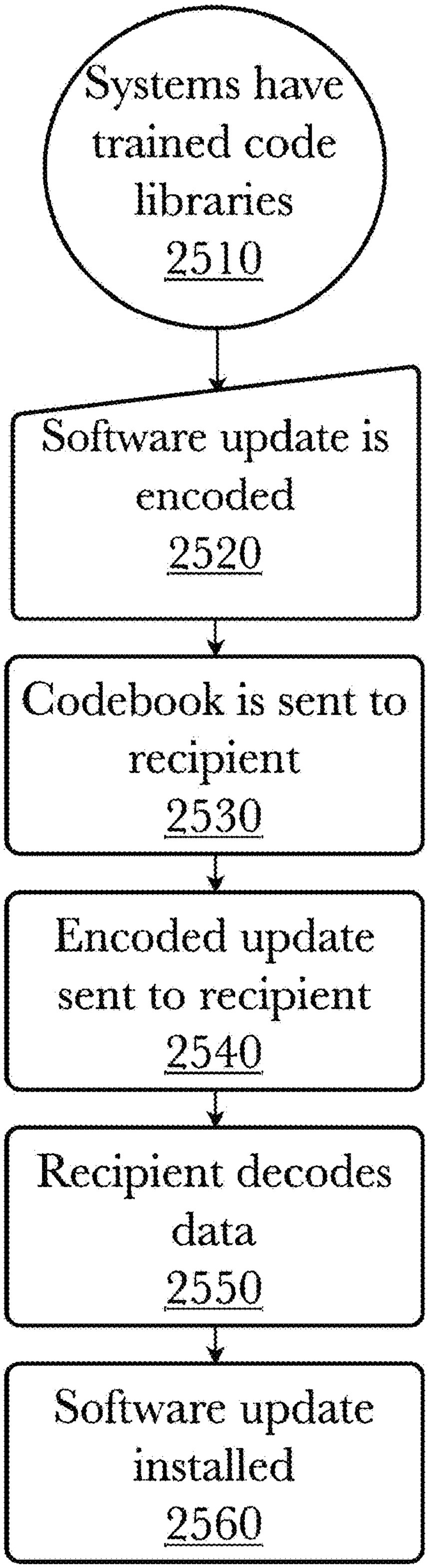
FIG. 25 is a flow diagram of an exemplary method used to encode and transfer software and firmware updates to a device for installation, for the purposes of reduced bandwidth consumption.

FIG. 25 is a flow diagram of an exemplary method used to encode and transfer software and firmware updates to a device for installation, for the purposes of reduced bandwidth consumption. A first system may have trained code libraries or "codebooks" present 2510, allowing for a software update of some manner to be encoded 2520. Such a software update may be a firmware update, operating system update, security patch, application patch or upgrade, or any other type of software update, patch, modification, or upgrade, affecting any computer system. A codebook for the patch must be distributed to a recipient 2530, which may be done beforehand and either over a network or through a local or physical connection, but must be accomplished at some point in the process before the update may be installed on the recipient device 2560. An update may then be distributed to a recipient device 2540, allowing a recipient with a codebook distributed to them 2530 to decode the update 2550 before installation 2560. In this way, an encoded and thus heavily compressed update may be sent to a recipient far quicker and with less bandwidth usage than traditional lossless compression methods for data, or when sending data in uncompressed formats. This especially may benefit large distributions of software and software updates, as with enterprises updating large numbers of devices at once.

Figure 27:
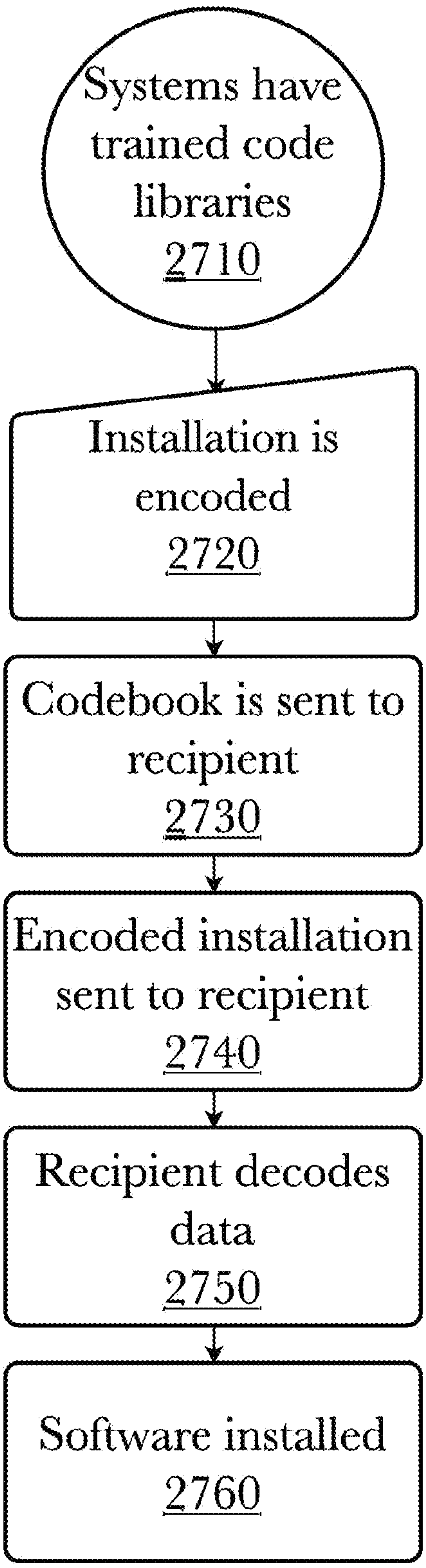
FIG. 27 is a flow diagram of an exemplary method used to encode new software and operating system installations for reduced bandwidth required for transference.

FIG. 27 is a flow diagram of an exemplary method used to encode new software and operating system installations for reduced bandwidth required for transference. A first system may have trained code libraries or "codebooks" present 2710, allowing for a software installation of some manner to be encoded 2720. Such a software installation may be a software update, operating system, security system, application, or any other type of software installation, execution, or acquisition, affecting a computer system. An encoding library or "codebook" for the installation must be distributed to a recipient 2730, which may be done beforehand and either over a network or through a local or physical connection, but must be accomplished at some point in the process before the installation can begin on the recipient device 2760. An installation may then be distributed to a recipient device 2740, allowing a recipient with a codebook distributed to them 2730 to decode the installation 2750 before executing the installation 2760. In this way, an encoded and thus heavily compressed software installation may be sent to a recipient far quicker and with less bandwidth usage than traditional lossless compression methods for data, or when sending data in uncompressed formats. This especially may benefit large distributions of software and software updates, as with enterprises updating large numbers of devices at once.

Figure 31:
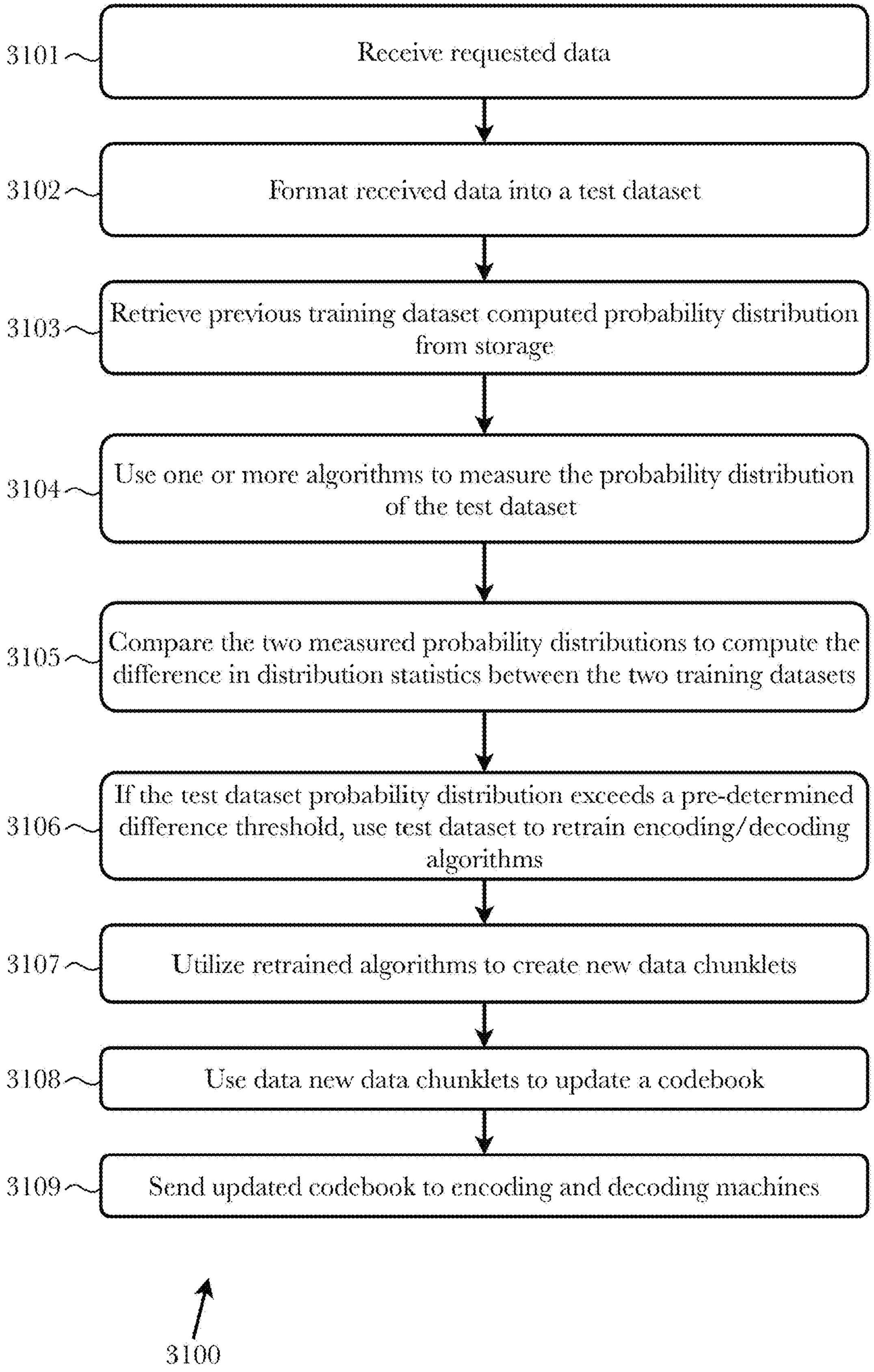
FIG. 31 is a method diagram illustrating the steps involved in using an embodiment of the codebook training system to update a codebook.

FIG. 31 is a method diagram illustrating the steps 3100 involved in using an embodiment of the codebook training system to update a codebook. The process begins when requested data is received 3101 by a codebook training module. The requested data may comprise a plurality of sourceblocks. Next, the received data may be stored in a cache and formatted into a test dataset 3102. The next step is to retrieve the previously computed probability distribution associated with the previous (most recent) training dataset from a storage device 3103. Using one or more algorithms, measure and record the probability distribution of the test dataset 3104. The step after that is to compare the measured probability distributions of the test dataset and the previous training dataset to compute the difference in distribution statistics between the two datasets 3105. If the test dataset probability distribution exceeds a pre-determined difference threshold, then the test dataset will be used to retrain the encoding/decoding algorithms 3106 to reflect the new distribution of the incoming data to the encoder/decoder system. The retrained algorithms may then be used to create new data sourceblocks 3107 that better capture the nature of the data being received. These newly created data sourceblocks may then be used to create new codewords and update a codebook 3108 with each new data sourceblock and its associated new codeword. Last, the updated codebooks may be sent to encoding and decoding machines 3109 in order to ensure the encoding/decoding system function properly.

Figure 53:
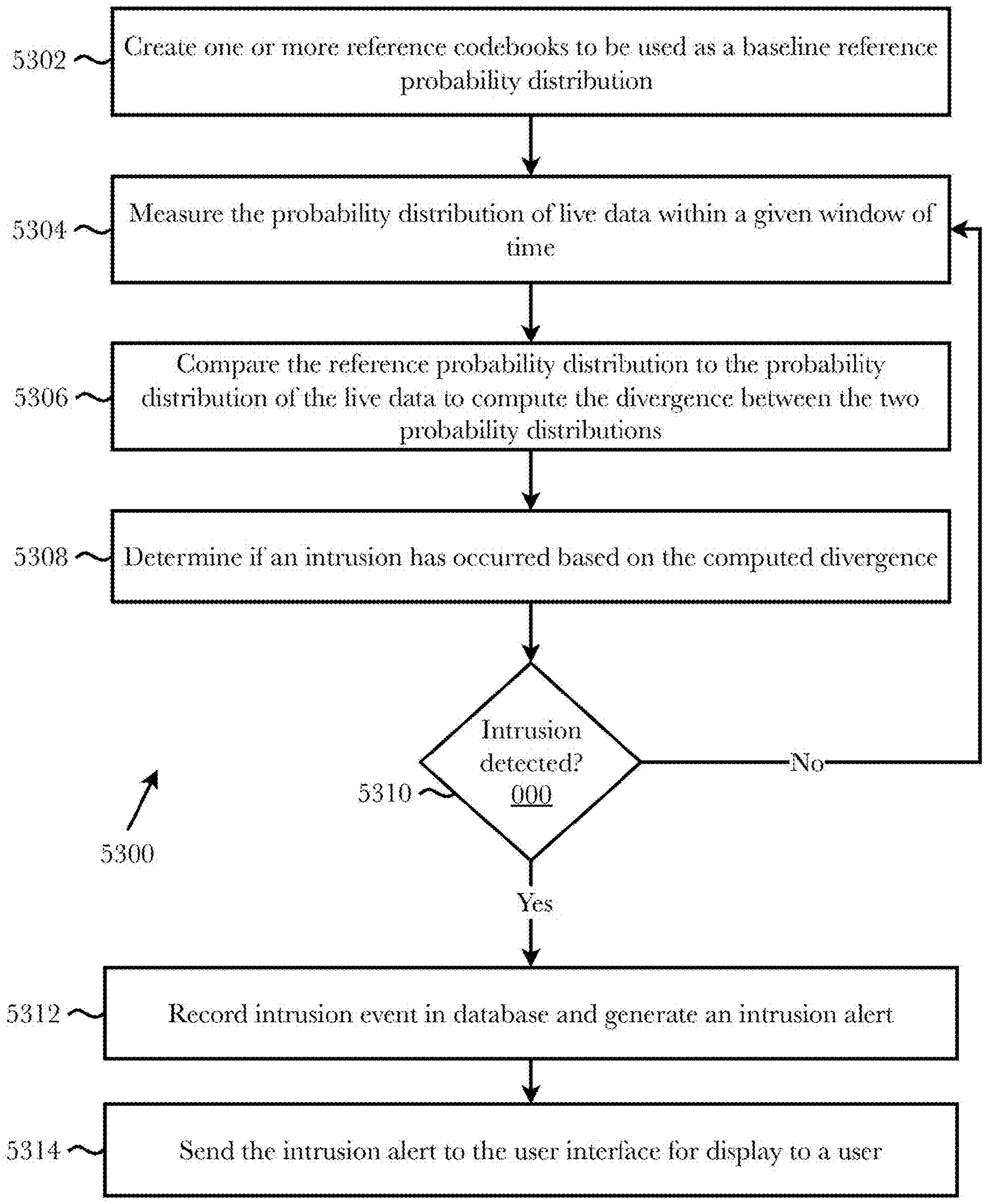
FIG. 53 is a flow diagram illustrating an exemplary method for data compression with intrusion detection, according to an embodiment.

FIG. 53 is a flow diagram illustrating an exemplary method 5300 for data compression with intrusion detection, according to an embodiment. This exemplary method may be implemented as a set of machine readable instructions stored in a non-volatile data storage device (e.g., hard drive, disk drive, solid state drive, etc.) or in the memory of a computing device, and executed by one or more processors of the computing device. According to the embodiment, an initial step 5302 comprises create one or more reference codebooks to be used as a baseline reference probability distribution. A codebook training module 5130 can obtain a plurality of data to form a training dataset which can be used to create a reference codebook which represents a reference probability distribution. In some implementations, the training dataset may comprise iid data. Upon successful creation of the reference probability distribution, codebook training module 5130 may send the reference codebook to an intrusion detection module 5160 where it may be stored in a database and retrieved during operation. At intrusion detection module 5160 a codeword data stream is received, retrieved, or otherwise obtained and analyzed to measure the probability distribution of the live data (transmitted codewords) within a given window of time at step 5304. Once the probability distribution of the live data has been measured, the next step 5306 is to compare the reference probability distribution to the probability distribution of the live data to compute the divergence between the two probability distributions. The divergence may be computed using one or more algorithms. In some implementations, Kullback-Leibler divergence is utilized to measure how the observed probability distribution (of the live data) diverges from the expected probability distribution (reference codebook). At step 5308, intrusion detection module 5160 determines if an intrusion has occurred based on the computed divergence. If, at step 5310 no intrusion has been detected, the process continues to step 5304 and the process repeats itself on the codeword data stream. If instead, at step 5310 an intrusion is detected then an intrusion event and/or anomalous data may be recorded and stored in a database and an alerting module 5240 can generate an intrusion alert at step 5312. In some embodiments, the intrusion alert and/or anomalous data may comprise a user configured risk threshold tolerance level, real-time compression ratio and probability distribution information, a timestamp of when the intrusion was detected, the data stream associated with the intrusion, and a potential cause of the unusual distribution. As a last step 5314, then alerting module 5240 can send the intrusion alert to a user interface for display to a user.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 43:
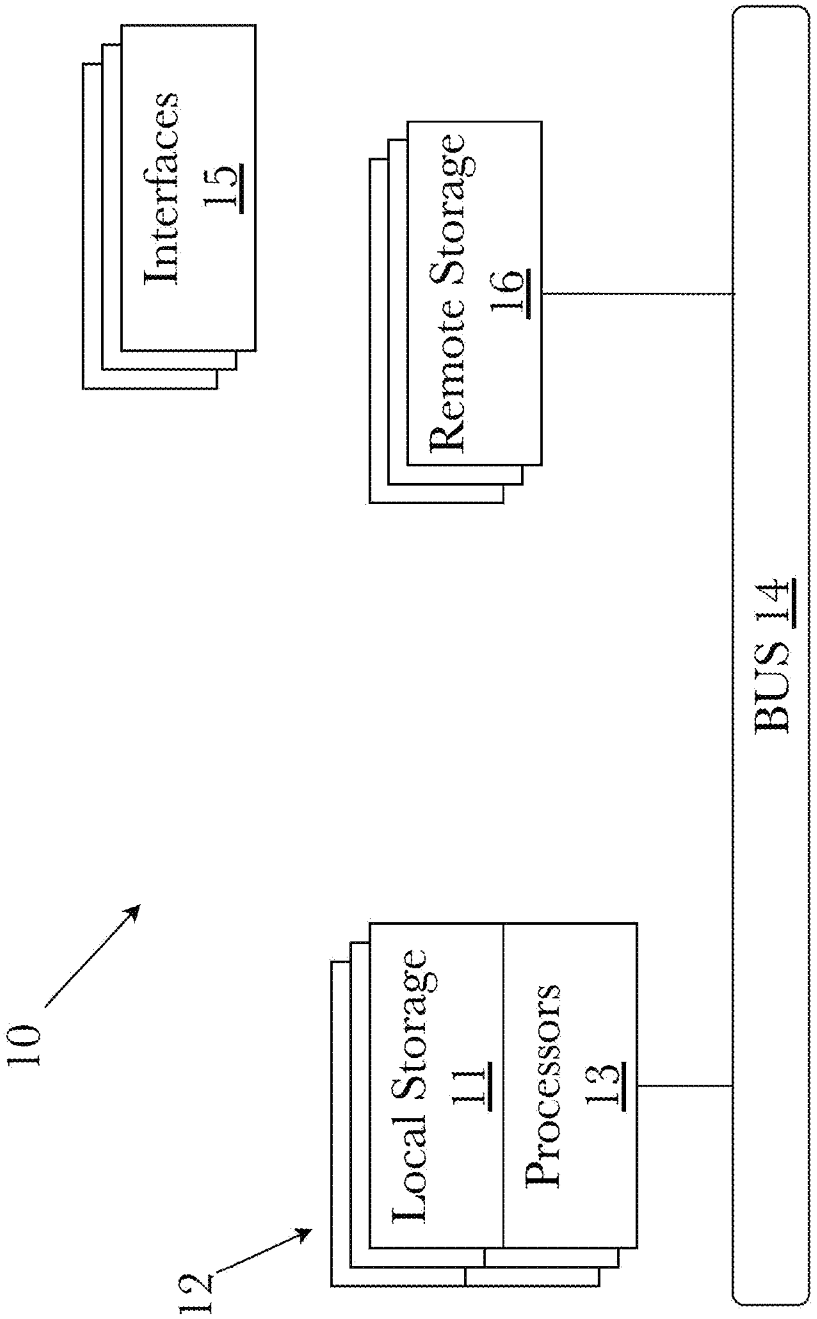
FIG. 43 is a block diagram illustrating an exemplary hardware architecture of a computing device.

Referring now to FIG. 43, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 43 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 44:
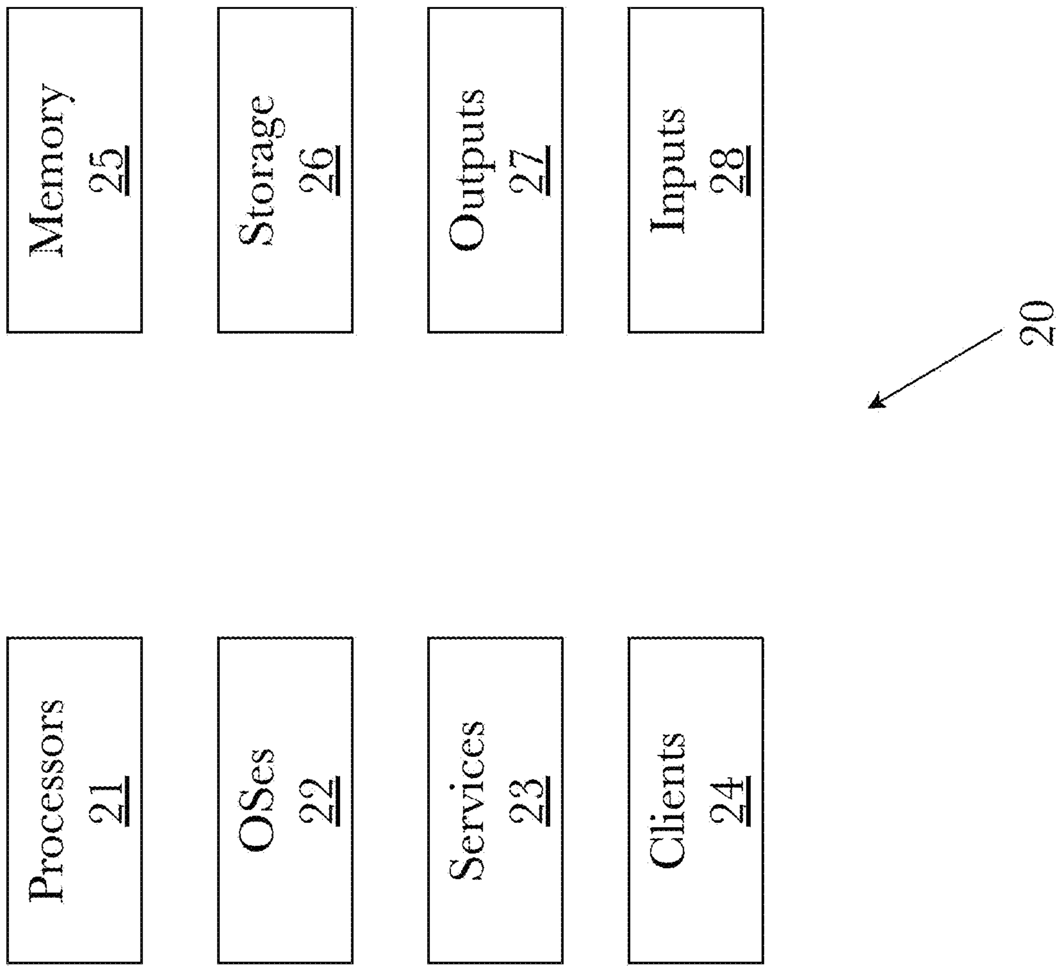
FIG. 44 is a block diagram illustrating an exemplary logical architecture for a client device.

In some aspects, systems may be implemented on a standalone computing system. Referring now to FIG. 44, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 43). Examples of storage devices 26 include flash memory, magnetic hard drive, CD-ROM, and/or the like.

Figure 45:
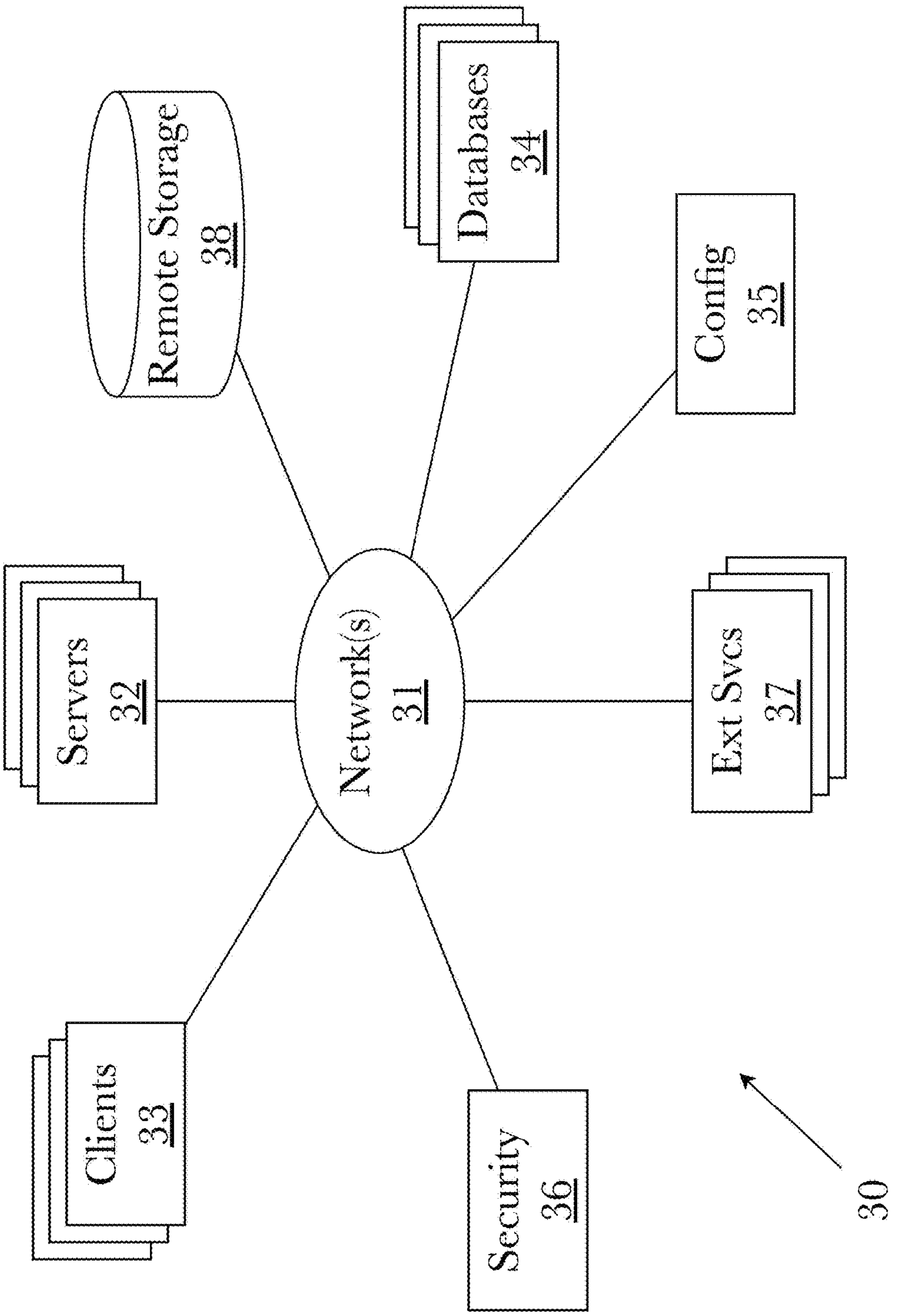
FIG. 45 is a block diagram showing an exemplary architectural arrangement of clients, servers, and external services.

In some aspects, systems may be implemented on a distributed computing network, such as one having any number of clients and/or servers. Referring now to FIG. 45, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 44. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 46:
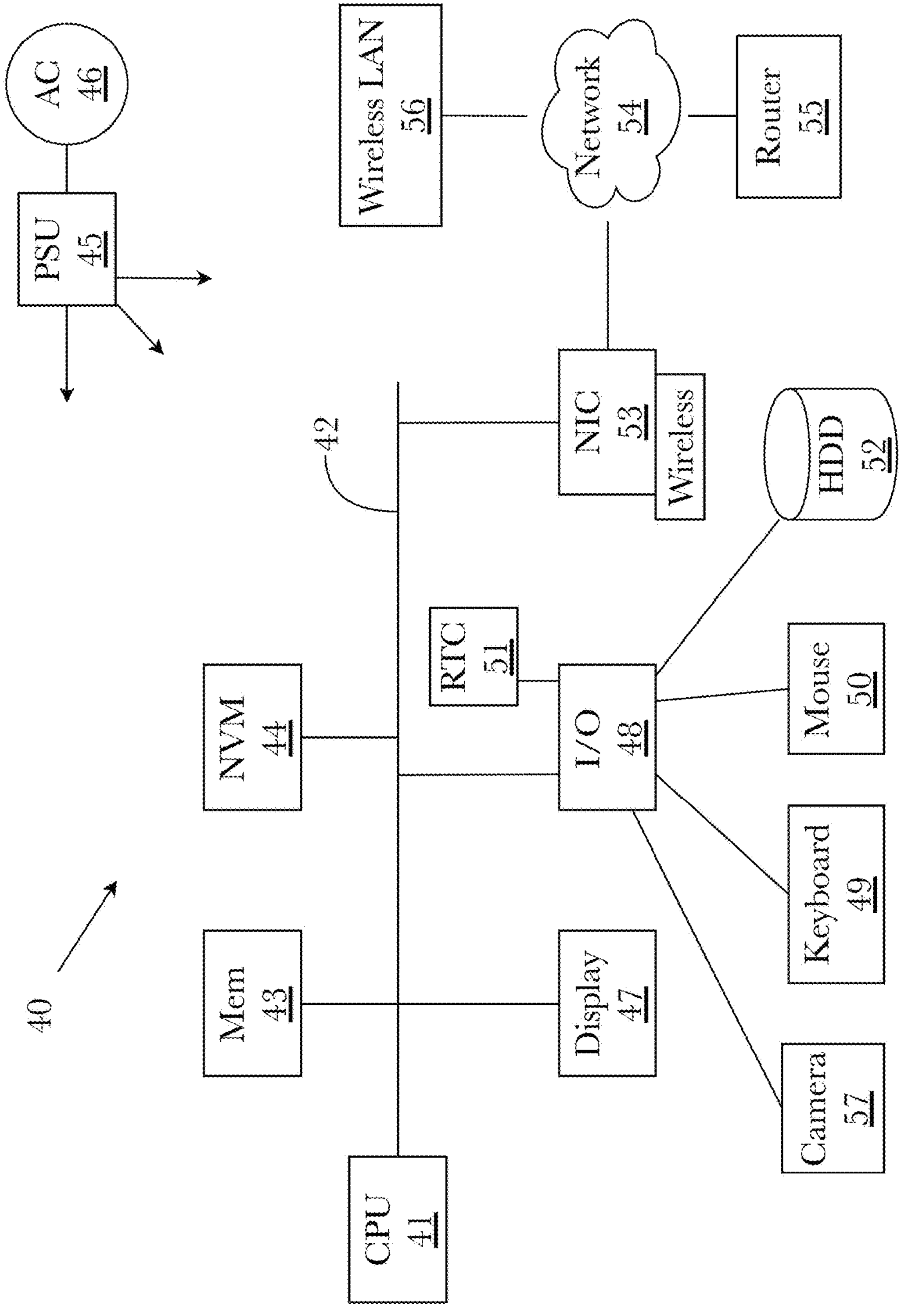
FIG. 46 is another block diagram illustrating an exemplary hardware architecture of a computing device.

FIG. 46 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for neural network weight processing, the system comprising:

one or more hardware processors configured for:

receiving a neural network model comprising a plurality of weight tensors;

analyzing weight characteristics to identify statistical properties within the neural network model;

generating one or more encoding schemes based on the analyzed weight characteristics;

creating reference probability distributions for security verification;

encoding the weight tensors using the one or more encoding schemes to produce an encoded weight stream forming a compressed representation of the neural network model;

incorporating security information comprising embedded security markers within the compressed representation;

outputting the compressed neural network model;

verifying cryptographic integrity of the encoded weight stream using the embedded security markers;

computing statistical distributions of the encoded weight stream;

measuring distribution divergence between the computed statistical distributions and the reference probability distributions;

determining whether the measured distribution divergence exceeds a defined threshold indicating potential tampering; and generating a security alert when potential tampering is detected.

2. The system of claim 1, wherein the one or more hardware processors are further configured for:

dividing the neural network model into weight segments that receive different encoding treatments based on their functional importance;

clustering similar weight values within each layer type to identify opportunities for shared representations;

determining optimal bit allocation for different weight regions within each layer based on precision sensitivity analysis; and organizing the encoded weight stream into a progressive structure that facilitates efficient storage and transmission.

3. The system of claim 1, wherein analyzing weight characteristics comprises:

identifying layer types including convolutional, fully-connected, embedding, attention, and normalization layers;

computing statistical profiles for each layer including distribution moments, entropy measures, and correlation patterns;

analyzing sparsity patterns within weight tensors to identify both degree and structure of sparsity across different layers; and determining precision sensitivity for different weight regions to identify which weights require high precision representation and which can tolerate aggressive quantization.

4. The system of claim 1, wherein generating one or more encoding schemes comprises:

implementing product quantization techniques for embedding layers with semantic clustering;

creating head-aware structured encoding for attention mechanisms in transformer models;

applying filter-wise pattern matching for convolutional layers;

utilizing run-length encoding or magnitude-based pruning for sparse feed-forward networks; and optimizing scale-shift parameter encoding for normalization layers.

5. The system of claim 1, wherein measuring distribution divergence comprises applying algorithms selected from the group consisting of Kullback-Leibler divergence, Jensen-Shannon divergence, and Wasserstein distance.

6. The system of claim 1, wherein encoding the weight tensors creates a progressive representation comprising:

a base resolution layer containing a minimal weight representation necessary for basic model functionality;

a critical refinement layer that significantly improves model quality with modest size increase;

a detail enhancement layer that adds precision to moderately important weights; and a full precision layer that restores the model to its original accuracy.

7. A method for neural network weight processing, comprising the steps of:

receiving a neural network model comprising a plurality of weight tensors;

analyzing weight characteristics within the neural network model;

generating one or more encoding schemes based on the analyzed weight characteristics;

creating reference probability distributions for security verification;

encoding the weight tensors using the one or more encoding schemes to produce an encoded weight stream forming a compressed representation of the neural network model;

incorporating security information comprising embedded security markers within the compressed representation;

outputting the compressed neural network model;

verifying cryptographic integrity of the encoded weight stream using the embedded security markers;

computing statistical distributions of the encoded weight stream;

measuring distribution divergence between the computed statistical distributions and the reference probability distributions;

determining whether the measured distribution divergence exceeds a defined threshold indicating potential tampering; and generating a security alert when potential tampering is detected.

8. The method of claim 7, further comprising the steps of:

monitoring the encoded weight stream during transmission or deployment;

computing statistical distributions of the encoded weight stream;

comparing the computed statistical distributions against the reference probability distributions;

detecting anomalies when the comparison indicates a distribution divergence exceeding a defined threshold; and generating security alerts with detailed information about detected anomalies.

9. The method of claim 7, further comprising the steps of:

dividing the neural network model into weight segments that receive different encoding treatments based on their functional importance;

clustering similar weight values within each layer type to identify opportunities for shared representations;

determining optimal bit allocation for different weight regions within each layer based on precision sensitivity analysis; and organizing the encoded weight stream into a progressive structure that facilitates efficient storage and transmission.

10. The method of claim 7, further comprising the steps of:

identifying layer types including convolutional, fully-connected, embedding, attention, and normalization layers;

computing statistical profiles for each layer including distribution moments, entropy measures, and correlation patterns;

analyzing sparsity patterns within weight tensors to identify both degree and structure of sparsity across different layers; and determining precision sensitivity for different weight regions to identify which weights require high precision representation and which can tolerate aggressive quantization.

11. The method of claim 7, further comprising the steps of:

implementing product quantization techniques for embedding layers with semantic clustering;

creating head-aware structured encoding for attention mechanisms in transformer models;

applying filter-wise pattern matching for convolutional layers;

utilizing run-length encoding or magnitude-based pruning for sparse feed-forward networks; and optimizing scale-shift parameter encoding for normalization layers.

12. The method of claim 7, wherein measuring distribution divergence comprises applying algorithms selected from the group consisting of Kullback-Leibler divergence, Jensen-Shannon divergence, and Wasserstein distance.

13. The method of claim 7, wherein encoding the weight tensors creates a progressive representation comprising:

a base resolution layer containing a minimal weight representation necessary for basic model functionality;

a critical refinement layer that significantly improves model quality with modest size increase;

a detail enhancement layer that adds precision to moderately important weights; and a full precision layer that restores the model to its original accuracy.

* * * * *